(12) United States Patent
Dai et al.

(10) Patent No.: US 11,757,096 B2
(45) Date of Patent: Sep. 12, 2023

(54) ALUMINUM-DOPED LITHIUM COBALT MANGANESE OXIDE BATTERIES

(71) Applicant: Apple Inc., Cupertino, CA (US)

(72) Inventors: Hongli Dai, Los Altos, CA (US); Huiming Wu, San Jose, CA (US); Chi-Kai Lin, Sunnyvale, CA (US); Fulya Dogan-Key, Lemont, IL (US); Hakim H. Iddir, Hoffman Estates, IL (US); Anh D. Vu, Lemont, IL (US); John David Carter, Bolingbrook, IL (US); Xiaoping Wang, Naperville, IL (US); Yan Li, Westmont, IL (US); Zhenzhen Yang, Westmont, IL (US); Yanjie Cui, Arlington Heights, IL (US); James A. Gilbert, Bolingbrook, IL (US); Christopher S. Johnson, Naperville, IL (US); Arthur Jeremy Kropf, Westmont, IL (US)

(73) Assignee: Apple Inc., Cupertino, CA (US)

(*) Notice: Subject to any disclaimer, the term of this patent is extended or adjusted under 35 U.S.C. 154(b) by 272 days.

(21) Appl. No.: 16/999,307

(22) Filed: Aug. 21, 2020

(65) Prior Publication Data
US 2021/0057745 A1 Feb. 25, 2021

Related U.S. Application Data

(60) Provisional application No. 62/889,920, filed on Aug. 21, 2019.

(51) Int. Cl.
*H01M 4/525* (2010.01)
*H01M 4/505* (2010.01)
(Continued)

(52) U.S. Cl.
CPC ......... *H01M 4/525* (2013.01); *H01M 4/0402* (2013.01); *H01M 4/0471* (2013.01); *H01M 4/505* (2013.01); *H01M 2004/028* (2013.01)

(58) Field of Classification Search
None
See application file for complete search history.

(56) References Cited

U.S. PATENT DOCUMENTS

| | | |
|---|---|---|
| 5,744,262 A | 4/1998 | Cheng et al. |
| 5,993,998 A | 11/1999 | Yasuda |

(Continued)

FOREIGN PATENT DOCUMENTS

| | | |
|---|---|---|
| CN | 1588675 | 3/2005 |
| CN | 1702891 | 11/2005 |

(Continued)

OTHER PUBLICATIONS

Yuping et al.; "Lithium Ion Batteries—Applications and Practices"; Chapter 5 Cobalt Lithium Oxide Cathode Materials; Chemical Industry Press; Jan. 2012; 4 pages.

(Continued)

*Primary Examiner* — Daniel S Gatewood
(74) *Attorney, Agent, or Firm* — BakerHostetler

(57) ABSTRACT

Compounds, particles, and cathode active materials that can be used in lithium ion batteries are described herein. Methods of making such compounds, powders, and cathode active materials are described.

28 Claims, 27 Drawing Sheets

(51) Int. Cl.
*H01M 4/04* (2006.01)
*H01M 4/02* (2006.01)

(56) References Cited

U.S. PATENT DOCUMENTS

| | | |
|---|---|---|
| 6,007,947 A | 12/1999 | Mayer |
| 6,077,496 A | 6/2000 | Hiraoka et al. |
| 6,677,082 B2 | 1/2004 | Thackeray et al. |
| 6,680,143 B2 | 1/2004 | Thackeray et al. |
| 6,805,996 B2 | 10/2004 | Hosoya |
| 6,878,487 B2 | 4/2005 | Cho et al. |
| 7,135,252 B2 | 11/2006 | Thackeray et al. |
| 7,179,565 B2 | 2/2007 | Okochi et al. |
| 7,205,072 B2 | 4/2007 | Kang et al. |
| 7,235,193 B2 | 6/2007 | Park et al. |
| 7,238,450 B2 | 6/2007 | Howard, Jr. et al. |
| 7,255,963 B2 | 8/2007 | Nagayama et al. |
| 7,314,682 B2 | 1/2008 | Thackeray et al. |
| 7,314,684 B2 | 1/2008 | Kang et al. |
| 7,435,402 B2 | 10/2008 | Kang et al. |
| 7,468,223 B2 | 12/2008 | Thackeray et al. |
| 7,655,361 B2 | 2/2010 | Kim et al. |
| 7,691,535 B2 | 4/2010 | Shiozaki et al. |
| 7,732,096 B2 | 6/2010 | Thackeray et al. |
| 7,754,384 B2 | 7/2010 | Patoux et al. |
| 7,897,674 B2 | 3/2011 | Zaghib |
| 7,923,149 B2 | 4/2011 | Hwang et al. |
| 8,148,011 B2 | 1/2012 | Thackeray et al. |
| 8,187,746 B2 | 5/2012 | Chen et al. |
| 8,206,852 B2 | 6/2012 | Chang et al. |
| 8,277,683 B2 | 10/2012 | Deng et al. |
| 8,337,727 B2 | 12/2012 | Chen et al. |
| 8,343,663 B2 | 1/2013 | Jung et al. |
| 8,383,077 B2 | 2/2013 | Thackeray et al. |
| 8,535,832 B2 | 9/2013 | Karthikeyan et al. |
| 8,801,960 B2 | 8/2014 | Ueda et al. |
| 8,802,290 B2 | 8/2014 | Li et al. |
| 9,166,222 B2 | 10/2015 | Amiruddin et al. |
| 9,716,265 B2 | 7/2017 | Dai et al. |
| 9,843,041 B2 | 12/2017 | Lopez et al. |
| 10,084,187 B2 | 9/2018 | Dai et al. |
| 10,128,494 B2 | 11/2018 | Dai et al. |
| 10,141,572 B2 | 11/2018 | Wu et al. |
| 10,164,256 B2 | 12/2018 | Wu et al. |
| 10,297,821 B2 | 5/2019 | Dai et al. |
| 10,297,823 B2 | 5/2019 | Dai et al. |
| 10,347,909 B2 | 7/2019 | Dai et al. |
| 10,593,941 B2 | 3/2020 | Dai et al. |
| 10,597,307 B2 | 3/2020 | Dai et al. |
| 10,615,413 B2 | 4/2020 | Dai et al. |
| 2002/0061444 A1 | 5/2002 | Kweon et al. |
| 2002/0114995 A1 | 8/2002 | Thackeray |
| 2002/0136954 A1 | 9/2002 | M. Thackeray |
| 2002/0182504 A1 | 12/2002 | Imachi et al. |
| 2003/0013017 A1 | 1/2003 | Nagayama et al. |
| 2003/0039886 A1 | 2/2003 | Zhang et al. |
| 2003/0073002 A1 | 4/2003 | Imachi et al. |
| 2003/0082445 A1 | 5/2003 | Smieth et al. |
| 2003/0134200 A1 | 7/2003 | Tanaka et al. |
| 2004/0029008 A1 | 2/2004 | Winterberg |
| 2004/0191633 A1 | 9/2004 | Johnson et al. |
| 2004/0201948 A1 | 10/2004 | Hosoya et al. |
| 2004/0253516 A1 | 12/2004 | Yuasa et al. |
| 2004/0258836 A1 | 12/2004 | Besenhard et al. |
| 2005/0026040 A1 | 3/2005 | Thackery |
| 2005/0074675 A1 | 4/2005 | Nishijima et al. |
| 2005/0130042 A1 | 6/2005 | Liu et al. |
| 2005/0136329 A1 | 6/2005 | Howard, Jr. et al. |
| 2005/0181279 A1 | 8/2005 | Hosoya |
| 2005/0265909 A1 | 12/2005 | Kajiya et al. |
| 2005/0271948 A1 | 12/2005 | Kang |
| 2006/0024584 A1 | 2/2006 | Kim et al. |
| 2006/0068293 A1 | 3/2006 | Kim et al. |
| 2006/0081818 A1 | 4/2006 | Ito et al. |
| 2006/0088767 A1 | 4/2006 | Li et al. |
| 2006/0099508 A1 | 5/2006 | Thackeray et al. |
| 2006/0159994 A1 | 7/2006 | Dahn et al. |
| 2006/0177739 A1 | 8/2006 | Endo et al. |
| 2006/0194118 A1 | 8/2006 | Yew et al. |
| 2006/0240326 A1 | 10/2006 | Lee |
| 2007/0048619 A1 | 3/2007 | Inda |
| 2007/0072086 A1 | 3/2007 | Nakagawa |
| 2007/0141469 A1 | 6/2007 | Tokunaga et al. |
| 2007/0172739 A1 | 7/2007 | Visco |
| 2007/0202407 A1 | 8/2007 | Eberman et al. |
| 2007/0264573 A1 | 11/2007 | Yamada et al. |
| 2007/0292761 A1 | 12/2007 | Park et al. |
| 2008/0057401 A1 | 3/2008 | Mori et al. |
| 2008/0090150 A1 | 4/2008 | Nakura |
| 2008/0118836 A1 | 5/2008 | Hwang et al. |
| 2008/0118847 A1 | 5/2008 | Jung et al. |
| 2008/0131778 A1 | 6/2008 | Watanabe et al. |
| 2008/0131781 A1 | 6/2008 | Yong et al. |
| 2008/0160415 A1 | 7/2008 | Wakita et al. |
| 2008/0268339 A1 | 10/2008 | Suzuki |
| 2008/0280205 A1 | 11/2008 | Jiang et al. |
| 2008/0311473 A1 | 12/2008 | Sasaoka et al. |
| 2008/0318131 A1 | 12/2008 | Watanabe et al. |
| 2009/0092903 A1 | 4/2009 | Johnson et al. |
| 2009/0146115 A1 | 6/2009 | Xiao et al. |
| 2009/0200510 A1 | 8/2009 | Watanabe et al. |
| 2009/0202905 A1 | 8/2009 | Morita et al. |
| 2009/0239148 A1 | 9/2009 | Jiang |
| 2010/0055567 A1 | 4/2010 | Nakai et al. |
| 2010/0086853 A1 | 4/2010 | Venkatachalam et al. |
| 2010/0086854 A1 | 4/2010 | Kumar et al. |
| 2010/0151332 A1 | 6/2010 | Lopez et al. |
| 2010/0173197 A1 | 7/2010 | Li et al. |
| 2010/0304225 A1 | 12/2010 | Pascaly et al. |
| 2011/0014518 A1 | 1/2011 | Nakai et al. |
| 2011/0017529 A1 | 1/2011 | Kumar et al. |
| 2011/0031437 A1 | 2/2011 | Nagase et al. |
| 2011/0052981 A1 | 3/2011 | Lopez et al. |
| 2011/0053001 A1 | 3/2011 | Babic et al. |
| 2011/0065006 A1 | 3/2011 | Ogasa |
| 2011/0076556 A1 | 3/2011 | Karthikeyan et al. |
| 2011/0076564 A1 | 3/2011 | Yu et al. |
| 2011/0081578 A1 | 4/2011 | Chang et al. |
| 2011/0089369 A1 | 4/2011 | Patoux et al. |
| 2011/0111294 A1 | 5/2011 | Lopez et al. |
| 2011/0111298 A1 | 5/2011 | Lopez et al. |
| 2011/0121240 A1 | 5/2011 | Amine et al. |
| 2011/0136019 A1 | 6/2011 | Amiruddin et al. |
| 2011/0143174 A1 | 6/2011 | Kim |
| 2011/0165463 A1 | 7/2011 | Chang et al. |
| 2011/0165474 A1 | 7/2011 | Im et al. |
| 2011/0171371 A1 | 7/2011 | Li et al. |
| 2011/0171539 A1 | 7/2011 | Patoux et al. |
| 2011/0200864 A1 | 8/2011 | Dai |
| 2011/0200880 A1 | 8/2011 | Yu |
| 2011/0223492 A1 | 9/2011 | Sakitani et al. |
| 2011/0244331 A1 | 10/2011 | Karthikeyan et al. |
| 2011/0294006 A1 | 12/2011 | Amine et al. |
| 2011/0294019 A1 | 12/2011 | Amine et al. |
| 2012/0015250 A1 | 1/2012 | Teng et al. |
| 2012/0028134 A1 | 2/2012 | Kim et al. |
| 2012/0040247 A1 | 2/2012 | Manivannan et al. |
| 2012/0168696 A1 | 5/2012 | Huang et al. |
| 2012/0196176 A1 | 8/2012 | He et al. |
| 2012/0258369 A1 | 10/2012 | Yokoyama et al. |
| 2012/0282522 A1 | 11/2012 | Axelbaum et al. |
| 2012/0295155 A1 | 11/2012 | Deng et al. |
| 2013/0004826 A1 | 1/2013 | Li et al. |
| 2013/0011738 A1 | 1/2013 | Zhou |
| 2013/0101893 A1 | 4/2013 | Dai et al. |
| 2013/0149604 A1 | 6/2013 | Fujiki et al. |
| 2013/0252107 A1 | 9/2013 | Lee et al. |
| 2013/0260249 A1 | 10/2013 | Choi |
| 2013/0344391 A1 | 12/2013 | Yushin et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |

(56) References Cited

U.S. PATENT DOCUMENTS

| | | | |
|---|---|---|---|
| 2014/0158932 A1 | 6/2014 | Sun et al. |
| 2014/0175329 A1 | 6/2014 | Palma et al. |
| 2014/0193693 A1 | 7/2014 | Hoshina et al. |
| 2014/0234715 A1 | 8/2014 | Fasching et al. |
| 2014/0272563 A1 | 9/2014 | Dai et al. |
| 2015/0010819 A1 | 1/2015 | Lee et al. |
| 2015/0140421 A1 | 5/2015 | Ihara et al. |
| 2015/0171423 A1 | 6/2015 | Kim et al. |
| 2015/0180024 A1 | 6/2015 | Nose |
| 2015/0188144 A1 | 7/2015 | Shin et al. |
| 2015/0243971 A1 | 8/2015 | Cho et al. |
| 2015/0243984 A1 | 8/2015 | Kase et al. |
| 2015/0303519 A1 | 10/2015 | Hanazaki |
| 2015/0311522 A1 | 10/2015 | Fang et al. |
| 2016/0036043 A1 | 2/2016 | Dai et al. |
| 2016/0133929 A1 | 5/2016 | Hah et al. |
| 2016/0156032 A1 | 6/2016 | Lee et al. |
| 2016/0260965 A1 | 9/2016 | Wu et al. |
| 2016/0293941 A1 | 10/2016 | Yamasaki et al. |
| 2016/0315315 A1 | 10/2016 | Olken et al. |
| 2016/0351973 A1 | 12/2016 | Albano et al. |
| 2017/0018767 A1 | 1/2017 | Park et al. |
| 2017/0092949 A1 | 3/2017 | Dai et al. |
| 2017/0133678 A1 | 5/2017 | Ozoemena et al. |
| 2017/0155145 A1 | 6/2017 | Kusachi et al. |
| 2017/0187071 A1 | 6/2017 | Wang et al. |
| 2017/0187072 A1 | 6/2017 | Wang et al. |
| 2017/0214045 A1 | 7/2017 | Dai et al. |
| 2017/0263917 A1 | 9/2017 | Dai et al. |
| 2017/0263928 A1 | 9/2017 | Dai et al. |
| 2017/0263929 A1 | 9/2017 | Wu et al. |
| 2017/0279162 A1 | 9/2017 | Vissers et al. |
| 2017/0346082 A1 | 11/2017 | Dai et al. |
| 2018/0062156 A1* | 3/2018 | Wu ................... H01M 4/523 |
| 2018/0079655 A1 | 3/2018 | Dai et al. |
| 2018/0083277 A1 | 3/2018 | Dai et al. |
| 2018/0083278 A1 | 3/2018 | Dai et al. |
| 2018/0114983 A9 | 4/2018 | Dai et al. |
| 2018/0114984 A9 | 4/2018 | Wu et al. |
| 2018/0123117 A1 | 5/2018 | Dai et al. |
| 2018/0215629 A1 | 8/2018 | Honma et al. |
| 2018/0257947 A9 | 9/2018 | Dai et al. |
| 2018/0294522 A1 | 10/2018 | Dai et al. |
| 2018/0331360 A1 | 11/2018 | Meng et al. |
| 2018/0351173 A1 | 12/2018 | Dai et al. |
| 2019/0027747 A9 | 1/2019 | Dai et al. |
| 2019/0067686 A1 | 2/2019 | Dai et al. |
| 2019/0074514 A1 | 3/2019 | Wu et al. |
| 2020/0044242 A1 | 2/2020 | Wang et al. |
| 2020/0058933 A1 | 2/2020 | Wu et al. |
| 2020/0075951 A1 | 3/2020 | Dai et al. |
| 2020/0189930 A1 | 6/2020 | Dai et al. |
| 2020/0259208 A1 | 8/2020 | Yamamoto |
| 2020/0266435 A1 | 8/2020 | Dai et al. |
| 2020/0358093 A1 | 11/2020 | Oshita et al. |

FOREIGN PATENT DOCUMENTS

| | | |
|---|---|---|
| CN | 1770514 | 10/2006 |
| CN | 101083321 | 12/2007 |
| CN | 101088918 | 12/2007 |
| CN | 101150190 | 3/2008 |
| CN | 101223660 | 7/2008 |
| CN | 101284681 | 10/2008 |
| CN | 101304090 | 11/2008 |
| CN | 101355161 | 1/2009 |
| CN | 101510603 | 8/2009 |
| CN | 101694877 | 4/2010 |
| CN | 101734728 | 6/2010 |
| CN | 102110808 | 6/2011 |
| CN | 102195094 A | 9/2011 |
| CN | 102299299 | 12/2011 |
| CN | 102332585 | 1/2012 |
| CN | 102368548 | 3/2012 |
| CN | 101789499 | 4/2012 |
| CN | 102439765 A | 5/2012 |
| CN | 102479947 | 5/2012 |
| CN | 102484249 | 5/2012 |
| CN | 102544575 | 7/2012 |
| CN | 102646831 | 8/2012 |
| CN | 102683666 | 9/2012 |
| CN | 102723459 | 10/2012 |
| CN | 102751481 | 10/2012 |
| CN | 102881891 | 1/2013 |
| CN | 103151520 | 6/2013 |
| CN | 103296249 | 9/2013 |
| CN | 102386381 | 1/2014 |
| CN | 103560250 | 2/2014 |
| CN | 103606674 | 2/2014 |
| CN | 103682311 | 3/2014 |
| CN | 103872302 | 6/2014 |
| CN | 103872315 | 6/2014 |
| CN | 103972493 | 8/2014 |
| CN | 104022280 | 9/2014 |
| CN | 104201323 | 12/2014 |
| CN | 104300138 | 1/2015 |
| CN | 104466099 | 3/2015 |
| CN | 104577128 | 4/2015 |
| CN | 104868122 | 8/2015 |
| CN | 104966833 A | 10/2015 |
| CN | 105161710 | 12/2015 |
| CN | 105895909 A | 8/2016 |
| CN | 106450211 | 2/2017 |
| DE | 10352063 | 6/2005 |
| JP | 4-267053 | 9/1992 |
| JP | H-10-087327 | 4/1998 |
| JP | 2001-167763 A | 6/2001 |
| JP | 2001-319652 A | 11/2001 |
| JP | 2002-201028 | 7/2002 |
| JP | 2004-047180 A | 2/2004 |
| JP | 2005-101003 | 4/2005 |
| JP | 2005-149867 | 6/2005 |
| JP | 2005-289700 | 10/2005 |
| JP | 2005-302507 A | 10/2005 |
| JP | 2006-344509 | 12/2006 |
| JP | 2007-091502 | 4/2007 |
| JP | 2007-517368 | 6/2007 |
| JP | 2007-173113 | 7/2007 |
| JP | 2009-4311 | 1/2009 |
| JP | 2009-217981 | 9/2009 |
| JP | 2010-541166 | 12/2010 |
| JP | 2011-105594 | 6/2011 |
| JP | 2011-113869 | 6/2011 |
| JP | 2013-180917 | 9/2013 |
| JP | 2015-213038 | 11/2015 |
| JP | 2016-517615 A | 6/2016 |
| JP | 2017-191738 | 10/2017 |
| KR | 10-2002-0063501 | 8/2002 |
| KR | 10-2005-0121727 | 12/2005 |
| KR | 10-2014-0073856 | 6/2014 |
| KR | 10-2014-0108615 | 9/2014 |
| KR | 101731473 | 4/2017 |
| TW | 201126798 | 8/2011 |
| TW | 201311545 A | 3/2013 |
| TW | 201342695 | 10/2013 |
| WO | WO 2003/049216 A1 | 6/2003 |
| WO | WO 2003/081698 A1 | 10/2003 |
| WO | WO 2004/045015 | 5/2004 |
| WO | WO 2004/102700 A1 | 11/2004 |
| WO | WO 2004/107480 | 12/2004 |
| WO | WO 2008/069351 | 6/2008 |
| WO | WO 2009/120515 | 10/2009 |
| WO | WO 2010/011569 | 1/2010 |
| WO | WO 2010/139404 | 12/2010 |
| WO | WO 2011/020073 | 2/2011 |
| WO | WO 2011/054441 | 5/2011 |
| WO | WO 2013/048048 | 4/2013 |
| WO | WO 2014/014913 | 1/2014 |

(56) References Cited

FOREIGN PATENT DOCUMENTS

| WO | WO 2014/119165 | 8/2014 |
| WO | WO 2016/143572 | 9/2016 |

OTHER PUBLICATIONS

Amiruddin et al.; "Electrochemical Characterization of Cathode Material (Li[Ni0.8Co0.1Mn0.1]O2 as Core and Li[Ni0.5-0.5xCoxMn0.5-0.5x]O2 as shell)for Lithium-Ion Batteries"; ECS Meeting Abstracts; Electrochemical Society; No. 240; 2007; one page.

Zhao et al., "Progress of Research on the Li-rich Cathode Materials xLi2MnO3(1-x)LiMO2(M+Co, Fe, Ni1/2Mn1/2 . . . ) for Li-ion Batteries," Journal of Inorganic Materials, vol. 26(7), pp. 673-679, Jul. 2011.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3—LiMo2 Materials in Li De-Intercalation Process," *Photon Factory Activity Report*, 2012, vol. 29, No. 2011, 1 pp.

Giordano et al., "Metal Nitride and Metal Carbide Nanoparticles by a Soft Urea Pathway," *Chem. Mater.*, 2009, vol. 21, pp. 5136-5144.

Dou et al., "Synthesis and electrochemical properties of layered LiNi0.5—xMn0.5—xCo2xO2 for lithium-ion battery from nickel manganese cobalt precursor," *J Solid State Electrochem*, (2011), vol. 15, pp. 399-404.

Li, "Layered Oxides Li1+xM1-xO2 (M=Ni, Mn, Co, Al) as Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Hu et al., "Ni, Mn-Co doped High-Voltage LiCoO2 Cathode Material for Lithium Ion Batteries," Chinese Journal of Inorganic Chemistry, 2015, vol. 31, Issue 1, pp. 159-165.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LiCoO2 Cathode Material That Does Not Show a Phase Transition from Hexagonal to Monoclinic Phase," 2001, *Journal of the Electrochemical Society*, vol. 148, No. 10, pp. A1110-A1115.

Jung et al., "Enhanced Stability of LiCoO2 Cathodes in Lithium-Ion Batteries Using Surface Modification by Atomic Layer Deposition," 2010, *Journal of The Electrochemical Society*, vol. 157, No. 1, pp. A75-A81.

Koyama et al., "First principles study of dopant solubility and defect chemistry in Li CoO2," *J. Mater. Chem A.*, 2014, vol. 2, pp. 11235-11245.

Arunkumar et al., "Chemical and structural instability of the chemically delithiated (1-z) Li[Li$_{1/3}$Mn$_{2/3}$O$_2$ (z) Li[Co$_{1-y}$Ni$_y$]O$_2$ (O ≤ y ≤ 1 and 0 ≤ z ≤ 1) solid solution cathodes," *Journal of Materials Chemistry*, 2008, vol. 18, pp. 190-198.

Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.

Robertson et al., "Layered Li$_x$Mn$_{1-y}$Co$_y$O$_2$ Intercalation Electrodes—Influence of Ion Exchange on Capacity and Structure upon Cycling," *Chem. Mater.*, 2001, vol. 13, pp. 2380-2386.

Patoux et al., "Layered Manganese Oxide Intergrowth Electrodes for Rechargeable Lithium Batteries. 2. Substitution with Al," *Chem. Mater.*, 2005, vol. 17, pp. 1044-1054.

Myung et al., "Role of Alumina Coating on Li—Ni—Co—Mn—O Particles as Positive Electrode Material for Lithium-Ion Batteries," *Chem. Mater.*, 2005, vol. 17, pp. 3695-3704.

Wang et al., "Synthesis of Li$_2$MnO$_3$-stabilized LiCoO$_2$ cathode material by spray-drying method and its high voltage performance," *Journal of Alloys and Compounds*, 2015, vol. 626, pp. 228-233.

Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.

Zeng et al., "Investigation of the Structural Changes in Li[NiyMnyCo(1-2y)]O-2 (y=0.05) upon Electrochemical Lithium Deintercalation," *Chemistry of Materials*, 2010, vol. 22, No. 3, pp. 1209-1219.

Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.

Bentaleb et al., "On the LiNi0.2Mn0.2Co0.6O2 positive electrode material," *Journal of Power Sources*, 2010, vol. 195, No. 5, pp. 1510-1515.

Ben Kamel et al., "Local Structure and electrochemistry of LiNiyMnyCo1-2y)O2 electrode materials for Li-ion batteries," *Ionics*, 2008, vol. 14, No. 2, pp. 89-97.

Stoyanova et al., "High-Frequency Electron Paramagnetic Resonance Analysis of the Oxidation State and Local Structure of Ni and Mn Ions in Ni,Mn-Codoped LiCoO2," *Inorganic Chemistry*, 2010, vol. 49, No. 4, pp. 1932-1941.

Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.

Iddir et al., "Stability of Li- and Mn-Rich Layered-Oxide Cathodes within the First-Charge Voltage Plateau," *Journal of the Electrochemical Society*, 2016, vol. 163, No. 8, pp. A1784-A1789.

Seong-Min Bak et al., "Structural Changes and Thermal Stability of Charged LiNixMnyCozO2 Cathode Materials Studied by Combined In Situ Time-Resolved XRD and Mass Spectroscopy," *ACS Appl. Mater. Interfaces*, 2014, vol. 6, pp. 22594-22601.

Nam et al. "Ammonia-free coprecipitation synthesis of a Ni—Co—Mn hydroxide precursor for high-performance battery cathode materials," *Green Chemistry*, 2015. vol. 17, pp. 1127.

Xie et al., "An improved continuous co-precipitation method to synthesize LiNi0.80Co0.15Al0.05O2 cathode material," *Journal of Alloys and Compounds*, 2016, vol. 666, pp. 84-87.

Rouse et al., "Electrochemical Studies of Single Crystals of Lithiated Nickel Oxide," *Journal of The Electrochemical Society*, Feb. 1966, vol. 113, No. 2, pp. 184-190.

Jin et al., "Observation of Bulk Superconductivity in Na$_x$CoO$_2$•yH$_2$O and Na$_x$CoO$_2$•yD$_2$O Powder and Single Crystals," Phys Rev Lett, 2008, vol. 91, Issue 21, id. 217001, 4 pages.

Franger et al., "Chemistry and Electrochemistry of Low-Temperature Manganese Oxides as Lithium Intercalation Compounds," *Journal of the Electrochemical Society*, 2000, vol. 147, No. 9, pp. 3226-3230.

Lu et al., "Layered Li[Ni$_x$Co$_{1-2x}$Mn$_x$]O$_2$ Cathode Materials for Lithium-Ion Batteries," *Electrochemical and Solid-State Letters*, 2001, vol. 4, No. 12, pp. A200-A203.

Shinova et al., "Cationic distribution and electrochemical performance of LiCo$_{1/3}$Ni$_{1/3}$Mn$_{1/3}$O$_2$ electrodes for lithium-ion batteries," 2008, *Solid State Ionics*, vol. 179, pp. 2198-2208.

Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.

Reddy et al., "Effects of LLTO coating on high temperature cycle life performance of LiMn2O4 cathode material," Abstract #382, 2012, The Electrochemical Society, 2 pages.

Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.

Lee et al., "The Effects of Li—La—Ti—O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.

(56) References Cited

OTHER PUBLICATIONS

Lee et al., "The Effect of Coating Thickness on the Electrochemical Properties of a Li—La—Ti—O-coated Li[Ni0.3Co0.4Mn0.3]O2 Cathode," Bull. Korean Chem. Soc., 2010, vol. 31, No. 11, pp. 3233-3237.

Hu et al., "Enhanced electrochemical performance of LIMn2O4 cathode with a Li0.34La0.51TiO3-caoted layer," RSC Advances, 2015. vol. 5, p. 17592-17600.

Fergus et al., "Recent Developments in Cathode Materials for Lithium Ion Batteries," Journal of Power Sources, Vo. 195, No. 4, 23010, pp. 939-954.

Gille G. et al., "Cathode Materials for Rechargeable Batteries-Preparation, Structure-Property Relationships and Performance," Solid State Ionics, Vo. 148, No. 3-4, 2002, pp. 269-282.

Periasamy et al., "High Voltage and High Capacity Characteristics of LiNi1/3Co1/3Mn1/3O2 Cathodes for Lithium Battery Applications," Int. J. Electrochecm Soc., vol. 2, 2007, pp. 689-699.

Manthiram Lab Highlights, "Passivation of Spinel Cathode Surface through Self-Segregarion of Iron," May 7, 2010.

Cerion Power, "Our Power Business," www.cerionenterprises.com/companies_and_applications/power, accessed Sep. 8, 2011.

ETV Motors, "High5ive advanced high-voltage cells," www.etvemotors.com/advanced-battery.htm, accessed Sep. 8, 2011.

Wolfenstine et al., US Army RDECOM, "High Cycle Life Cathode for High Voltage (5V) Lithium Ion Batteries."

Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.

Xu, US Army RDECOM, "Electrolyte for Next Generation 5V Li-Ion Batteries."

Ghosh et al., "Block Copolymer Solid Battery Electrolyte with High Li-Ion Transference Number," Journal of the Electrochemical Society, 2010, vol. 157, No. 7, pp. A846-A849.

Abu-Lebdeh et al., High-Voltage Electrolytes Based on Adiponitrile for Li-Ion Batteries, Journal of the Electrochemical Society, 2009, vol. 156, No. 1, pp. A60-A65.

Jow et al., "High Voltage Electrolytes for Li-ion Batteries," U.S. Research Laboratory, Presentation, May 2011.

Lucht, University of Rhode Island, "Development of Electrolytes for Lithium-ion Batteries," Presentation, May 11, 2001.

Zhang et al., Argonne National Laboratory, Vehicle Technologies Program Annual Merit Review and Peer Evaluation Meeting, "High Voltage Electrolyte for Lithium Batteries," Presentation, Jun. 9-13, 2011.

David Howell, US Department of Energy, "Vehicle Technologies Program," 2011 Annual Merit Review and Peer Evaluation Meeting, Presentation, May 9-13, 2011.

Fey et al., Preparation and electrochemical properties of high-voltage cathode maters, LiMyNi0.5—yMn1.5O4 (M=Fe, Cu, Al, Mg; y=0.0-0.4), Journal of Power Sources, 2003, vol. 115, pp. 332-345.

Kawai et al., "High-voltage lithium cathode materials," Journal of Power Sources, 1999, vols. 81-82, abstract only.

Huang et al., "Lithium cobalt phosphate: a high voltage lithium ion cathode material," Valence Technologies.

"Award Details," SBIR/STTR, www.sbir.gov/sbirsearch/detail/233700, accessed Sep. 8, 2011.

Ju et al., "LiCo1-xAlxO2 (0≤x≤0.05) cathode powders prepared from the nanosized Co1-xAlxOy precursor powders," Materials Chemistry and Physics, 112 (2008), pp. 536-541.

Wu et al., "Effect of Al3+ and F-Doping on the Irreversible Oxygen Loss from Layered Li[Li0.17Mn0.58Ni0.25]O2 Cathodes," Electrochemical and Solid-State Letters, 2007, vol. 10, No. 6, pp. A151-A154.

Li et al., "Effects of fluorine doping on structure, surface chemistry, and electrochemical performance of LiNi0.8Co0.15Al0.05O2," Electrochimica Acta, 2015, vol. 174, pp. 1122-1130.

Cho et al., "Exploring Lithium Deficiency in Layered Oxide Cathode for Li-Ion Battery," Advanced Sustainable Systems, 2017, 1700026, 10 pages.

Lee et al., "Surface modification of LiNi0.5Mn1.5O4 cathodes with ZnAl2O4 by a sol-gel method for lithium ion batteries," Electrochimica Acta, 2014, vol. 115, pp. 326-331.

Kim et al., "Effect of fluorine on Li[Ni1/3Co1/3Mn1/3]O2-zFz as lithium intercalation material," Journal of Power Sources, 2005, vol. 146, pp. 602-605.

Yue et al., "The enhanced electrochemical performance of LiNi0.6Co0.2Mn0.2O2 cathode materials by low temperature fluorine substitution," Electrochimica Acta, 2013, vol. 95, pp. 112-118.

Wang et al., "Effect of surface fluorine substitution on high voltage electrochemical performances of layered LiNi0.5Co0.2Mn0.3O2 cathode materials," Applied Surface Science, 2016, vol. 371, pp. 172-179.

Tang et al., "Synthesis and characterization of LiFePO4 coating with aluminum doped zinc oxide," Trans. Nonferrous Met. Soc. China, 2013, vol. 23, pp. 451-455.

Myung et al., "Functionality of Oxide Coating for Li[Li0.05Ni0.4Co0.15Mn0.4])2 as Positive Electrode Materials for Lithium-Ion Secondary Batteries," J. Phys. Chem. C, 2007, vol. 111, pp. 4061-4067.

Liu et al., "Investigation the electrochemical performance of Li1.2Ni0.2Mn0.6O2 cathode material with ZnAl2O4 coating for lithium ion batteries," Journal of Alloys and Compounds, 2016, vol. 685, pp. 523-532.

Kim et al., "Improvement of High-Voltage Cycling Behavior of Surface-Modified Li[Ni1/3Co1/3Mn1/3]O2 Cathodes by Fluorine Substitution for Li-Ion Batteries," J. Electrochem. Soc., 2005, vol. 152, issue 9, pp. A1707-A1713.

Choi et al., "$^{27}$Al NMR Chemical Shifts in Oxide Crystals: A First-Principles Study," J. Phys. Chem. C, 2009, 113 (9), pp. 3869-3873.

Lee et al., "Solid-state NMR Studies of Al-doped and Al2O3-coated LiCoO2," Electrochimica Acta, Nov. 30, 2004, vol. 50, Issues 2-3, pp. 491-494.

Han et al., "Understanding the Role of Temperature and Cathode Composition on Interface and Bulk: Optimizing Aluminum Oxide Coatings for Li-Ion Cathodes," ACS Appl. Mater. Interfaces, 2017, 9 (17), pp. 14769-14778.

Chen et al., "Role of surface coating on cathod materials for lithium-ion batteries," Journal of Materials Chemistry, 2010, 20, 7606-7612.

Wenbin, Luo, "Effect of Al, Mg and Mn—Mg Doping on the Structure, Electrochemistry and Thermal Stability of LiCoO2 and LiNi1/3Mn1/3Co1/3O2," China Doctoral Dissertations Full-text Database Engineering Technology Part II, Nov. 15, 2010. (Translation provided by MultiLing).

Xinran, Cui, "Preparation and Properties of Al(3+) Doped Lithium Layered Cathode Material Li[Co0.3Li0.23Mn0.47]O2," China Doctoral Dissertations Full-text Database Engineering Technology Part II, Oct. 15, 2012. (Translation provided by MultiLing).

Levasseur et al., "Evidence for structural defects in on-stoichiometric HT-LiCoO2: electrochemical, electronic properties and 7LI NMR studies," Solid State Ionics, 128 (2000), pp. 11-24.

* cited by examiner

ALUMINUM-DOPED LITHIUM COBALT MANGANESE OXIDE BATTERIES

CROSS-REFERENCES TO RELATED PATENT APPLICATIONS

This patent application claims the benefit under 35 U.S.C. § 119(e) of U.S. Patent Application Ser. No. 62/889,920, entitled "Aluminum-Doped Lithium Cobalt Manganese Oxide Batteries," filed on Aug. 21, 2019, which is incorporated herein by reference in its entirety.

This patent application is related to the following patent applications, each of which is incorporated herein by reference in its entirety:

U.S. Patent Application entitled "Cathode Active Materials for Lithium Ion Batteries," by Hongli Dai et al., filed on Aug. 21, 2020.

U.S. Patent Application entitled "Mono-Grain Cathode Materials," by Hongli Dai et al., filed on Aug. 21, 2020.

U.S. GOVERNMENT LICENSE RIGHTS

This invention was made with U.S. government support under WFO Proposal No. 85F59. This invention was made under a CRADA 1500801 between Apple Inc. and Argonne National Laboratory operated for the United States Department of Energy. The U.S. government has certain rights in the invention.

FIELD

This disclosure relates generally to batteries, and more particularly to cathode active materials for lithium-ion batteries.

BACKGROUND

As lithium ion battery-powered devices become increasingly small and more powerful, batteries powering these devices need to store more energy in a smaller volume. Consequently, use of battery-powered devices may be facilitated by mechanisms for improving the volumetric energy densities of batteries in the devices.

Lithium cobalt metal oxides or lithium transition metal oxides can be used in cathode active materials for lithium-ion batteries. The lithium transition metal oxides are derivations of lithium cobalt oxide. The lithium cobalt metal oxides or transition metal oxides can be in the form of powder.

In Li-ion batteries, the cathode materials of different compositions tend to react chemically or electrochemically with the liquid electrolyte that consists of a lithium salt (LiPF$_6$) in organic solvents (such as ethylene carbonate, ethyl-methylene carbonate), especially when Li is extracted from the cathodes during charging. This is one of the major reasons for causing short cycle life of the batteries. A coating, such as aluminum oxide (Al$_2$O$_3$), is normally applied to the cathode particles in order to mitigate the reaction between the cathode and electrolyte and to prevent dissolution of the transition metals from the cathode into the electrolyte.

Cathode active materials used in lithium ion batteries can include a coating such as aluminum oxide (Al$_2$O$_3$) or aluminum fluoride (AlF$_3$). However, there can be an energy density loss using non-conductive aluminum oxide, or process safety concerns from fluorides using aluminum fluoride coatings. Coatings can often cause energy density loss for the battery. There remains a need to develop coatings for improved battery performance.

SUMMARY

In one aspect, the disclosure is directed to a plurality of particles comprising a compound represented by Formula (I):

$$Li_\alpha Co_{1-x-y-z}Mn_xMe_zAl_yO_\delta, \quad \text{Formula (I)}$$

wherein $0.95 \leq \alpha \leq 1.30$, $0 < x \leq 0.05$, 300 ppm $\leq y \leq$ 10,000 ppm, $0 \leq z \leq 0.1$, wherein Me is at least one element selected from B, Na, Mg, P, Ti, Ca, V, Cr, Fe, Ni Cu, Zn, Sc, Y, Ga, Zr, Ru, Mo, La, Si, Nb, Ge, in, Sn, Sb, Te, and Ce, and $1.98 \leq \delta \leq 2.04$ In another aspect, the disclosure is directed to a plurality of particles comprising a compound represented by Formula (I):

$$Li_\alpha Co_{1-x-y-z}Mn_xMe_zAl_yO_\delta, \quad \text{Formula (I)}$$

wherein $0.95 \leq \alpha \leq 1.30$, $0 < x \leq 0.05$, 300 ppm $\leq y \leq$ 10,000 ppm, $0 \leq z \leq 0.1$, and $1.98 \leq \delta \leq 2.04$, wherein Me is at least one element selected from Ni, B, Na, Mg, Ti, Ca, V, Cr, Fe, Cu, Zn, Sc, Y, Ga, Zr, La, Ru, and Mo, wherein at the average particle surface, the molar ratio of Al/Co is at least 0.2.

In another aspect, the disclosure is directed to a plurality of particles comprising a compound represented by Formula (II):

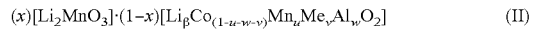
$$(x)[Li_2MnO_3]\cdot(1-x)[Li_\beta Co_{(1-u-w-v)}Mn_uMe_vAl_wO_2] \quad \text{(II)}$$

wherein $0.95 \leq \beta \leq 1.0$, $0 < x \leq 0.05$, $0 \leq u \leq 0.05$, $0 \leq v \leq 0.1$, 300 ppm $\leq w \leq$ 10,000 ppm, and wherein Me is at least one element selected from B, Na, Mg, P, Ti, Ca, V, Cr, Fe, Ni, Cu, Zn, Sc, Y, Ga, Zr, Ru, Mo, La, Si, Nb, Ge, in, Sn, Sb, Te, and Ce, wherein at the average particle surface, the molar ratio of Al/Co is at least 0.2.

In some variations, Me is at least one element selected from Ni, B, Na, Mg, Ti, Ca, V, Cr, Fe, Cu, Zn, Sc, Y, Ga, Zr, La, Ru, and Mo.

In another aspect, the disclosure is directed to a plurality of particles comprising a compound represented by Formula (I):

$$Li_\alpha Co_{1-x-y-z}Mn_xMe_zAl_yO_\delta, \quad \text{Formula (I)}$$

wherein $0.95 \leq \alpha \leq 1.30$, $0 < x \leq 0.05$, 0 ppm $\leq y \leq$ 10,000 ppm, 300 ppm $\leq z \leq$ 5000 ppm,
wherein Me is La, and $1.98 \leq \delta \leq 2.04$, and
wherein at the average particle surface, the molar ratio of La/Co is at least 0.06.

In another aspect, the disclosure is directed to a plurality of particles comprising a compound represented by Formula (I):

$$Li_\alpha Co_{1-x-y-z}Mn_xMe_zAl_yO_\delta, \quad \text{Formula (I)}$$

wherein $0.95 \leq \alpha \leq 1.30$, $0 < x \leq 0.05$, 0 ppm $\leq y \leq$ 10,000 ppm, 300 ppm $\leq z \leq$ 5000 ppm,
wherein Me is Mg, and $1.98 \leq \delta \leq 2.04$, and
wherein at the average particle surface, the molar ratio of Mg/Co is at least 0.20.

In another aspect, the disclosure is directed to a plurality of particles comprising a compound represented by Formula (I):

$$Li_\alpha Co_{1-x-y-z}Mn_xMe_zAl_yO_\delta, \quad \text{Formula (I)}$$

wherein 0.95≤α≤1.30, 0<x≤0.05, 0 ppm≤y≤10,000 ppm, 300 ppm≤z≤5000 ppm,
wherein Me is Ti, and 1.98≤δ≤2.04, and
wherein at the average particle surface, the molar ratio of Ti/Co is at least 0.08.

In another aspect, the disclosure is directed to a plurality of particles comprising a compound represented by Formula (I):

$$Li_\alpha Co_{1-x-y-z}Mn_xMe_yAl_zO_\delta,$$ Formula (I)

wherein 0.95≤α≤1.30, 0<x≤0.05, 0 ppm≤y≤10,000 ppm, 300 ppm≤z≤5000 ppm,
wherein Me is Zr, and 1.98≤δ≤2.04, and
wherein at the average particle surface, the molar ratio of Zr/Co is at least 0.02.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The following description is presented to allow any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosure. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Thus, the disclosure is not limited to the embodiments shown, but is to be accorded the widest scope consistent with the principles and features disclosed herein.

As used herein, all compositions referenced in microscopy, XPS, NMR, and metal leaching experiments for cathode active materials represent those of as-prepared materials (i.e., "virgin" materials). Materials of these compositions have not yet been exposed to additional processes, such as de-lithiation and lithiation during, respectively, charging and discharging of a lithium-ion battery.

The disclosure provides cathode active materials including Al, Mn, and Co. As described herein, Al can be referred to as an Al dopant. The particles have increased amount of Al diffused into each particle, and increased amount of Mn at the surface of each particle, as compared to previous aluminum oxide ($Al_2O_3$) surface coated particles. Batteries having cathodes that include these cathode active materials can demonstrate improved specific capacity, energy, and cell resistance cycle retention at ambient and elevated temperatures. In some variations, the cathode active materials can mitigate degradation mechanisms, yet allow for more lithium to be extracted and re-inserted reversibly at higher operating voltages and temperatures.

In various aspects, the disclosure describes the positive effect of cathode active materials and particles comprising cathode active materials created by temperatures higher than 700° C. $Al_2O_3$ coating on increasing the Li-ion cycle life when using the annealed material as a cathode in the secondary-battery.

Battery Cells

Figure 1:
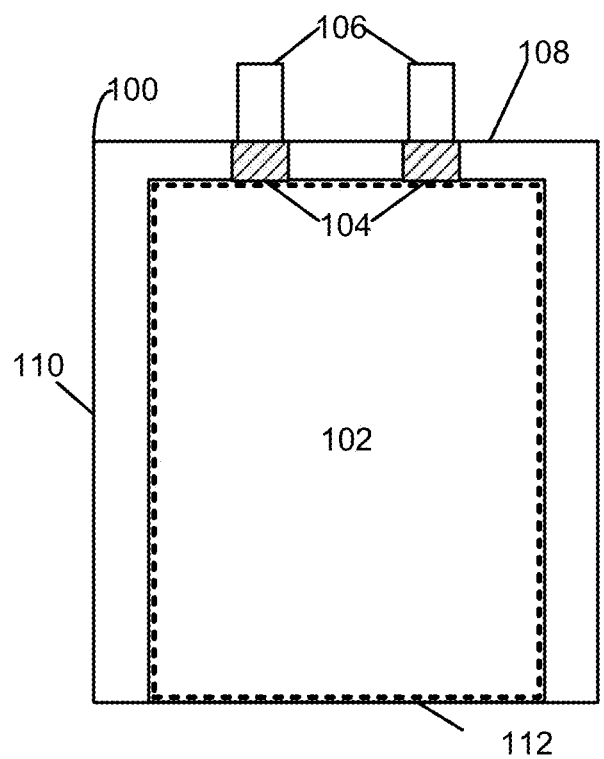
FIG. 1 presents a top-down view of a battery cell 100 in accordance with an embodiment.

FIG. 1 presents a top-down view of a battery cell 100 in accordance with an embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active material, a separator, and an anode with an anode active material. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., conducting polymer electrolyte) disposed between the one strip of cathode active material and the one strip of anode active material. The cathode, anode, and separator layers may be left flat in a planar configuration or may be wrapped into a wound configuration (e.g., a "jelly roll").

Enclosures can include, without limitations, pouches, such as flexible pouches, rigid containers, and the like. Returning to FIG. 1, during assembly of the battery cell 100, the stack 102 is enclosed in an enclosure. The stack 102 may be in a planar or wound configuration, although other configurations are possible. Flexible pouch can be formed by folding a flexible sheet along a fold line 112. For example, the flexible sheet may be made of aluminum with a polymer film, such as polypropylene. After the flexible sheet is folded, the flexible sheet can be sealed, for example, by applying heat along a side seal 110 and along a terrace seal 108. The flexible pouch may be less than 120 microns thick to improve the packaging efficiency of the battery cell 100, the density of battery cell 100, or both.

The stack 102 can also include a set of conductive tabs 106 coupled to the cathode and the anode. The conductive tabs 106 may extend through seals in the enclosure (for example, formed using sealing tape 104) to provide terminals for the battery cell 100. The conductive tabs 106 may then be used to electrically couple the battery cell 100 with one or more other battery cells to form a battery pack.

Batteries can be combined in a battery pack in any configuration. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2A:
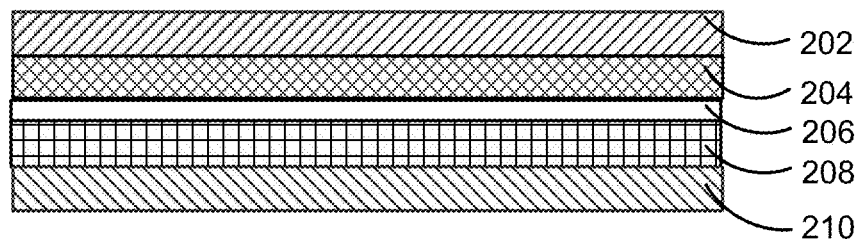
FIG. 2A presents a side view of a set of layers for a battery cell (e.g., the battery cell 100 of FIG. 1) in accordance with the disclosed embodiments.

FIG. 2A presents a side view of a set of layers for a battery cell (e.g., the battery cell 100 of FIG. 1) in accordance with the disclosed embodiments. The set of layers may include a cathode current collector 202, a cathode active material 204, a separator 206, an anode active material 208, and an anode current collector 210. The cathode current collector 202 and the cathode active material 204 may form a cathode for the battery cell, and the anode current collector 210 and the anode active material 208 may form an anode for the battery cell. To create the battery cell, the set of layers may be stacked in a planar configuration, or stacked and then wrapped into a wound configuration.

As mentioned above, the cathode current collector 202 may be aluminum foil, the cathode active material 204 may be a lithium compound, the anode current collector 210 may be copper foil, the anode active material 208 may be carbon, and the separator 206 may include a conducting polymer electrolyte.

It will be understood that the cathode active materials described herein can be used in conjunction with any battery cells or components thereof known in the art. For example, in addition to wound battery cells, the layers may be stacked and/or used to form other types of battery cell structures, such as bi-cell structures. All such battery cell structures are known in the art.

Figure 2B:
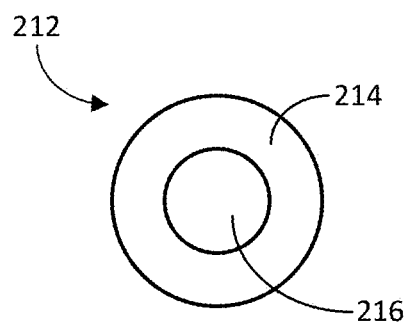
FIG. 2B is a sectional view of a coated particle including a cathode active particle and a coating in accordance with an illustrative embodiment.
Figure 3A:
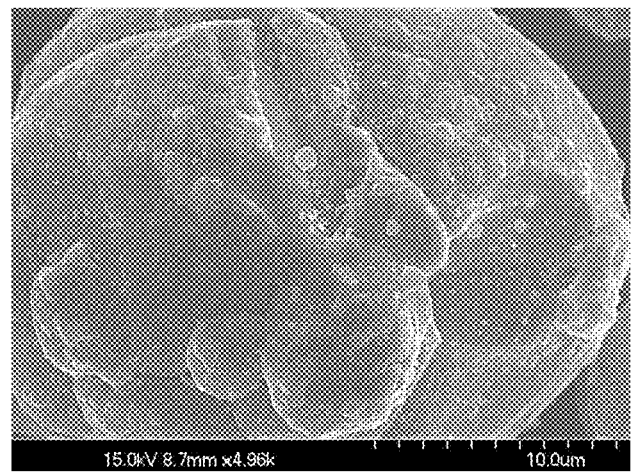
FIGS. 3A-3F illustrate SEM images of $Li_{0.98}(Co_{0.97}Mn_{0.017}Al_{0.013})O_2$ cathode particle coated with nano-$Al_2O_3$ powder, (A) as-prepared; (B) after annealing at 600° C. for 8 hours; (C) after annealing at 700° C. for 8 hours; (D) after annealing at 750° C. for 8 hours; (E) after annealing at 800° C. for 8 hours; and (F) after annealing at 800° C. for 12 hours in accordance with illustrative embodiments.
Figure 3B:
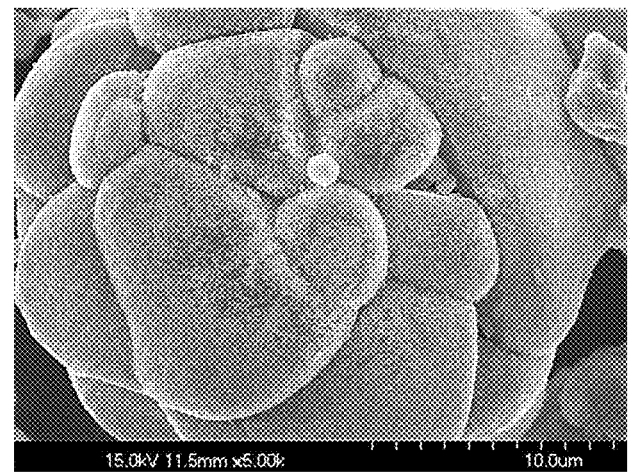
Figure 3C:
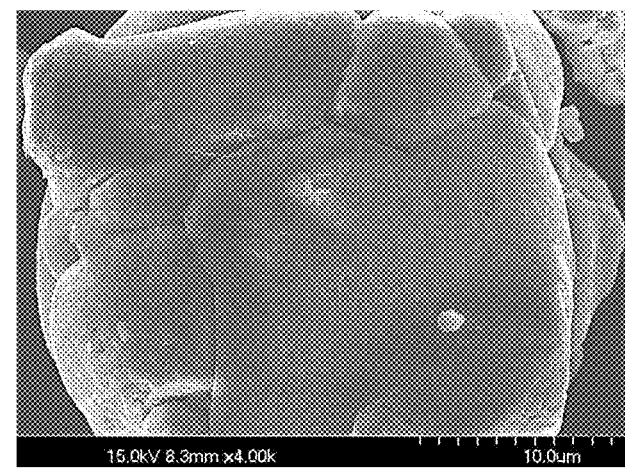
Figure 3D:
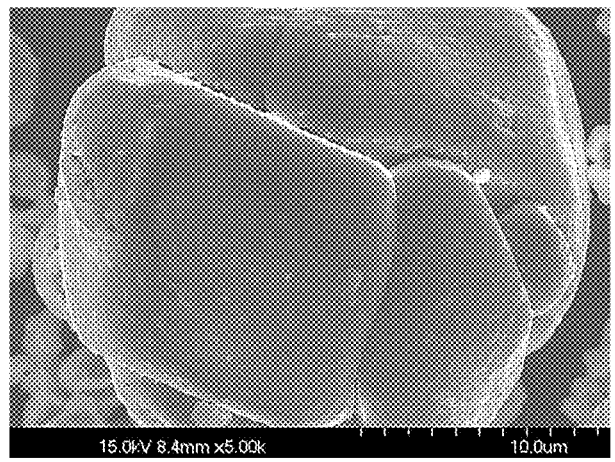
Figure 3E:
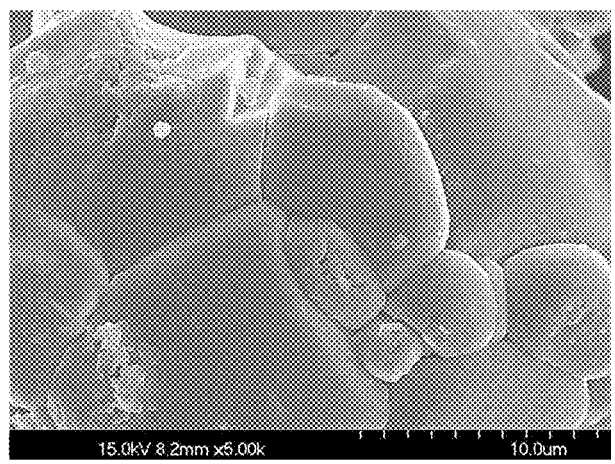
Figure 3F:
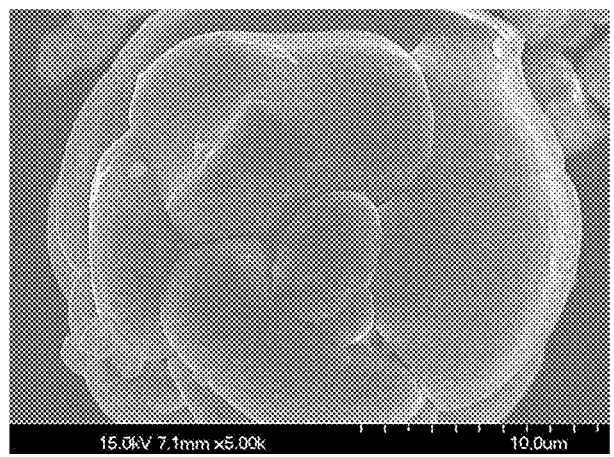

In further variations, a cathode active material comprises a cathode active compound particle and a coating. FIG. 2B is a sectional view of a coated particle including a cathode active particle and a coating in accordance with an illustrative embodiment. As shown, a coated cathode active compound particle 212 can include a cathode active compound particle or a cathode active compound particle 216 and a coating 214.

The coating 214 can be an oxide material. In some variations, the coating may be a layer of material in contact with a surface of the cathode active compound particle or a reaction layer formed along the surface of the cathode active compound particle. In some variations, the coating can include an $Al_2O_3$ coated $Li(Co, Mn, M)O_2$ creating a doping-coating that has a pronounced concentration gradient of Al from the surface towards the bulk material.

In various embodiments, the performance of batteries including the cathode active material can increase battery capacity and/or reduce the loss of available power in a fully charged battery over time.

The coating can be in any amount known in the art. The coating may also be a continuous coating or a discontinuous coating. Non-limiting examples of discontinuous coatings include coatings with voids or cracks and coatings formed of particles with gaps there between. Other types of discontinuous coatings are possible.

A powder comprising the particles described herein can be used as a cathode active material in a lithium ion battery. Such cathode active materials can tolerate voltages equal to or higher than conventional materials (i.e., relative to a $Li/Li^+$ redox couple) without severe capacity fade. Capacity fade degrades battery performance and may result from a structural instability of the cathode active material, a side reaction with electrolyte at high voltage, surface instability, dissolution of cathode active material into the electrolyte, or some combination thereof.

In various aspects, the cathode active materials described herein can result in lithium ion batteries that can be charged at high voltages without severe capacity fade. Without wishing to be held to a specific mechanisms or mode of action, the compounds may impede or retard structural deviations from an $\alpha$-$NaFeO_2$ crystal structure during charging to/at higher voltages.

Batteries having cathode active materials that include the disclosed coatings can show improved battery performance. For example, the annealed oxide coated particles provide for an increased battery capacity and an increase average voltage and also an increased discharge energy over cycles.

Cathode Active Compounds

Lithium cobalt oxides can be used in cathode active materials for commercial lithium-ion batteries. These compounds often include lithium cobalt oxide or derivatives thereof. The performance of such cathode active materials can be increased by improving its capacity, working voltage, and gravimetric electrode density.

The morphology of particles can also influence the performance of cathode active materials. Particles can include primary and secondary particles. Primary particle and secondary particle size distribution, shape, and porosity can impact the density of lithium cobalt oxide electrodes. Secondary particles are comprised of agglomerates of the smaller, primary particles, which are also often referred to as grains. Control of the secondary particle characteristics of shape and density can be gained.

The performance of batteries can be improved using compounds and particles that provide increased capacity, working voltage, and gravimetric electrode density. These and other needs are addressed by the disclosure herein.

In one variation, the disclosure is directed to cathode active materials that include one or more particles coated with $Al_2O_3$. The coated particles after annealing at 700° C. or higher include a compound represented by a compound of Formula (I):

$$Li_\alpha Co_{1-x-y-z} Mn_x Me_z Al_y O_\delta \tag{I}$$

wherein $0.95 \leq \alpha \leq 1.30$, $0 < x \leq 0.05$, $300$ ppm $\leq y \leq 10{,}000$ ppm, $0 \leq z \leq 0.1$, and $1.98 \leq \delta \leq 2.04$, where Me is at least one element selected from Ni, B, Na, Mg, Ti, Ca, V, Cr, Fe, Cu, Zn, Sc, Y, Ga, Zr, La, Ru, and Mo. In the formula, α, x, z, and δ for Li, Mn, Me and O, respectively, are in mole, while y for Al is in ppm.

In some variations, y can include the doped Al and diffused Al from $Al_2O_3$ coating, where y is equal to a sum of $y_1$ and $y_2$, where $y_1$ includes Al from the $Al_2O_3$ coating, and wherein $y_2$ includes doped Al. In some variations, $y_1$ may range from 300 ppm to 10,000 ppm and/or $y_2$ may range from 0 to 10,000 ppm.

The conversion of y in ppm to mole is given by Equation (1) as below:

$$y(\text{Al ppm in weight}) = [\text{Al Atomic mass} * \text{Al mole ratio in formula}]/[Li_\alpha Co_{1-x-y-z} Mn_x Me_z Al_y O_\delta \text{mole mass}] * 1000000 \quad \text{Equation (1)}$$

In some variations, y can include the doped Al, while the coating can be other oxides than $Al_2O_3$, such as $La_2O_3$, MgO, $ZrO_2$, $TiO_2$, among others. The conversion of z in ppm to mole is given by Equation (2) as below:

$$z(\text{Me ppm in weight}) = [\text{Me Atomic mass} * \text{Me mole ratio in formula}]/[Li_\alpha Co_{1-x-y-z} Mn_x Me_z Al_y O_\delta \text{mole mass}] * 1000000 \quad \text{Equation (2)}$$

In Equation (2), Me can be La, Mg, Zr, Ti, among others.

In some variations, a is greater than or equal to 0.95. In some variations, a is greater than or equal to 0.96. In some variations, a is greater than or equal to 0.97. In some variations, a is greater than or equal to 0.98. In some variations, a is greater than or equal to 0.99. In some variations, α is less than 1.0. In some variations, α is less than or equal to 0.99. In some variations, α is less than or equal to 0.98. In some variations, α is less than or equal to 0.97. In some variations, α is less than or equal to 0.96. It will be understood that a can be any of the variations above, in combination with other variations, and in any combination with any other quantities of any other element in the formulae disclosed herein.

In some variations, $0<x\leq0.05$. In some variations, x is greater than 0. In some variations, x is greater than or equal to 0.01. In some variations, x is greater than or equal to 0.02. In some variations, x is greater than or equal to 0.03. In some variations, x is greater than or equal to 0.04. In some variations, x is less than or equal to 0.05. In some variations, x is less than or equal to 0.04. In some variations, x is less than or equal to 0.03. In some variations, x is less than or equal to 0.02. In some variations, x is less than or equal to 0.01. It will be understood that x can be any of the variations above, in combination with other variations, and in any combination with any other quantities of any other element in the formulae disclosed herein.

In some variations, 300 ppm$\leq y\leq$10,000 ppm. In some variations, y is greater than or equal to 300 ppm. In some variations, y is greater than or equal to 1000 ppm. In some variations, y is greater than or equal to 2000 ppm. In some variations, y is greater than or equal to 3000 ppm. In some variations, y is greater than or equal to 4000 ppm. In some variations, y is greater than or equal to 5000 ppm. In some variations, y is greater than or equal to 6000 ppm. In some variations, y is greater than or equal to 7000 ppm. In some variations, y is greater than or equal to 8000 ppm. In some variations, y is greater than or equal to 9000 ppm. In some variations, y is less than or equal to 10,000 ppm. In some variations, y is less than or equal to 9000 ppm. In some variations, y is less than or equal to 8000 ppm. In some variations, y is less than or equal to 7000 ppm. In some variations, y is less than or equal to 6000 ppm. In some variations, y is less than or equal to 5000 ppm. In some variations, y is less than or equal to 4000 ppm. In some variations, y is less than or equal to 3000 ppm. In some variations, y is less than or equal to 2000 ppm. In some variations, y is less than or equal to 1000 ppm. It will be understood that y can be any of the variations above, in combination with other variations, and in any combination with any other quantities of any other element in the formulae disclosed herein.

In some variations, $0\leq z\leq0.1$. In some variations, z is 0. In some variations, $0<z$. In some variations, $0.01\leq z$. In some variations, $0.02\leq z$. In some variations, $0.03\leq z$. In some variations, $0.04\leq z$. In some variations, $0.05\leq z$. In some variations, $0.06\leq z$. In some variations, $0.07\leq z$. In some variations, $0.08\leq z$. In some variations, $0.09\leq z$. In some variations, $z\leq0.10$. In some variations, $z\leq0.09$. In some variations, $z\leq0.08$. In some variations, $z\leq0.07$. In some variations, $z\leq0.06$. In some variations, $z\leq0.05$. In some variations, $z\leq0.04$. In some variations, $z\leq0.03$. In some variations, $z\leq0.02$. In some variations, $z\leq0.01$. In some variations, $z\leq0.10$. In some variations, $z\leq0.10$. It will be understood that z can be any of the variations above, in combination with other variations, and in any combination with any other quantities of any other element in the formulae disclosed herein.

In some variations, $1.98\leq\delta\leq2.04$.

The compound of Formula (I) can be a single phase. The compound can have trigonal $R\bar{3}m$ crystal structure.

In some variations, the disclosure is directed to cathode active materials that include one or more particles coated with $Al_2O_3$. The coated particles after annealing at 700° C. or higher include a compound that can be a two phase solid solution represented by Formula (II):

$$(x)[Li_2MnO_3]\cdot(1-x)[Li_\beta Co_{(1-u-w-v)}Mn_u Me_v Al_w O_2] \quad \text{(II)}$$

where w includes the doped Al and diffused Al from $Al_2O_3$ coating, where Me is at least one element selected from Ni, B, Na, Mg, Ti, Ca, V, Cr, Fe, Cu, Zn, Sc, Y, Ga, Zr, La, Ru, and Mo.

In such variations, $Li_2MnO_3$ can be a "rock salt" phase having a monoclinic C2/m crystal structure. Thus, cathode active materials based on the solid solution between $Li_2MnO_3$ and $Li_\beta Co_{1-w}Al_w O_2$ have portions of "rock salt" phase that exhibit the monoclinic C2/m crystal structure. This "rock salt" phase can occur in addition to any phases associated with $Li_\beta Co_{1-u-w-v}Mn_u Me_v Al_w O_2$, making the solid solution bi-phasic (or multi-phasic)

Without wishing to be held to any particular mechanism or mode of action, manganese is incorporated into the compounds of Formula (II) to stabilize its $R\bar{3}m$ crystal structure, although other constituents of Mn may also contribute to stabilization. The compounds include a sub-lattice of Co in their $R\bar{3}m$ crystal structures in which Mn is uniformly distributed. Alternatively, in some variations, clusters of manganese (e.g., pairs, triplets, etc.) occur in the sub-lattice of Co that are uniformly distributed therein. Clustering can be detected, for example, by nuclear magnetic resonance (NMR) as described herein. The presence of Mn in the compounds may limit phase transitions from the $R\bar{3}m$ crystal structure during battery operation (e.g., charging, discharging, etc.). The presence of Mn may also improve an oxidative stability of the compound at higher voltages (e.g., voltages equal to or greater than 4.0V).

In some variations, x is at least 0.001. In some variations, x is at least 0.01. In some variations, x is at least 0.02. In some variations, x is at least 0.03. In some variations, x is at least 0.04. In some variations, x is at least 0.05. In some variations, x is at least 0.06. In some variations, x is at least 0.07. In some variations, x is at least 0.08. In some variations, x is at least 0.09. In some variations, x is at least 0.12. In some variations, x is at least 0.14. In some variations, x is at least 0.16. In some variations, x is at least 0.18. In some variations, x is at least 0.20. In some variations, x is at least 0.22. In some variations, x is at least 0.24. In some variations, x is at least 0.26. In some variations, x is at least 0.28.

In some variations, x is less than or equal to 0.30. In some variations, x is less than or equal to 0.28. In some variations, x is less than or equal to 0.26. In some variations, x is less than or equal to 0.24. In some variations, x is less than or equal to 0.22. In some variations, x is less than or equal to 0.20. In some variations, x is less than or equal to 0.18. In some variations, x is less than or equal to 0.16. In some variations, x is less than or equal to 0.14. In some variations, x is less than or equal to 0.12. In some variations, x is less than or equal to 0.10. In some variations, x is less than or equal to 0.09. In some variations, x is less than or equal to 0.08. In some variations, x is less than or equal to 0.07. In some variations, x is less than or equal to 0.06. In some variations, x is less than or equal to 0.05. In some variations, x is less than or equal to 0.04. In some variations, x is less than or equal to 0.03.

In some variations, $\beta$ is greater than or equal to 0.95. In some variations, $\beta$ is greater than or equal to 0.96. In some variations, $\beta$ is greater than or equal to 0.97. In some variations, $\beta$ is greater than or equal to 0.98. In some variations, $\beta$ is greater than or equal to 0.99. In some variations, $\beta$ is less than 1.0. In some variations, $\beta$ is less than or equal to 0.99. In some variations, $\beta$ is less than or equal to 0.98. In some variations, $\beta$ is less than or equal to 0.97. In some variations, $\beta$ is less than or equal to 0.96.

In some variations, $0 \leq u \leq 0.05$. In some variations, u is 0. In some variations, $0 < u$. In some variations, $0.01 \leq v$. In some variations, $0.02 \leq u$. In some variations, $0.03 < u$. In some variations, $0.04 \leq u$. In some variations, $0.05 \leq u$.

In some variations, $0 \leq v \leq 0.1$. In some variations, v is 0. In some variations, $0 < v$. In some variations, $0.01 \leq v$. In some variations, $0.02 \leq z$. In some variations, $0.03 \leq v$. In some variations, $0.04 \leq v$. In some variations, $0.05 \leq v$. In some variations, $0.06 \leq v$. In some variations, $0.07 \leq v$. In some variations, $0.08 \leq v$. In some variations, $0.09 \leq v$. In some variations, $v \leq 0.10$. In some variations, $v \leq 0.09$. In some variations, $v \leq 0.08$. In some variations, $v \leq 0.07$. In some variations, $v \leq 0.06$. In some variations, $v \leq 0.05$. In some variations, $v \leq 0.04$. In some variations, $v \leq 0.03$. In some variations, $v \leq 0.02$. In some variations, $v \leq 0.01$. In some variations, $v \leq 0.10$. In some variations, $v \leq 0.10$. It will be understood that v can be any of the variations above, in combination with other variations, and in any combination with any other quantities of any other element in the formulae disclosed herein.

In some variations, 300 ppm≤w≤10,000 ppm. In some variations, w is greater than or equal to 300 ppm. In some variations, w is greater than or equal to 1000 ppm. In some variations, w is greater than or equal to 2000 ppm. In some variations, w is greater than or equal to 3000 ppm. In some variations, w is greater than or equal to 4000 ppm. In some variations, w is greater than or equal to 5000 ppm. In some variations, w is greater than or equal to 6000 ppm. In some variations, w is greater than or equal to 7000 ppm. In some variations, w is greater than or equal to 8000 ppm. In some variations, w is greater than or equal to 9000 ppm. In some variations, w is less than or equal to 10,000 ppm. In some variations, w is less than or equal to 9000 ppm. In some variations, w is less than or equal to 8000 ppm. In some variations, w is less than or equal to 7000 ppm. In some variations, w is less than or equal to 6000 ppm. In some variations, w is less than or equal to 5,000 ppm. In some variations, w is less than or equal to 4000 ppm. In some variations, w is less than or equal to 3000 ppm. In some variations, w is less than or equal to 2000 ppm. In some variations, w is less than or equal to 1000 ppm.

The particle can be further described by the amount, or ratios, of various elemental components at the particle surface, or at a measured point beneath the particle's surface.

Particle Surface Atomic Percentage of Al, Co, and Mn

In some variation, the average particle surface can have an average percentage of different elements. This percentage at the surface is calculated from the total of significant elements measured in an XPS scan including: Al, C (~20-30% stemming from the environment), Co, Mg, Mn, O (50-60% from the oxide), and Ti. The metals are added as coatings and dopants in varying levels.

In one variations, at the average particle surface: the average atomic percent of Al is less or equal to 14; the average atomic percent of Co is at least 5; and/or the average atomic percent of Mn is at least 1.0.

In some variations, the average atomic percent of Al at the particle surface is less or equal to 4. In some variations, the average atomic percent of Al at the particle surface is less or equal to 5. In some variations, the average atomic percent of Al at the particle surface is less or equal to 8. In some variations, the average atomic percent of Al at the particle surface is less or equal to 7. In some variations, the average atomic percent of Al at the particle surface is less or equal to 8. In some variations, the average atomic percent of Al at the particle surface is less or equal to 9. In some variations, the average atomic percent of Al at the particle surface is less or equal to 10. In some variations, the average atomic percent of Al at the particle surface is less or equal to 11. In some variations, the average atomic percent of Al at the particle surface is less or equal to 12. In some variations, the average atomic percent of Al at the particle surface is less or equal to 13. In some variations, the average atomic percent of Al at the particle surface is less or equal to 14. In some variations, the average atomic percent of Al at the particle surface is at least 0.5. In some variations, the average atomic percent of Al at the particle surface is at least 1.0.

In some variations, the average atomic percent of Co at the particle surface is at least 5. In some variations, the average atomic percent of Co at the particle surface is at least 5.5. In some variations, the average atomic percent of Co at the particle surface is at least 6. In some variations, the average atomic percent of Co at the particle surface is at least 7. In some variations, the average atomic percent of Co at the particle surface is at least 8. In some variations, the average atomic percent of Co at the particle surface is at least 9. In some variations, the average atomic percent of Co at the particle surface is at least 10. In some variations, the average atomic percent of Co at the particle surface is at least 11. In some variations, the average atomic percent of Co at the particle surface is at least 12. In some variations, the average atomic percent of Co at the particle surface is at least 13.

In some variations, the average atomic percent of Mn at the particle surface is at least 1.0. In some variations, the average atomic percent of Mn at the particle surface is at least 1.5. In some variations, the average atomic percent of Mn at the particle surface is at least 2. In some variations, the average atomic percent of Mn at the particle surface is at least 2.5. In some variations, the average atomic percent of Mn at the particle surface is at least 3.

Average Atomic Percentage of Al, Co, and Mn at 10 nm Beneath the Average Particle Surface In another variation, at an average of 10 nm beneath the particle surface, the average atomic percent of Al is less than or equal to 6. In some variations, the average atomic percent of Al at an average of 10 nm below the particle surface is less than or equal to 5.5. In some variations, the average atomic percent of Al at an average of 10 nm below the particle surface is less than or equal to 5.0. In some variations, the average atomic percent of Al at an average of 10 nm below the particle surface is less than or equal to 4.5. In some variations, the average atomic percent of Al at an average of 10 nm below the particle surface is less than or equal to 4.0. In some variations, the average atomic percent of Al at an average of 10 nm below the particle surface is less than or equal to 3.5.

In another variation, at an average 10 nm beneath the particle surface, the average atomic percent of Co is at least 12.0. In some variations, the average atomic percent of Co at an average of 10 nm below the particle surface is at least 12.5. In some variations, the average atomic percent of Co at an average of 10 nm below the particle surface is at least 13.0. In some variations, the average atomic percent of Co at an average of 10 nm below the particle surface is at least 13.5. In some variations, the average atomic percent of Co at an average of 10 nm below the particle surface is at least 14.0. In some variations, the average atomic percent of Co at an average of 10 nm below the particle surface is at least 14.5. In some variations, the average atomic percent of Co at an average of 10 nm below the particle surface is at least 15.0. In some variations, the average atomic percent of Co at an average of 10 nm below the particle surface is at least 15.5. In some variations, the average atomic percent of Co at an average of 10 nm below the particle surface is at least 14. In some variations, the average atomic percent of Co at an average of 10 nm below the particle surface is at least 15. In some variations, the average atomic percent of Co at an average of 10 nm below the particle surface is at least 15.5. In some variations, the average atomic percent of Co at an average of 10 nm below the particle surface is at least 16.0. In some variations, the average atomic percent of Co at an average of 10 nm below the particle surface is at least 16.5. In some variations, the average atomic percent of Co at an average of 10 nm below the particle surface is at least 17.0. In some variations, the average atomic percent of Co at an average of 10 nm below the particle surface is at least 17.5.

In another variation, at a average 10 nm beneath the particle surface, the average atomic percent of Mn is at least 1.0. In some variations, the average atomic percent of Mn at an average of 10 nm below the particle surface is at least 1.5. In some variations, the average atomic percent of Mn at an average of 10 nm below the particle surface is at least 2.0. In some variations, the average atomic percent of Mn at an average of 10 nm below the particle surface is at least 2.5. In some variations, the average atomic percent of Mn at an average of 10 nm below the particle surface is at least 3.0.

Elemental Composition—Surface Molar Ratio of Al/Co and Mn/Co

In some variations, the amount of Al in the Al oxide coating may be equal to or greater than 300 ppm. In some variations, the amount of Al in the Al oxide coating may be equal to or greater than 400 ppm. In some variations, the amount of Al in the Al oxide coating may be equal to or greater than 500 ppm. In some variations, the amount of Al in the Al oxide coating may be equal to or greater than 600 ppm. In some variations, the amount of Al in the Al oxide coating may be equal to or greater than 700 ppm. In some variations, the amount of Al in the Al oxide coating may be equal to or greater than 800 ppm. In some variations, the amount of Al in the Al oxide coating may be equal to or greater than 900 ppm. In some variations, the amount of Al in the Al oxide coating may be equal to or greater than 1,000 ppm. In some variations, the amount of Al in the Al oxide coating may be equal to or greater than 2,000 ppm. In some variations, the amount of Al in the Al oxide coating may be equal to or greater than 3,000 ppm. In some variations, the amount of Al in the Al oxide coating may be equal to or greater than 4,000 ppm. In some variations, the amount of Al in the Al oxide coating may be equal to or greater than 5,000 ppm. In some variations, the amount of Al in the Al oxide coating may be equal to or greater than 6,000 ppm. In some variations, the amount of Al in the Al oxide coating may be equal to or greater than 7,000 ppm. In some variations, the amount of Al in the Al oxide coating may be equal to or greater than 8,000 ppm. In some variations, the amount of Al in the Al oxide coating may be equal to or greater than 9,000 ppm. In some variations, the amount of Al in the Al oxide coating may be equal to or less than 10,000 ppm. In some variations, the amount of Al in the Al oxide coating may be equal to or less than 9,000 ppm. In some variations, the amount of Al in the Al oxide coating may be equal to or less than 8,000 ppm. In some variations, the amount of Al in the Al oxide coating may be equal to or less than 7,000 ppm. In some variations, the amount of Al in the Al oxide coating may be equal to or less than 6,000 ppm. In some variations, the amount of Al in the Al oxide coating may be equal to or less than 5,000 ppm. In some variations, the amount of Al in the Al oxide coating may be equal to or less than 4,000 ppm. In some variations, the amount of Al in the Al oxide coating may be equal to or less than 3,000 ppm. In some variations, the amount of Al in the Al oxide coating may be equal to or less than 2,000 ppm. In some variations, the amount of Al in the Al oxide coating may be equal to or less than 1,000 ppm.

In another variation, the average particle surface has an average atomic percent ratio of Al/Co and/or Mn/Co.

In some variations, the surface molar ratio of Al/Co can be at least 0.20. In some variations, the surface molar ratio of Al/Co can be at least 0.25. In some variations, the surface molar ratio of Al/Co can be at least 0.30. In some variations, the surface molar ratio of Al/Co can be at least 0.35. In some variations, the surface molar ratio of Al/Co can be at least 0.40. In some variations, the surface molar ratio of Al/Co can be at least 0.45. In some variations, the surface molar ratio of Al/Co can be at least 0.50. In some variations, the surface molar ratio of Al/Co can be at least 0.55. In some variations, the surface molar ratio of Al/Co can be at least 0.60. In some variations, the surface molar ratio of Al/Co can be at least 0.65. In some variations, the surface molar ratio of Al/Co can be at least 0.70.

In some variations, the surface molar ratio of Al/Co can be less than or equal to 0.75. In some variations, the surface molar ratio of Al/Co can be less than or equal to 0.70. In some variations, the surface molar ratio of Al/Co can be less than or equal to 0.65. In some variations, the surface molar ratio of Al/Co can be less than or equal to 0.60. In some variations, the surface molar ratio of Al/Co can be less than or equal to 0.55. In some variations, the surface molar ratio of Al/Co can be less than or equal to 0.50. In some variations, the surface molar ratio of Al/Co can be less than or equal to 0.45. In some variations, the surface molar ratio of Al/Co can be less than or equal to 0.40. In some variations, the surface molar ratio of Al/Co can be less than or equal to 0.35. In some variations, the surface molar ratio of Al/Co can be less than or equal to 0.30.

In another variation, the average particle surface has an average surface atomic percent ratio of Mn/Co. In some variations, the average particle surface has an average surface atomic percent ratio of Mn/Co of at least 0.02. In some variations, the average particle surface has an average surface atomic percent ratio of Mn/Co of at least 0.04. In some variations, the average particle surface has an average surface atomic percent ratio of Mn/Co of at least 0.06. In some variations, the average particle surface has an average surface atomic percent ratio of Mn/Co of at least 0.08. In some variations, the average particle surface has an average surface atomic percent ratio of Mn/Co of at least 0.10. In some variations, the average particle surface has an average surface atomic percent ratio of Mn/Co of at least 0.12. In some variations, the average particle surface has an average surface atomic percent ratio of Mn/Co of at least 0.14. In some variations, the average particle surface has an average surface atomic percent ratio of Mn/Co of at least 0.16. In some variations, the average particle surface has an average surface atomic percent ratio of Mn/Co of at least 0.18.

It will be appreciated by those skilled in the art that the ratios of Al/Co and Mn/Co may vary with the amount of Al in the Al oxide coating and/or annealing temperature.

Elemental Composition—Surface Molar Ratio of La/Co

In some variations, the oxide coating may include other oxides, such as La oxide (e.g. $La_2O_3$) or a mixture of $La_2O_3$ with other oxides (e.g. $Al_2O_3$) among others.

In some variations, the amount of La in the La oxide coating may be equal to or greater than 300 ppm. In some variations, the amount of La in the La oxide coating may be equal to or greater than 400 ppm. In some variations, the amount of La in the La oxide coating may be equal to or greater than 500 ppm. In some variations, the amount of La in the La oxide coating may be equal to or greater than 600 ppm. In some variations, the amount of La in the La oxide coating may be equal to or greater than 700 ppm. In some variations, La in the La oxide coating may be equal to or greater than 800 ppm. In some variations, the amount of La in the La oxide coating may be equal to or greater than 900 ppm. In some variations, the amount of La in the La oxide coating may be equal to or greater than 1,000 ppm. In some variations, the amount of La in the La oxide coating may be equal to or greater than 2,000 ppm. In some variations, the amount of La in the La oxide coating may be equal to or greater than 3,000 ppm. In some variations, the amount of La in the La oxide coating may be equal to or greater than 4,000 ppm. In some variations, the amount of La in the La oxide coating may be equal to or greater than 5,000 ppm. In some variations, the amount of La in the La oxide coating may be equal to or greater than 6,000 ppm. In some variations, the amount of La in the La oxide coating may be equal to or greater than 7,000 ppm. In some variations, the amount of La in the La oxide coating may be equal to or greater than 8,000 ppm. In some variations, the amount of La in the La oxide coating may be equal to or greater than 9,000 ppm.

In some variations, the amount of La in the La oxide coating may be equal to or less than 10,000 ppm. In some variations, the amount of La in the La oxide coating may be equal to or less than 9,000 ppm. In some variations, the amount of La in the La oxide coating may be equal to or less than 8,000 ppm. In some variations, the amount of La in the La oxide coating may be equal to or less than 7,000 ppm. In some variations, the amount of La in the La oxide coating may be equal to or less than 6,000 ppm. In some variations, the amount of La in the La oxide coating may be equal to or less than 5,000 ppm. In some variations, the amount of La in the La oxide coating may be equal to or less than 4,000 ppm. In some variations, the amount of La in the La oxide coating may be equal to or less than 3,000 ppm. In some variations, the amount of La in the La oxide coating may be equal to or less than 2,000 ppm. In some variations, the amount of La in the La oxide coating may be equal to or less than 1,000 ppm.

In some variations, the surface molar ratio of La/Co may be equal to or greater than 0.06. In some variations, the surface molar ratio of La/Co may be equal to or greater than 0.08. In some variations, the surface molar ratio of La/Co may be equal to or greater than 0.10. In some variations, the surface molar ratio of La/Co may be equal to or greater than 0.12. In some variations, the surface molar ratio of La/Co may be equal to or greater than 0.14. In some variations, the surface molar ratio of La/Co may be equal to or greater than 0.16. In some variations, the surface molar ratio of La/Co may be equal to or greater than 0.18. In some variations, the surface molar ratio of La/Co may be equal to or greater than 0.20.

Elemental Composition—Surface Molar Ratio of Mg/Co

In some variations, the oxide coating may include Mg oxide (MgO) or a mixture of MgO with other oxides among others.

In some variations, the amount of Mg in the Mg oxide coating may be equal to or greater than 300 ppm. In some variations, the amount of Mg in the Mg oxide coating may be equal to or greater than 400 ppm. In some variations, the amount of Mg in the Mg oxide coating may be equal to or greater than 500 ppm. In some variations, the amount of Mg in the Mg oxide coating may be equal to or greater than 600 ppm. In some variations, the amount of Mg in the Mg oxide coating may be equal to or greater than 700 ppm. In some variations, the amount of Mg in the Mg oxide coating may be equal to or greater than 800 ppm. In some variations, the amount of Mg in the Mg oxide coating may be equal to or greater than 900 ppm. In some variations, the amount of Mg in the Mg oxide coating may be equal to or greater than 1,000 ppm. In some variations, the amount of Mg in the Mg oxide coating may be equal to or greater than 2,000 ppm. In some variations, the amount of Mg in the Mg oxide coating may be equal to or greater than 3,000 ppm. In some variations, the amount of Mg in the Mg oxide coating may be equal to or greater than 4,000 ppm.

In some variations, the amount of Mg in the Mg oxide coating may be equal to or less than 5,000 ppm. In some variations, the amount of Mg in the Mg oxide coating may be equal to or less than 4,000 ppm. In some variations, the amount of Mg in the Mg oxide coating may be equal to or less than 3,000 ppm. In some variations, the amount of Mg in the Mg oxide coating may be equal to or less than 2,000 ppm. In some variations, the amount of Mg in the Mg oxide coating may be equal to or less than 1,000 ppm.

In some variations, the surface molar ratio of Mg/Co may be equal to or greater than 0.20. In some variations, the surface molar ratio of Mg/Co may be equal to or greater than 0.25. In some variations, the surface molar ratio of Mg/Co may be equal to or greater than 0.30. In some variations, the surface molar ratio of Mg/Co may be equal to or greater than 0.35. In some variations, the surface molar ratio of Mg/Co may be equal to or greater than 0.40. In some variations, the surface molar ratio of Mg/Co may be equal to or greater than 0.45. In some variations, the surface molar ratio of Mg/Co may be equal to or greater than 0.50. In some variations, the surface molar ratio of Mg/Co may be equal to or greater than 0.55. In some variations, the surface molar ratio of Mg/Co may be equal to or greater than 0.60.

Elemental Composition—Surface Molar Ratio of Ti/Co

In some variations, the oxide coating may include Ti oxide ($TiO_2$) or a mixture of $TiO_2$ with other oxides among others.

In some variations, the amount of Ti in the Ti oxide coating may be equal to or greater than 300 ppm. In some variations, the amount of Ti in the Ti oxide coating may be equal to or greater than 400 ppm. In some variations, the amount of Ti in the Ti oxide coating may be equal to or greater than 500 ppm. In some variations, the amount of Ti in the Ti oxide coating may be equal to or greater than 600 ppm. In some variations, the amount of Ti in the Ti oxide coating may be equal to or greater than 700 ppm. In some variations, the amount of Ti in the Ti oxide coating may be equal to or greater than 800 ppm. In some variations, the amount of Ti in the Ti oxide coating may be equal to or greater than 900 ppm. In some variations, the amount of Ti in the Ti oxide coating may be equal to or greater than 1,000 ppm. In some variations, the amount of Ti in the Ti oxide coating may be equal to or greater than 2,000 ppm. In some variations, the amount of Ti in the Ti oxide coating may be equal to or greater than 3,000 ppm. In some variations, the amount of Ti in the Ti oxide coating may be equal to or greater than 4,000 ppm.

In some variations, the amount of Ti in the Ti oxide coating may be equal to or less than 5,000 ppm. In some variations, the amount of Ti in the Ti oxide coating may be equal to or less than 4,000 ppm. In some variations, the amount of Ti in the Ti oxide coating may be equal to or less than 3,000 ppm. In some variations, the amount of Ti in the Ti oxide coating may be equal to or less than 2,000 ppm. In some variations, the amount of Ti in the Ti oxide coating may be equal to or less than 1,000 ppm.

In some variations, the surface molar ratio of Ti/Co may be equal to or greater than 0.08. In some variations, the surface molar ratio of Ti/Co may be equal to or greater than 0.10. In some variations, the surface molar ratio of Ti/Co may be equal to or greater than 0.12. In some variations, the surface molar ratio of Ti/Co may be equal to or greater than 0.14. In some variations, the surface molar ratio of Ti/Co may be equal to or greater than 0.16. In some variations, the surface molar ratio of Ti/Co may be equal to or greater than 0.18. In some variations, the surface molar ratio of Ti/Co may be equal to or greater than 0.20.

Elemental Composition—Surface Molar Ratio of Zr/Co

In some variations, the oxide coating may include Zr oxide ($ZrO_2$) or a mixture of $ZrO_2$ with other oxides among others.

In some variations, the amount of Zr in the Zr oxide coating may be equal to or greater than 300 ppm. In some variations, the amount of Zr in the Zr oxide coating may be equal to or greater than 400 ppm. In some variations, the amount of Zr in the Zr oxide coating may be equal to or greater than 500 ppm. In some variations, the amount of Zr in the Zr oxide coating may be equal to or greater than 600 ppm. In some variations, the amount of Zr in the Zr oxide coating may be equal to or greater than 700 ppm. In some variations, the amount of Zr in the Zr oxide coating may be equal to or greater than 800 ppm. In some variations, the amount of Zr in the Zr oxide coating may be equal to or greater than 900 ppm. In some variations, the amount of Zr in the Zr oxide coating may be equal to or greater than 1,000 ppm. In some variations, the amount of Zr in the Zr oxide coating may be equal to or greater than 2,000 ppm. In some variations, the amount of Zr in the Zr oxide coating may be equal to or greater than 3,000 ppm. In some variations, the amount of Zr in the Zr oxide coating may be equal to or greater than 4,000 ppm.

In some variations, the amount of Zr in the Zr oxide coating may be equal to or less than 5,000 ppm. In some variations, the amount of Zr in the Zr oxide coating may be equal to or less than 4,000 ppm. In some variations, the amount of Zr in the Zr oxide coating may be equal to or less than 3,000 ppm. In some variations, the amount of Zr in the Zr oxide coating may be equal to or less than 2,000 ppm. In some variations, the amount of Zr in the Zr oxide coating may be equal to or less than 1,000 ppm.

In some variations, the surface molar ratio of Zr/Co may be equal to or greater than 0.020. In some variations, the surface molar ratio of Zr/Co may be equal to or greater than 0.025. In some variations, the surface molar ratio of Zr/Co may be equal to or greater than 0.030. In some variations, the surface molar ratio of Zr/Co may be equal to or greater than 0.035. In some variations, the surface molar ratio of Zr/Co may be equal to or greater than 0.040. In some variations, the surface molar ratio of Zr/Co may be equal to or greater than 0.045. In some variations, the surface molar ratio of Zr/Co may be equal to or greater than 0.050. In some variations, the surface molar ratio of Zr/Co may be equal to or greater than 0.055. In some variations, the surface molar ratio of Zr/Co may be equal to or greater than 0.060.

In some variations, the particles have a mean particle diameter greater than or equal to a first lower limit. In some variations, the particle has a mean diameter of at least 5 μm. In some variations, the particle has a mean diameter of at least 10 μm. In some variations, the particle has a mean diameter of at least 15 μm. In some variations, the particle has a mean diameter of at least 20 μm. In some variations, the particle has a mean diameter of at least 25 μm.

In some variations, the particles have a mean particle diameter less than or equal to a first upper limit. In some variations, the particle has a mean diameter of less than or equal to 30 μm. In some variations, the particle has a mean diameter of less than or equal to 25 μm. In some variations, the particle has a mean diameter of less than or equal to 20 μm. In some variations, the particle has a mean diameter of less than or equal to 15 μm. In some variations, the particle has a mean diameter of less than or equal to 10 μm. In some variations, the particle has a mean diameter of less than or equal to 5 μm.

It will be understood that the first lower and upper limits may be combined in any variation as above to define a first range for the mean particle diameter. For example, and without limitation, the mean particle diameter may range from 10 μm to 20 μm. In another non-limiting example, the mean particle diameter may range from 20 μm to 25 μm. Other ranges are possible. The particles having the aforementioned mean particle diameters, whether characterized by the first lower limit, the first upper limit, or both (i.e., the first range), may be processed according to a co-precipitation method.

In some variations, the primary particles have a mean particle diameter greater than or equal to a second lower limit. In some variations, the primary particle has a mean diameter of at least 200 nm. In some variations, the primary particle has a mean diameter of at least 300 nm. In some variations, the primary particle has a mean diameter of at least 400 nm. In some variations, the primary particle has a mean diameter of at least 500 nm. In some variations, the primary particle has a mean diameter of at least 600 nm. In some variations, the particle has a mean diameter of at least 700 nm.

In some variations, the primary particles have a mean particle diameter less than or equal to a second upper limit. In some variations, the primary particle has a mean diameter of less than or equal to 800 nm. In some variations, the primary particle has a mean diameter of less than or equal to 700 nm. In some variations, the primary particle has a mean diameter of less than or equal to 600 nm. In some variations, the primary particle has a mean diameter of less than or equal to 500 nm. In some variations, the primary particle has a mean diameter of less than or equal to 400 nm. In some variations, the primary particle has a mean diameter of less than or equal to 300 nm.

It will be understood that the second lower and upper limits may be combined in any variation as above to define a second range for the mean particle diameter of the primary particle. For example, and without limitation, the mean particle diameter may range from 300 nm to 500 nm. In another non-limiting example, the mean particle diameter may range from 400 nm to 800 nm. Other ranges are possible. The particles having the aforementioned mean particle diameters, whether characterized by the second lower limit, the second upper limit, or both (i.e., the second range), may be processed according to a sol-gel method.

In some variations, the secondary particles are formed of agglomerated primary particles. The agglomerated primary particles may be sintered together. In some instances, the secondary particles have a mean particle diameter greater than or equal to a lower limit. Non-limiting examples of the lower limit of the secondary particles include 15 µm, 20 µm, and 25 µm. In some instances, the secondary particles have a mean particle diameter less than or equal to an upper limit. Non-limiting examples of the upper limit include 30 µm, 25 µm, and 20 µm. It will be understood that the lower and upper limits may be combined in any variation as above to define a range for the mean particle diameter. For example, and without limitation, the mean particle diameter may range from 15 µm to 20 µm. In another non-limiting example, the mean particle diameter may range from 20 µm to 25 µm. Other ranges are possible.

In some variations, a single primary particle occupies a percentage of a volume occupied by a corresponding secondary particle. In some instances, the percentage is greater or equal to a lower limit. In some variations, a single primary particle occupies at least 30% of a volume occupied by a corresponding secondary particle. In some variations, a single primary particle occupies at least 35% of a volume occupied by a corresponding secondary particle. In some variations, a single primary particle occupies at least 40% of a volume occupied by a corresponding secondary particle. In some variations, a single primary particle occupies at least 45% of a volume occupied by a corresponding secondary particle. In some variations, a single primary particle occupies at least 50% of a volume occupied by a corresponding secondary particle. In some variations, a single primary particle occupies at least 55% of a volume occupied by a corresponding secondary particle. In some variations, a single primary particle occupies at least 60 of a volume occupied by a corresponding secondary particle. In some variations, a single primary particle occupies at least 65% of a volume occupied by a corresponding secondary particle.

In some variations, a single primary particle occupies less than or equal to 70% of a volume occupied by a corresponding secondary particle. In some variations, a single primary particle occupies less than or equal to 65% of a volume occupied by a corresponding secondary particle. In some variations, a single primary particle occupies less than or equal to 60% of a volume occupied by a corresponding secondary particle. In some variations, a single primary particle occupies less than or equal to 55% of a volume occupied by a corresponding secondary particle. In some variations, a single primary particle occupies less than or equal to 50% of a volume occupied by a corresponding secondary particle. In some variations, a single primary particle occupies less than or equal to 45% of a volume occupied by a corresponding secondary particle. In some variations, a single primary particle occupies less than or equal to 40% of a volume occupied by a corresponding secondary particle. In some variations, a single primary particle occupies less than or equal to 35% of a volume occupied by a corresponding secondary particle.

It will be understood that the lower and upper limits may be combined in any variation as above to define a range for the percentage. For example, and without limitation, the percentage may range from 30-50%. However, other ranges are possible.

As described herein, the larger particle sizes, and percentage of secondary particles occupied by a singled primary particle, can be formed by using higher sintering temperatures. Without wishing to be held to a particular mechanism or mode of action, in some instances the particles do not fracture as readily, and thereby can provide increased stability than conventional particles.

Including Mn and/or Al in the compound in place of Co, altering the amount of Li, and/or including an $Al_2O_3$ coating can reduce, or reduce the likelihood of, a destabilizing phase transition. Without wishing to be limited to a particular mechanism or mode of action, the additional elements also give greater oxidative stability to the compounds at higher battery upper cut-off voltages. In some variations, the compounds, particles, and/or cathode active materials can have increased stability for at least 4.4V vs. $Li^0/Li^+$.

In some variations, the particles have increased particle strength. The increased particle strength results in increased energy retention when the particles are used in a cathode active material.

In some variations, increased amount of manganese in cathode active materials provides for improved battery stability. In some variations, the increased amount of Mn increases the onset temperature of decomposition. In some variations, increased amounts of Mn can result in reduced amount of heat release at a decomposition temperature of the compound.

In some variations, the cathode active materials have a first-cycle discharge energy of at least 700 Wh/kg. In some variations, the cathode active materials have a first-cycle discharge energy of at least 725 Wh/kg. In some variations, the cathode active materials have a first-cycle discharge energy of at least 750 Wh/kg. In some variations, the cathode active materials have a first-cycle discharge energy of at least 775 Wh/kg. In some variations, the cathode active materials have a first-cycle discharge energy of at least 800 Wh/kg. In some variations, the cathode active materials have a first-cycle discharge energy of at least 825 Wh/kg. In some variations, the cathode active materials have a first-cycle discharge energy of at least 850 Wh/kg. In some variations, the cathode active materials have a first-cycle discharge energy of at least 875 Wh/kg.

In some variations, the cathode active materials have a first-cycle discharge capacity of at least 180 mAh/g. In some variations, the cathode active materials have a first-cycle discharge capacity of at least 185 mAh/g. In some variations, the cathode active materials have a first-cycle discharge capacity of at least 190 mAh/g. In some variations, the cathode active materials have a first-cycle discharge capacity of at least 195 mAh/g. In some variations, the cathode active materials have a first-cycle discharge capacity of at least 200 mAh/g. In some variations, the cathode active materials have a first-cycle discharge capacity of at least 205 mAh/g. In some variations, the cathode active materials have a first-cycle discharge capacity of at least 210 mAh/g. In some variations, the cathode active materials have a first-cycle discharge capacity of at least 215 mAh/g.

In some variations, the cathode active materials have an energy capacity retention of at least 65% after 52 charge-discharge cycles. In some variations, the cathode active materials have an energy capacity retention of at least 67% after 52 charge-discharge cycles. In some variations, the cathode active materials have an energy capacity retention of at least 69% after 52 charge-discharge cycles. In some variations, the cathode active materials have an energy capacity retention of at least 71% after 52 charge-discharge cycles. In some variations, the cathode active materials have an energy capacity retention of at least 73% after 52 charge-discharge cycles. In some variations, the cathode active materials have an energy capacity retention of at least 75% after 52 charge-discharge cycles. In some variations, the cathode active materials have an energy capacity retention of at least 77% after 52 charge-discharge cycles. In some variations, the cathode active materials have an energy capacity retention of at least 79% after 52 charge-discharge cycles. In some variations, the cathode active materials have an energy capacity retention of at least 81% after 52 charge-discharge cycles. In some variations, the cathode active materials have an energy capacity retention of at least 83% after 52 charge-discharge cycles.

Methods of Making the Cathode Active Material

The disclosure is further directed to methods of making the cathode active material. The oxide coating is prepared by mixing a cathode active compound particle with a precursor of the metals that are found in the coatings. After mixing, the mixture is calcined at elevated temperatures to decompose the precursors into oxides or to promote formation of the oxide on the cathode active compound material. The coated cathode active material is then tested as cathode in coin cells that use a Li foil anode, a separator, and flooded electrolyte solution or in single layered full pouch cells (SLP) that use a graphite as anode, a separator and electrolyte solution.

In some variations, to form $Al_2O_3$ coating, an amount of aluminum precursor needed for the desired amount of coating (e.g. 1250 ppm) was calculated based on the weighed amount of base powder. The aluminum precursor included various aluminum salts such as nano alumina, aluminum nitrate, aluminum acetate, or other aluminum salts.

Without wishing to be limited to any method of manufacture, the disclosure describes cathode active materials produced by high temperature (e.g. at least 700° C. or at least 800° C.) treating an as-prepared material with an $Al_2O_3$ coating on a cathode active material. The stabilization of lithium cobalt oxides ($LiCoO_2$) can include elements that mitigate degradation mechanisms, yet allow for more lithium to be extracted and re-inserted reversibly at higher operating voltages and temperatures. Annealing at conventional temperatures of approximately 500° C. do not achieve the compositions.

Substitution or dopant elements Al can improve one or more properties, including capacity, voltage, and/or cycle life of the active electrode material. The dopants can be distributed throughout the bulk of the material (doping), segregated to the grain boundaries within the particles, distributed in the subsurface of particles (doping-coating), or deposited on the particle free surface (coating) depending on phase relations and the processing procedure and conditions.

In various aspects, a $Al_2O_3$ coating is subjected further to a high temperature (e.g. 800° C.) to partially drive the Al inward to improve energy retention and electrode resistance. In some embodiments, the annealing temperature is equal to or greater than 700° C. In some embodiments, the annealing temperature is equal to or greater than 750° C. In some embodiments, the annealing temperature is equal to or greater than 800° C. In some embodiments, the annealing temperature is equal to or greater than 850° C. In some embodiments, the annealing temperature is equal to or greater than 900° C. In some embodiments, the annealing temperature is equal to or greater than 950° C. In some embodiments, the annealing temperature is equal to or greater than 1000° C. In some embodiments, the annealing temperature is equal to or greater than 1050° C.

In some embodiments, the annealing temperature is equal to or less than 1100° C. In some embodiments, the annealing temperature is equal to or less than 1050° C. In some embodiments, the annealing temperature is equal to or less than 1000° C. In some embodiments, the annealing temperature is equal to or less than 950° C. In some embodiments, the annealing temperature is equal to or less than 900° C. In some embodiments, the annealing temperature is equal to or less than 850° C. In some embodiments, the annealing temperature is equal to or less than 800° C.

In some embodiments, fillers may be added to the cathode active material to increase packing density. Fillers may include $TiO_2$ or MgO among others.

In various aspects, the amount of oxide coating can be chosen such that a capacity of the cathode active material is not negatively impacted.

Forming Cathode Test Electrodes

The finished cathode powder is blended with an electrically conductive powder (carbon), organic binder, and solvent to form a pourable slurry. This slurry is cast on aluminum foil and dried, forming a laminate.

The laminate is subsequently roll-calendared to compact the particulate layer to a high specific density. During calendaring, the particles flow into voids and pack together. The particles can have sufficient strength to prevent being crushed, which would create new active unprotected surfaces that will interact with the electrolyte during cell operation. The finished laminate is assembled together with a separator and anode layers and saturated with an electrolyte solution to form a Li-ion cell.

In some variations, the cathode disks can be formed from the coated powder. A mill may be used to grind powder into finer powder. The density of the cathode disk may increase by reducing the size of the powder.

The porosity of the cathode may affect the performance of an electrochemical cell. A hydraulic press may be used to compact powder to obtain a cathode disk of desired thickness and density during cold pressing. For example, the coated cathode active material was placed in a die that can be compressed up to 5000 lbs. The press includes two plates that are hydraulically forced together to create a pressure.

Testing Methods

The cathode disks were assembled into button cell (coin cell) batteries with a Li disk anode, a Celgard 2325 separator (25 µm thick), and the electrolyte consisting of 1.2 M LiPF6 in ethyl carbonate (EC) and ethyl methyl carbonate (EMC) (EC:EMC=3:7 w/w). Galvanostatic charge/discharge cycling was conducted in the 3.0-4.5 V range at 25° C. The test procedure includes three formation cycles at a ~C/5 rate with the 1 C capacity assumed to be 185 mAh/g, followed by aging cycles at a C/5 rate with the 1 C capacity calculated based on the third cycle discharge capacity. The batteries are aged for 30 to 50 cycles.

An electrochemical tester (e.g. Maccor 4200) provides a user with a variety of options in testing of batteries. Multiple channels can be plugged into the electrochemical tester to allow for multiple batteries to be tested simultaneously. These tests allow the user to measure parameters of the batteries, such as voltage, current, impedance, and capacity, to fully understand the effectiveness of the electrochemical cell being tested. The tester can be attached to a computer to obtain digital testing values.

EXAMPLES

The following examples are for illustration purposes only. It will be apparent to those skilled in the art that many modifications, both to materials and methods, may be practiced without departing from the scope of the disclosure.

Annealed Samples

A 2 mol % manganese substituted, Al-doped (e.g. 3000 ppm) $LiCoO_2$ cathode powder, having the composition: $Li_{0.98}(Co_{0.97}Mn_{0.017}Al_{0.013})_2$, was synthesized using a coprecipitation process to produce a hydroxide precursor. The composition $Li_{0.98}(Co_{0.97}Mn_{0.017}Al_{0.013})_2$ was determined by high precision inductively coupled plasma-optical emission spectrometry, ICP-OES). The hydroxide precursor was blended together and calcined with lithium carbonate ($Li_2CO_3$) at 1085° C. for 8 hours to form a cathode active material in a form of a powder. The cathode active material was then coated with nano-sized $Al_2O_3$ in an amount, for example, 1250 ppm Al by weight in the $Al_2O_3$ coating, and heat treated at 500° C. This was considered the "as-prepared" material.

In a later process, a sample of the coated powder was re-heated to an elevated temperature, e.g. 600° C. to 1000° C., for a period of time, such as 8 to 12 hours to form an "annealed" material.

The annealing heat treatment reacts the alumina ($Al_2O_3$) coating into the surface of the cathode active material powder to form a distinctive doping-coating layer, and unexpectedly improves the cycle life performance of the material. The annealing process is not limited to the conditions specified above, but can be any temperature-time process that results in the surface structure of the particles.

Table 1 lists Al-doped cathode particles coated with $Al_2O_3$ coating annealed at various annealing conditions, i.e. samples 1-11. Samples 2-3 are as-received samples from different lots. Sample 1 is annealed 500° C. for 8 h and then at 800° C. for 12 hours. Samples 4-5 and 8-9 are annealed at the same condition, i.e. 500° C./8 hours-800° C./8 hours, from different lots. Samples 10-11 are annealed at higher temperatures for 8 hours, i.e. 900° C. and 1000° C., respectively. Sample 6 has an $Al_2O_3$ coating but without doping, and is annealed at 800° C. for 8 hours. Sample 7 is directly heated to 800° C. and annealed at 800° C. for 8 hours without annealing at 500° C. for 8 hours.

TABLE 1

Samples with Various Annealing Conditions

| | $Al_2O_3$ coating, ppm Al | Al doping, ppm | Al doping, ppm |
|---|---|---|---|
| 1 | 1250 | 3000 | 500° C./8 h-800° C./12 hours |
| 2 | 1250 | 3000 | 500° C./8 hours |
| 3 | 1250 | 3000 | 500° C./8 hours |
| 4 | 1000 | 3000 | 500° C./8 hours-800° C./8 hours |
| 5 | 1250 | 3000 | 500° C./8 hours-800° C./8 hours |
| 6 | 1250 | 0 | 800° C./8 hours |
| 7 | 1250 | 3000 | 800° C./8 hours |
| 8 | 1250 | 3000 | 500° C./8 hours-800° C./8 hours |
| 9 | 1250 | 3000 | 500° C./8 hours-800° C./8 hours |
| 10 | 1250 | 3000 | 500° C./8 hours-900° C./8 hours |
| 11 | 1250 | 3000 | 500° C./8 hours-1000° C./8 hours |

Scanning Electron Microscope (SEM) Results

To characterize the surface of annealed $Li_{0.98}(Co_{0.97}Mn_{0.017}Al_{0.013})O_2$ powder, particles were cross-sectioned and examined using Scanning Electron Microscopy (SEM) and Energy-Dispersive X-ray Spectroscopy (EDS).

FIGS. 3A-3F illustrate SEM images of $Li_{0.98}(Co_{0.97}Mn_{0.017}Al_{0.013})O_2$ cathode particle coated with nano-$Al_2O_3$ powder, (A) as-prepared; (B) after annealing at 600° C. for 8 hours; (C) after annealing at 700° C. for 8 hours; (D) after annealing at 750° C. for 8 hours; (E) after annealing at 800° C. for 8 hours; and (F) after annealing at 800° C. for 12 hours. These SEM images provide comparisons of individual particles from the as-received coated, and the 600° C., 750° C., 750° C., and 800° C. heat-treated powders.

As shown in FIGS. 3A-3F, the coating coverage becomes more uniform at 600° C. than as-prepared. The coating islands still cover the particle surface but less at 700° C., indicating $Al_2O_3$ started to be driven into the bulk of the particle. The 750° C. annealing yields a clean but bumpy particle surface. The 800° C. annealing yields a smooth and clean particle surface. The coated particles show fine dispersion of $Al_2O_3$ particles on an about 20 µm $Li_{0.98}(Co_{0.97}Mn_{0.017}Al_{0.013})O_2$ cathode particle. The annealed particles from the same batch treated at 700° C. or higher show smooth surface void of small coating particles. When the annealing temperature increases, more surface Al driven into the bulk of the particle, leading to a smoother particle surface.

When heated to an elevated temperature, e.g. 800° C. for 12 hours, or heated with any other process with sufficient temperature and time, nano-$Al_2O_3$ powder reacts with the cathode active material particle, referred to cathode particle, and is absorbed into the $Li_{0.98}(Co_{0.97}Mn_{0.017}Al_{0.013})_2$ cathode particle and leaves a smooth and clean surface. The aluminum generally substitutes for cobalt in $LiCoO_2$ to form a solid solution. It appears that the nano-$Al_2O_3$ powder has reacted with the $Li_{0.98}(Co_{0.97}Mn_{0.017}Al_{0.013})_2$ cathode particle and diffused into the cathode particle. Although single particles are shown in FIGS. 3A-F, it is evident that this effect has occurred throughout the powder.

Figure 4:
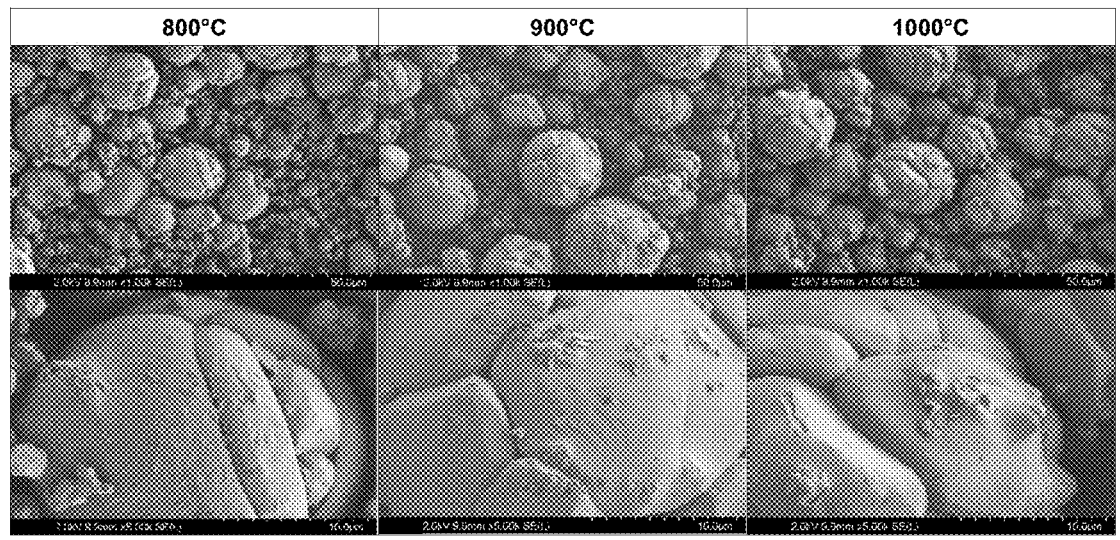
FIG. 4 illustrates SEM images after 800° C., 900° C., and 1000° C. annealing for 8 hours in accordance with an illustrative embodiment.

FIG. 4 illustrates SEM images after 800° C., 900° C., and 1000° C. annealing for 8 hours. As shown, the surface becomes smoother when annealing temperature increases from 800° C. to 900° C., and then 1000° C.

Scanning Transmission Electron Microscope (STEM)/Energy Dispersion Spectroscopy (EDS) Results EDS is an analytical technique used for the elemental analysis or chemical characterization of a sample. The EDS analysis was performed on the as-prepared sample and annealed samples. Sample particles were dispersed on a flat substrate and a single representative particle was selected for cross sectioning using a scanning electron microscope (SEM). The particle was sectioned into a thin slice using a focused ion beam (FIB) of ionized gallium. The slice was then attached to a copper needle and polished with an ion beam and thinned further to obtain a wedge-shaped slice. A scanning transmission electron microscope (STEM) with an EDS attachment was used to determine the elemental composition at different positions along a line-scan from the pristine surface of the particle (including the $Al_2O_3$ coating if it existed) into the bulk of the particle slice.

Figure 5:
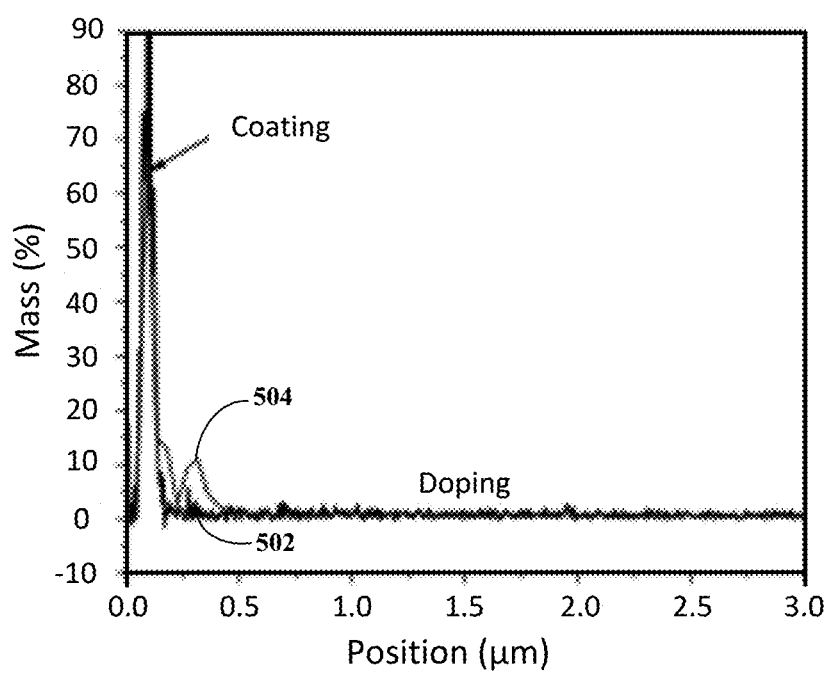
FIG. 5 illustrates Al composition versus distance from the particle surface for samples annealed at 500° C. (as-prepared) and annealed at 800° C. in accordance with an illustrative embodiment.

FIG. 5 illustrates Al composition versus distance from the particle surface for samples annealed at 500° C. (as-prepared) and annealed at 800° C. As shown, curve 504 is for sample annealed at 800° C., while curve 502 is for sample as prepared, i.e. annealed at 500° C. for 8 hours. The curve 504 includes a small Al peak near 0.3 µm from the surface, which is absent in curve 502.

Table 2 shows the composition gradients (e.g. Al, Co, and Mn) for various samples. As shown in Table 2, for Sample 3 (500° C./8 h coating), referred to "as-received" coating, Al is mainly concentrated on the core particle surface (about 200 nm thick coating) with an average level of 3449±480 ppm in the bulk (0.5-3 µm from surface).

Figure 6A:
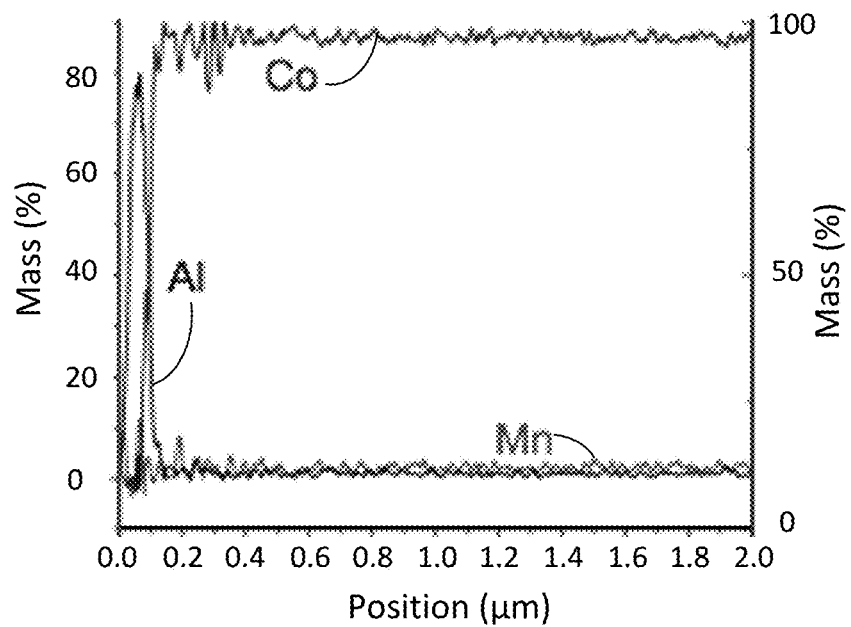
FIGS. 6A-C show the STEM/EDS lines scan results, (A) Sample 3; (B) Sample 5; and (C) Sample 1 in accordance with illustrative embodiments.
Figure 6B:
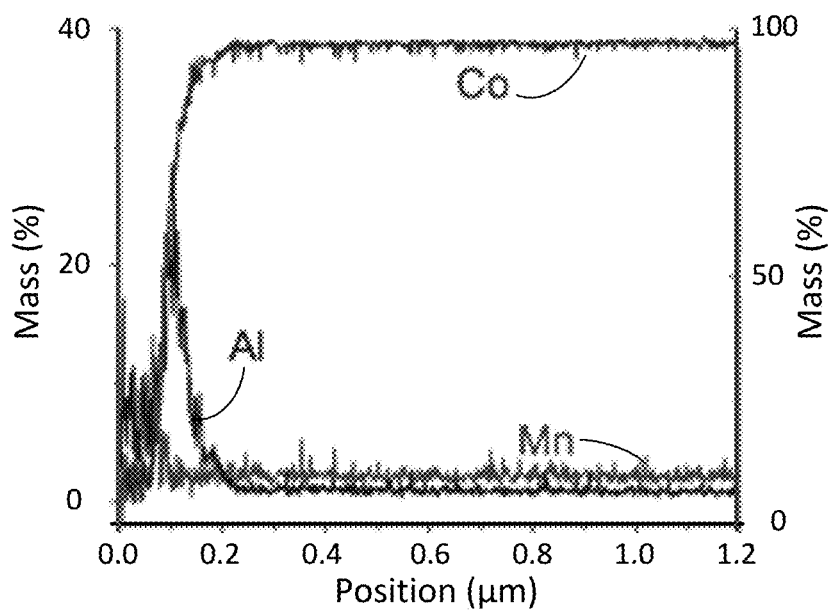
Figure 6C:
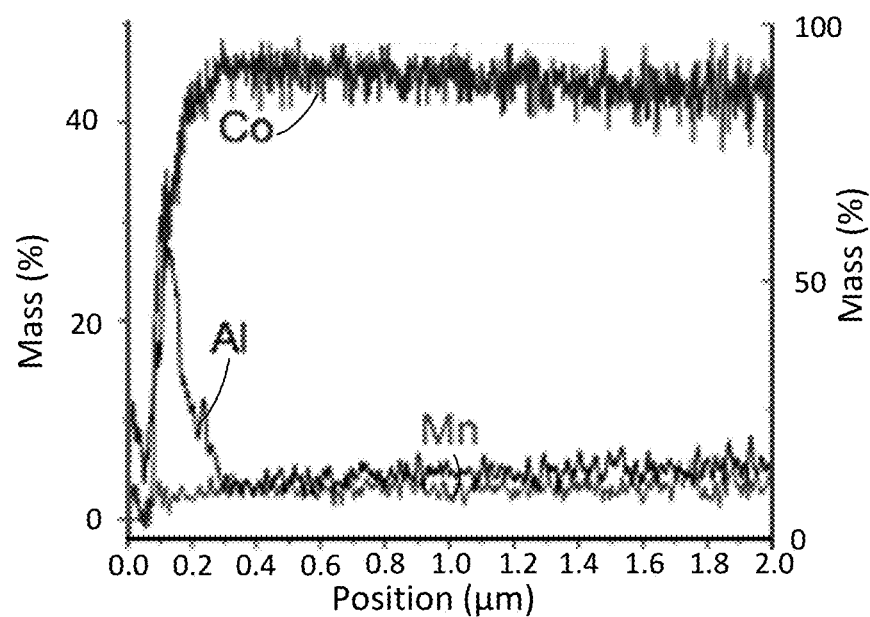

FIGS. 6A-C show the STEM/EDS lines scan results, (A) Sample 3; (B) Sample 5; and (C) Sample 1. As shown in FIG. 6A, Al has a peak near the surface. As shown in FIGS. 6B-C, the Al peak shifts away from the surface.

Figure 7:
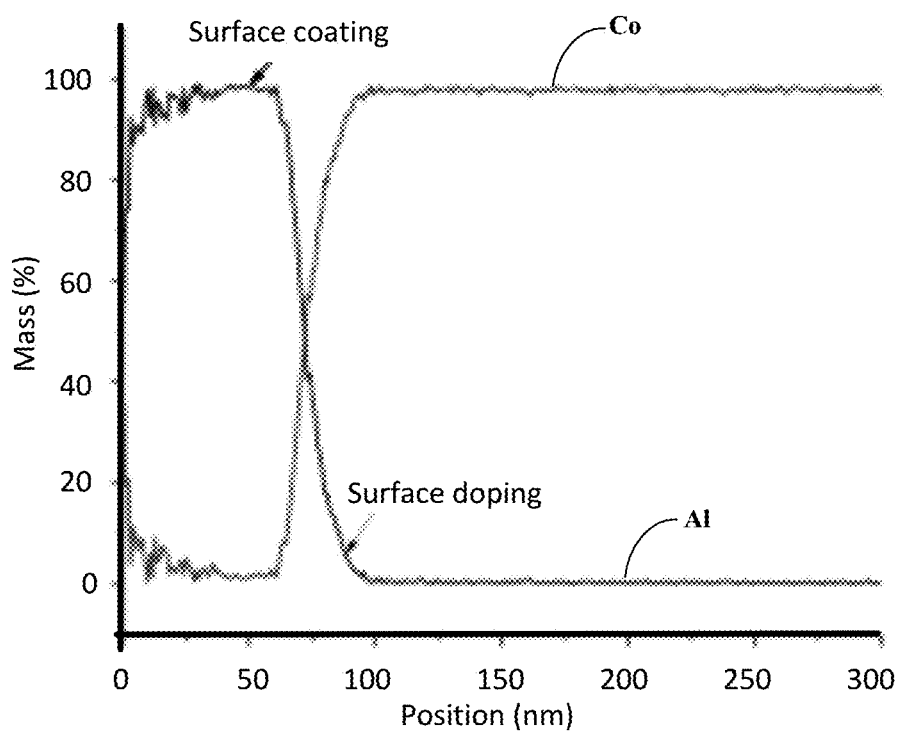
FIG. 7 shows the STEM/EDS line scan results in a small scale for annealed Sample 6 annealed at 800° C. for 8 hours in accordance with an illustrative embodiment.

FIG. 7 shows the STEM/EDS line scan results in a small scale for Sample 6 annealed at 800° C. for 8 hours. Sample 6 is without Al doping and has an $Al_2O_3$ coating. The STEM/EDS shows that $Al_2O_3$ coating of about 50 nm thick still covers along the surface. Al diffuses into a limited distance near surface (about 30 nm deep). There is no Al detected in the bulk.

Table 3 shows the results of EDS line scan at 7 spots for Sample 2 (as-prepared). Al has a peak value 23055 ppm at spot 2. The ratio of Mn/(Mn+Co) increases slightly from spot 1 to spot 7, while the ratio of Co/(Mn+Co) slightly decreases from spot 1 to spot 7. The as-prepared particle surface covered with $Al_2O_3$ coating and Al dopant to the core has a greater Al than the 3000 ppm Al dopant. Specifically, the bulk Al concentration has an average level of about 4000 ppm (e.g. average of spots 5-7), indicating surface $Al_2O_3$ was driven into the bulk for some distance.

TABLE 2

Composition Gradient for Various Samples

| | Line Distance (µm) | Mn/ (Mn + Co) | Co/ (Mn + Co) | Al, ppm |
|---|---|---|---|---|
| Sample 1 (800° C./12 h) | 0-0.2 (surface) | 0.015 | 0.985 | 67897 |
| Sample 1 (800° C./12 h) | 0.2-0.5 | 0.018 | 0.982 | 8277 |
| Sample 1 (800° C./12 h) | 0.5-3 | 0.019 ± 0.001 | 0.981 ± 0.001 | 3804 ± 510 |
| Sample 5A (500° C.-8 h/800° C.-8 h) | 0-0.2 (surface) | 0.030 | 0.970 | 106127 |
| Sample 5A (500° C.-8 h/800° C.-8 h) | 0-0.2 (surface) | 0.023 | 0.977 | 8907 |
| Sample 5A (500° C.-8 h/800° C.-8 h) | 0.5-3 | 0.021 ± 0.002 | 0.979 ± 0.002 | 7032 ± 911 |
| Sample 3 (500° C./8 h) | 0-0.2 (surface) | 0.043 | 0.957 | 96593 |
| Sample 3 (500° C./8 h) | 0.2-0.5 | 0.025 | 0.975 | 4961 |
| Sample 3 (500° C./8 h) | 0.5-3 | 0.21 ± 0.001 | 0.979 ± 0.001 | 3449 ± 480 |
| Sample 4 (800° C./8 h) | 0-0.5 (surface) | 0.017 | 0.983 | 52107 |
| Sample 4 (800° C./8 h) | 0.5-3 (inside) | 0.019 ± 0.001 | 0.981 ± 0.001 | 3804 ± 510 |
| Sample 5B (500° C.-8 h/800° C.-8 h) | 0-0.2 (surface) | 0.035 | 0.965 | 74451 |
| Sample 5B (500° C.-8 h/800° C.-8 h) | 0.2-0.5 | 0.023 | 0.977 | 6585 |
| Sample 5B (500° C.-8 h/800° C.-8 h) | 0.5-1 | 0.021 ± 0.002 | 0.979 ± 0.002 | 5597 ± 296 |

For Sample 4(800° C./8 h coating), a little less Mn is detected at the surface of the particle, which may be due to that Al repels Mn when Al diffuses into the core and becomes surface doping. Al is mainly concentrated near the surface (e.g. about 500 nm deep from the surface), but with are reduced Al signal near the surface and an increased average level of 3804 f 510 ppm Al in the bulk (0.5-3 µm from surface), due to some surface $Al_2O_3$ being driven into the core at 800° C., compared to Sample 3.

For Sample 5A (500° C./8 h-800° C./8 h coating), the cross section of scanning transmission electron microscope (STEM) shows that Al is mainly concentrated near the core particle surface (about 200 nm deep from the core particle surface), very similar to the SEM results. The bulk (0.5-3 µm from surface) has a higher average level of 7032±911 ppm Al than the 3000 ppm Al dopant, due to some surface $Al_2O_3$ driven into this area at 800° C.

For Sample 5B (500° C./8 h-800° C./8 h coating), Al is mainly concentrated near the core particle surface, mixing with Co (e.g. about 200 nm deep from the particle surface) but with a reduced Al signal near the particle surface and an increased average level of 5597±296 ppm Al in the bulk (0.5-3 µm from surface), due to some surface $Al_2O_3$ driven into core at 800° C.

TABLE 3

EDS results for Line Scan of Sample 2 (500° C. Coating)

| | Mn/ (Mn + Co) | Co/ (Mn + Co) | Al, ppm (from EDS) |
|---|---|---|---|
| Spot 1 | 0.011 | 0.989 | 15702 |
| Spot 2 | 0.014 | 0.986 | 23055 |
| Spot 3 | 0.016 | 0.984 | 8303 |
| Spot 4 | 0.016 | 0.984 | 4649 |
| Spot 5 | 0.016 | 0.984 | 3875 |
| Spot 6 | 0.018 | 0.982 | 4067 |
| Spot 7 | 0.018 | 0.982 | 3930 |

Figure 8A:
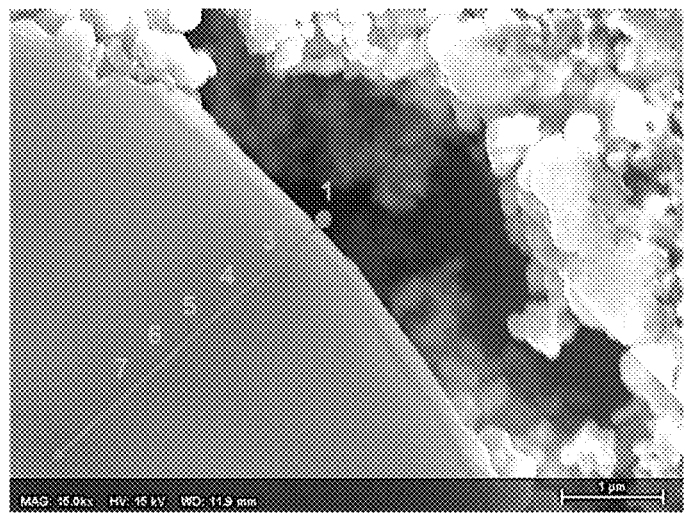
FIG. 8A illustrates a SEM images with 7 spots for line scan for Sample 2 (500° C./8 h) in accordance with an illustrative embodiment.

FIG. 8A illustrates a SEM images with 7 spots for line scan for Sample 2 (500° C./8 h). The SEM images show the path of an EDS line scan of elemental Al from the surface into the bulk interior of a cross-sectioned particle.

Figure 8B:
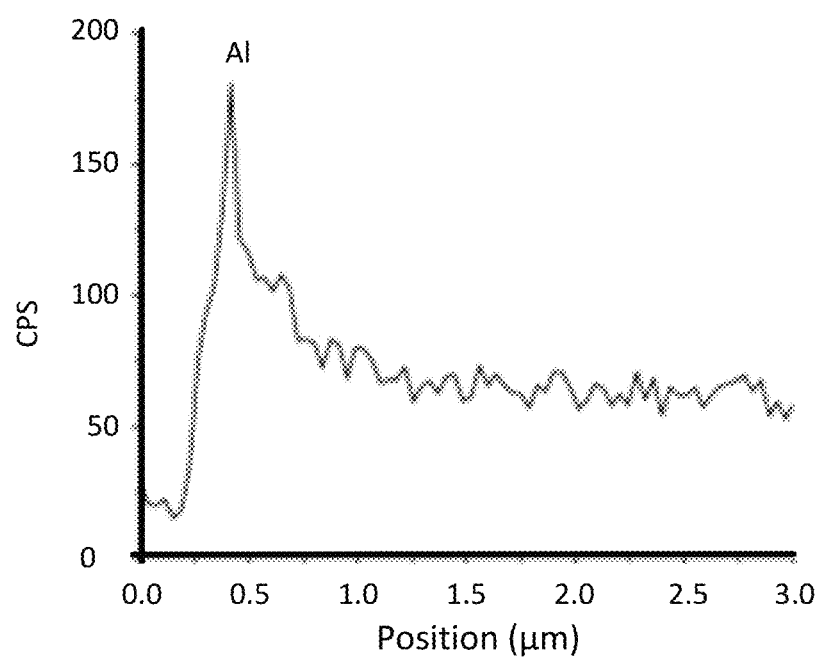
FIG. 8B shows the EDS result of the line scan of Al for annealed Sample 2 in accordance with an illustrative embodiment.

FIG. 8B shows the EDS result of the line scan of Al for annealed Sample 2, where the vertical axis is counts per second (CPS), while the horizontal axis is the position from the surface. As shown in FIG. 8B, the EDS line scan shows that the area covered with a thin $Al_2O_3$ film has a much higher Al signal near the surface (e.g. spot 2 with a large peak). The EDS spot analysis along the indicated line also shows Al concentrated on the surface (within surface less than 0.75 μm). The line scan shows an Al-rich surface, which decreases in concentration to a constant value at 0.5 μm from the surface.

Figure 8C:
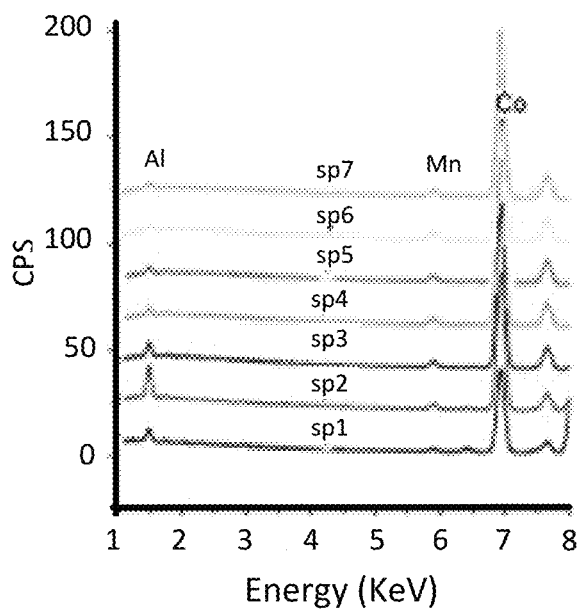
FIG. 8C shows the EDS result of the line scan of the 7 spots of FIG. 8A for annealed Sample 2 in accordance with an illustrative embodiment.

FIG. 8C shows the EDS result of the line scan of the 7 spots of FIG. 8A for Sample 2, where the vertical axis is counts per second (CPS), and the horizontal axis is the energy in KeV. The elements Al, Mn, and Co have different energies. As shown, Al has the lowest energy and Co has the highest energy among the three elements.

Figure 9:
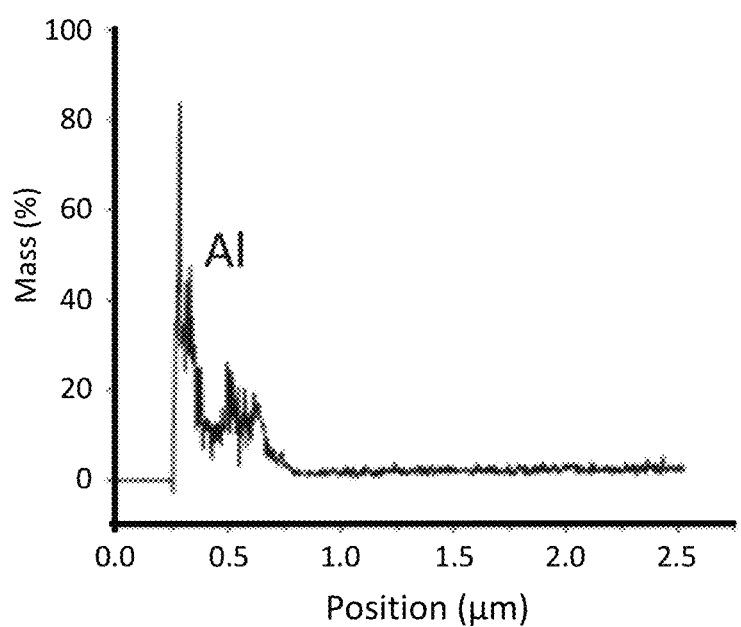
FIG. 9 illustrates the STEM/EDS result for annealed Sample 5 (500° C./8 h-800° C./8 h) in accordance with an illustrative embodiment.

FIG. 9 illustrates the STEM/EDS result for annealed Sample 5 (500° C./8 h-800° C./8 h). As shown, Al is detected both at surface (coating still exist after 800° C.) and inside (doping). This STEM/EDS result shows that Al is mainly concentrated near the surface, about 500 nm thick. It is difficult to distinguish the amount of Al in the bulk that comes from the coating due to diffusion.

X-Ray Photoelectron Spectroscopy (XPS) Measurements and Results

Surface analysis using X-ray Photoelectron Spectroscopy (XPS) were performed on the as-prepared sample and annealed samples. The XPS analysis is used for determination of the composition of surface elements.

Powder samples were mounted on a non-conductive tape (e.g. 3M-doublesided tape). Al2p, Co2p, Mn2p, O1s, and C1s signals were detected in counts versus binding energy. A spot size of 100 by 100 μm$^2$ was used. The large spot size provides an average surface composition. The coating method resolved the issue with double peaks of Co2P.

XPS measurements were carried out on a Thermo Scientific™ K-Alpha+™ spectrometer using a micro-focused monochromatic Al-Kα (1487 eV) X-ray source with a spot size of 400 μm for the surface analysis. A dual-beam electron flood gun (ultra-low energy (200 eV) co-axial electron and Ar+ ion beam) was used for charge compensation during all surface analyses. The instrument uses a 128-channel 180° double-focusing analyzer and energy ranges of 0 to 1350 eV were swept for low-resolution surveys and then high-resolution regions of interest (e.g. Si 2p, O 1s) were windowed off at the relevant binding energy range for the acquisitions. Mounted samples were evacuated on the sample stage mount in an isolated load-lock chamber until a base pressure of 3×10-7 Torr (or better) was achieved and then transferred via a pneumatic transfer manipulator arm to the analysis chamber. Operational pressures in the analysis chamber prior to analysis were typically 1 to 4×10$^{-9}$ Torr and 2 to 4×10$^{-7}$ Torr with the e-flood gun running during surface analysis. Auto-firing TSP filaments and e-flood gun filaments were degassed prior to analysis. Ar+-sputtering occurred at 3 keV bombardment voltage at low current, corresponding to an effective etch rate (for a Ta$_2$O$_5$ film) of ~0.23 nm/s and ~1 nm/cycle.

Processing of the spectra was performed in Thermo Avantage5 (v. 5.977, Build 06436) post-processing software and, if necessary, charge-correction of each spectrum was applied by referencing to the advantageous carbon, C is peak arising at 284.8 eV. Peak deconvolution of the high-resolution spectra was performed using the Powell fitting algorithm with mixed Gaussian-Lorentzian (~30% L/G) line shapes and a Shirley/Smart background. C1s was used to correct binding energy shift due to charging. A weak Li signal may be due to the low sensitivity of Li and was therefore not used for calculation of atomic percentage of elements. Surface composition in atomic percentage were estimated using relative intensity of peaks method. Peak fitting was performed using Thermo Avantage software.

The detection depth of XPS is nominally 8-10 nm on a well-defined flat surface, such as a silicon wafer. However, in the case of powder, it is difficult to determine the specific penetration depth because the beam is scattered by particles in the powder at random heights in the bed surface. For the same reason, the uniformity of the "etching" process on powder cannot be determined. Nevertheless, the powder measurement provides an average composition of the population of particles near the surface. The assumption is made that different samples prepared and mounted identically under the same instrument settings would produce the same overall physical response to the incident beam and the detector; thereby providing a method to detect overall differences in the average surface composition of two different powders.

Figure 10A:
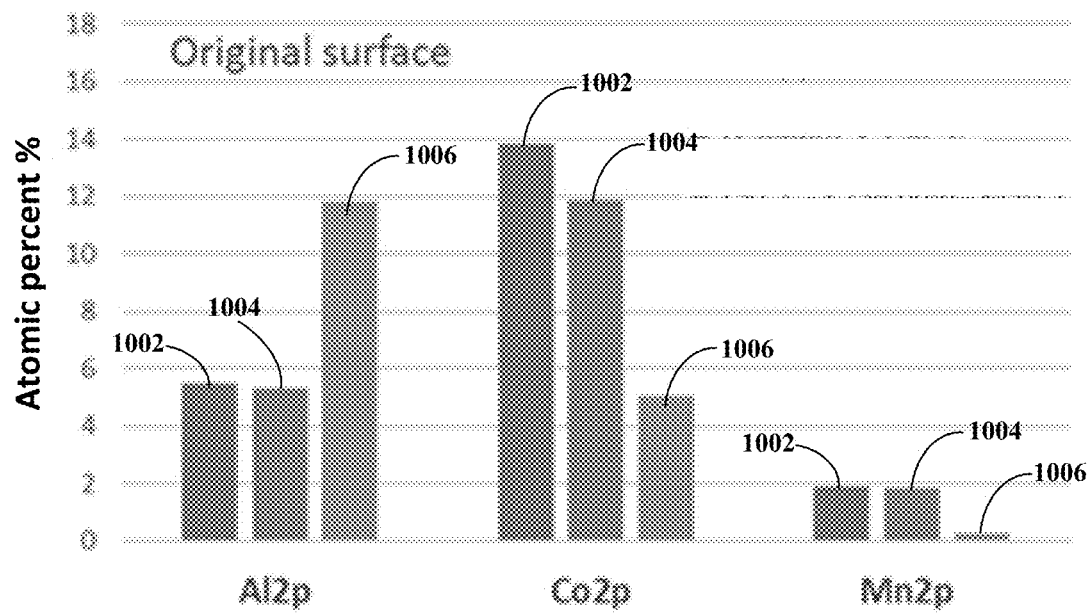
FIGS. 10A-B show the atomic percent for Al2p, Co2p, Mn2p at three different anneal conditions in accordance with illustrative embodiments.
Figure 10B:
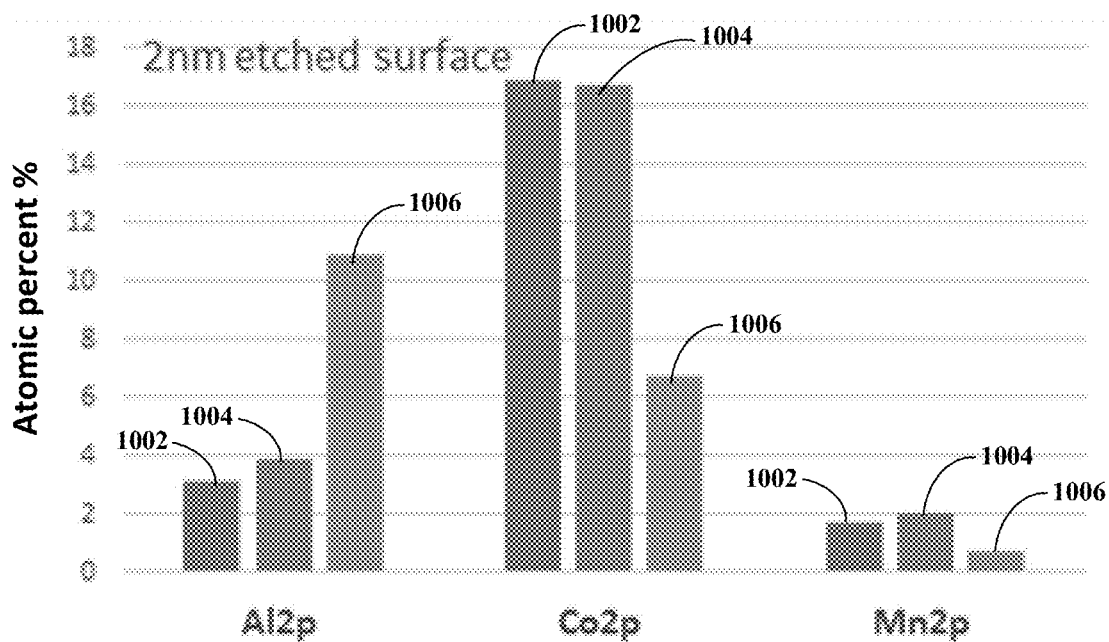

FIGS. 10A-B show the atomic percent for Al2p, Co2p, Mn2p at three different anneal conditions. As shown in FIGS. 10A-B, bars 1002 and 1004 represent the samples annealed at 800° C., 750° C., respectively. Bar 1006 represents the non-treated sample or as-received sample. As shown, there is an observable difference between the original and 2 nm "etched surface", which demonstrates the sensitivity of the measurement. The 750° C. or 800° C. heat-treated samples show much lower content of Al on the surface than the non-treated sample. The heat treatment after coating Al$_2$O$_3$ causes Al diffused into the particle core. The 750° C. or 800° C. heat-treated samples also show much higher content of Co and Mn on the surface than the non-treated sample. As shown in FIG. 10B, the 2 nm etched surface similar trend as shown in FIG. 10A.

Figure 11:
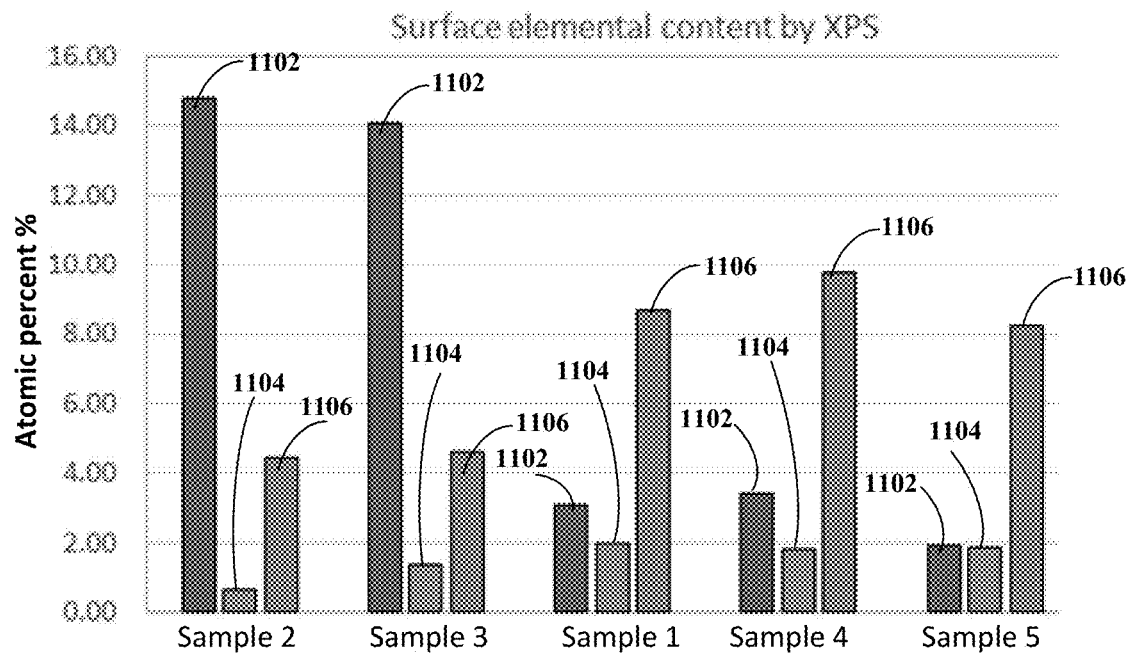
FIG. 11 illustrates atomic percent for Al, Mn, and Co from XPS analysis for Samples 1-5 in accordance with an illustrative embodiment.

FIG. 11 illustrates atomic percent for Al (1102), Mn (1104), and Co (1106) from XPS analysis for Samples 1-5. As shown, strong Al signals are present in Samples 2 and 3 treated at 500° C./8 h (as-prepared samples). The Al$_2$O$_3$ coating still stays on the surface. The Al atomic percent reduces three times after Samples 1 and 4-5 heat-treated at 800° C. Most Al$_2$O$_3$ coating reacts with the core and becomes Al doped. Samples 1 and 5 show similar surface composition, while Sample 4 has slightly higher Al near the surface. The Al atomic percentage reduces significantly with Samples 1 and 4-5 treated at 800° C., which indicate that most Al$_2$O$_3$ coating reacts with the core and becomes surface doping.

Assuming all dopants are parts of layered structure of LiCoO$_2$. The ratios of different elements to Co were used to study of heat treatment on dopants on particle surface.

Figure 12:
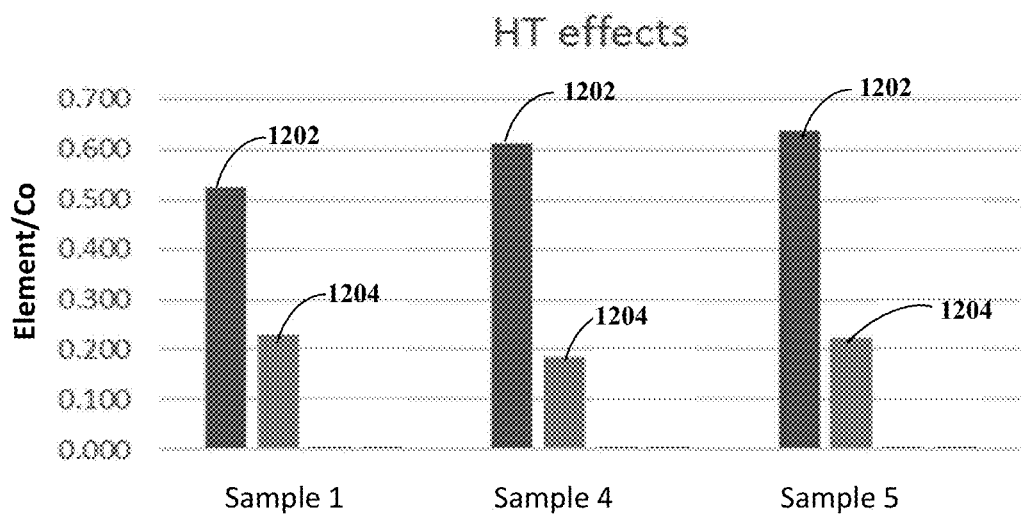
FIG. 12 shows the molar ratios of elements/Co from the XPS results for Samples 1 and 4-5 in accordance with an illustrative embodiment.

FIG. 12 shows the molar ratios of elements/Co from the XPS results for Samples 1 and 4-5. As shown in FIG. 12, the surface molar ratios of Al/Co (1202) and Mn/Co (1204) are comparable among three Samples 1 and 4-5 heat-treated at 800° C. Specifically, the surface molar ratios of Al/Co (1202) for samples 1, 4, and 5 are about 0.5, 0.6, and 0.62, respectively. The surface molar ratios of Mn/Co (1204) for samples 1, 4, and 5 are about 0.22, 0.18, and 0.22, respectively.

Figure 13:
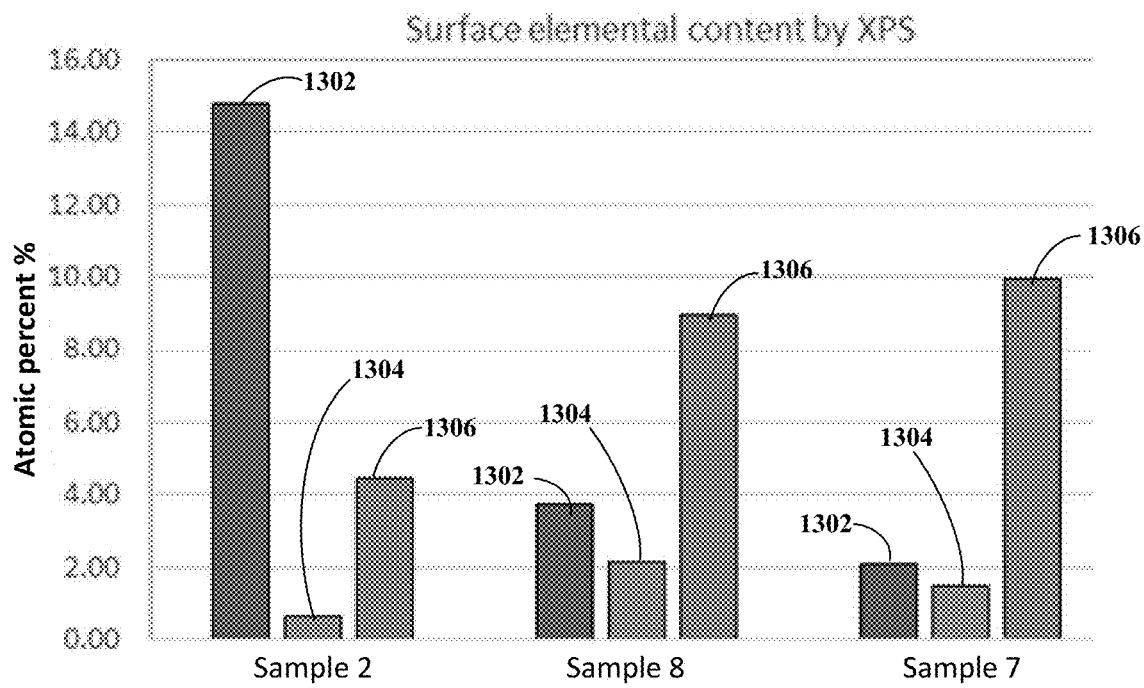
FIG. 13 illustrates atomic percent for Al, Mn, and Co in accordance with an illustrative embodiment.

FIG. 13 illustrates atomic percent for Al (1302), Mn (1304), and Co (1306). As shown in FIG. 13, the 800° C. treatment (sample 7) yields significantly lower Al-signal (1302) at particle surface. Samples 7 and 8 have higher Mn (1302) and higher Co (1306) than Sample 2 (as-prepared).

Figure 14:
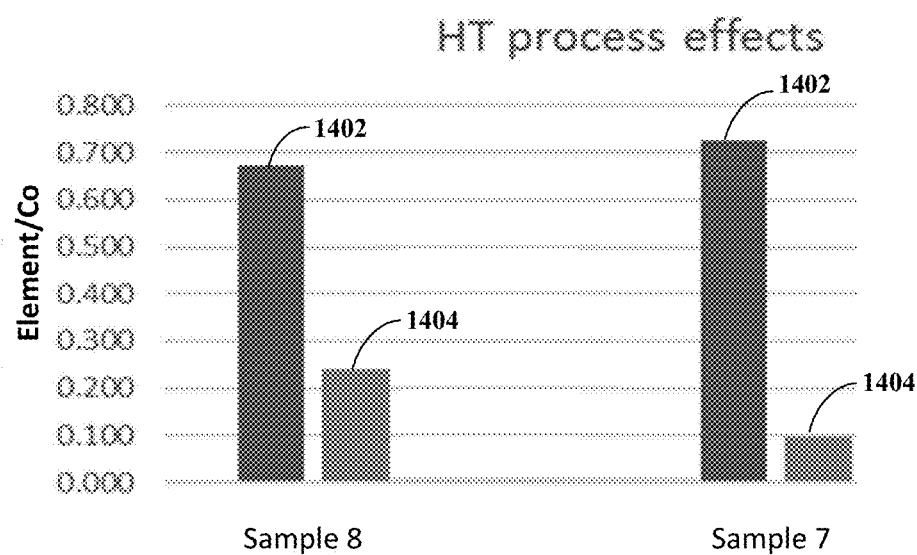
FIG. 14 shows the molar ratios of elements/Co from the XPS results for Samples 2 and 7-8 in accordance with an illustrative embodiment.

FIG. 14 shows the molar ratios of elements/Co from the XPS results for Samples 7-8. As shown in FIG. 14, the heating procedure affects the surface molar ratio of Mn/Co (1404) more greatly. The 500° C. treatment followed by 800° C. treatment (Sample 8) increases the surface molar ratio of Mn/Co compared to the sample treated at 500° C. (Sample 2) (not shown). Specifically, the surface molar ratios of Al/Co (1402) for samples 7 and 8 are about 0.72 and 0.68, respectively. The surface molar ratios of Mn/Co (1404) for samples 7 and 8 are about 0.18 and 0.23, respectively. The direct heating to 800° C. without an intermediate 500° C. step (Sample 7) strongly reduces the molar ratio of Mn/Co at the particle surface. The molar ratio of Al/Co (1402) is virtually the same between one step (800° C.) and two-step (500° C.+800° C.) heat treatment for samples 7 and 8.

Figure 15A:
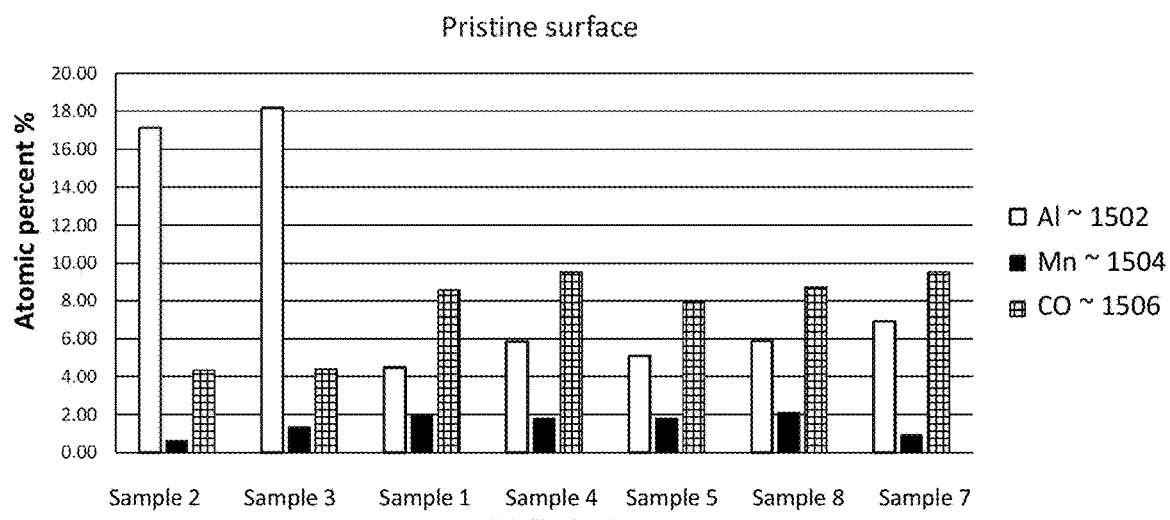
FIG. 15A-C illustrate the surface composition of various samples 1-5 and 7-8, (A) Prestine surface; (B) 1 nm etched surface; and (C) 2 nm etched surface in accordance with an illustrative embodiment.
Figure 15B:
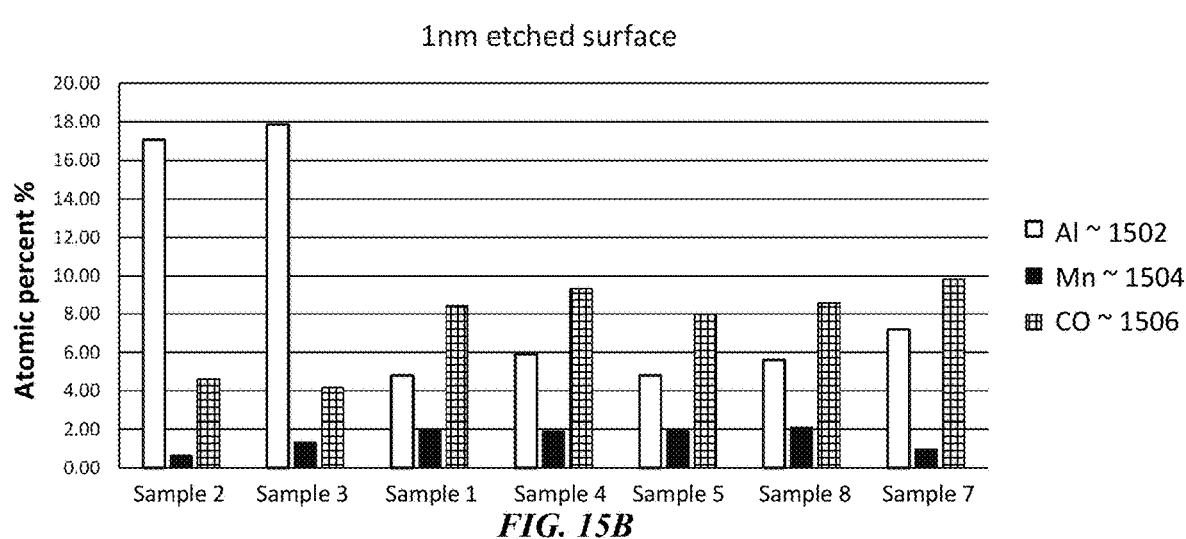
Figure 15C:
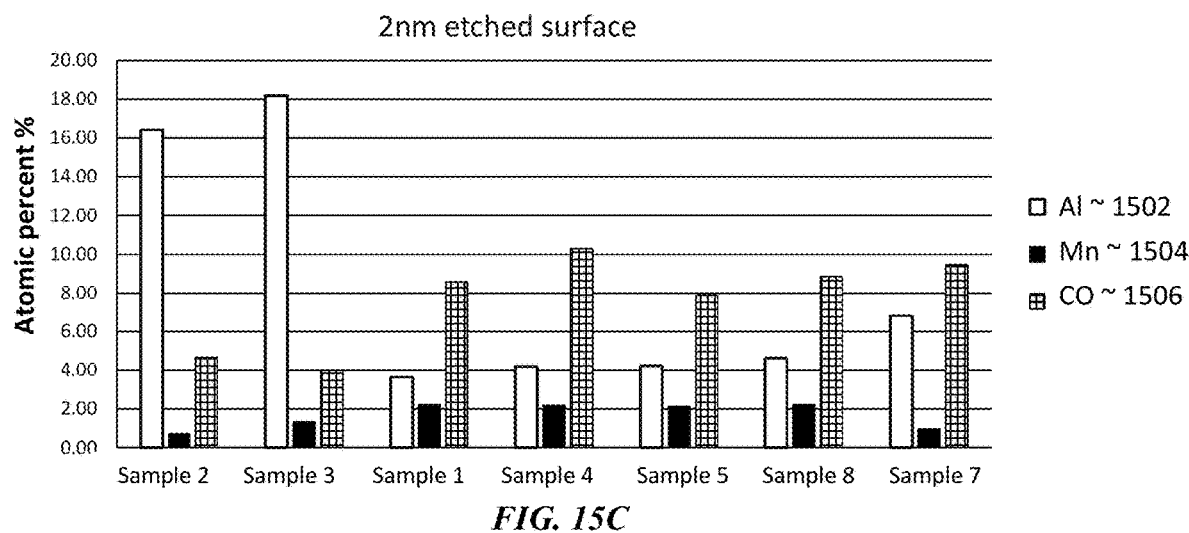

FIG. 15A-C illustrate the surface composition of various samples 1-5 and 7-8, (A) Prestine surface; (B) 1 nm etched surface; and (C) 2 nm etched surface in accordance with an illustrative embodiment. Samples 7 and 8 are added to Table 1. As shown in FIGS. 15A-C, strong Al signal (1502) is present in Samples 2-3 heat-treated at 500° C. The $Al_2O_3$ coating still stays on the surface. However, the Al atomic percent is reduced three times when Samples 1, 4-5, and 7-8 are heat-treated at 800° C. Most $Al_2O_3$ coating reacts with the core and becomes surface doping. Samples 1, 5 and 8 show similar surface composition including Al, Mn (1504), and Co (1506). Sample 4 has slightly higher Al content than Samples 1 and 5. The 1 nm etched surface and 2 nm etched surface show similar signals for all elements except Li (not shown). The fluctuation for Li-content is high because the signal is weak. Sample 7 has the lowest Mn/Co ratio, which indicates direct high temperature treatment may push Mn from the surface to the inner core.

Figure 16:
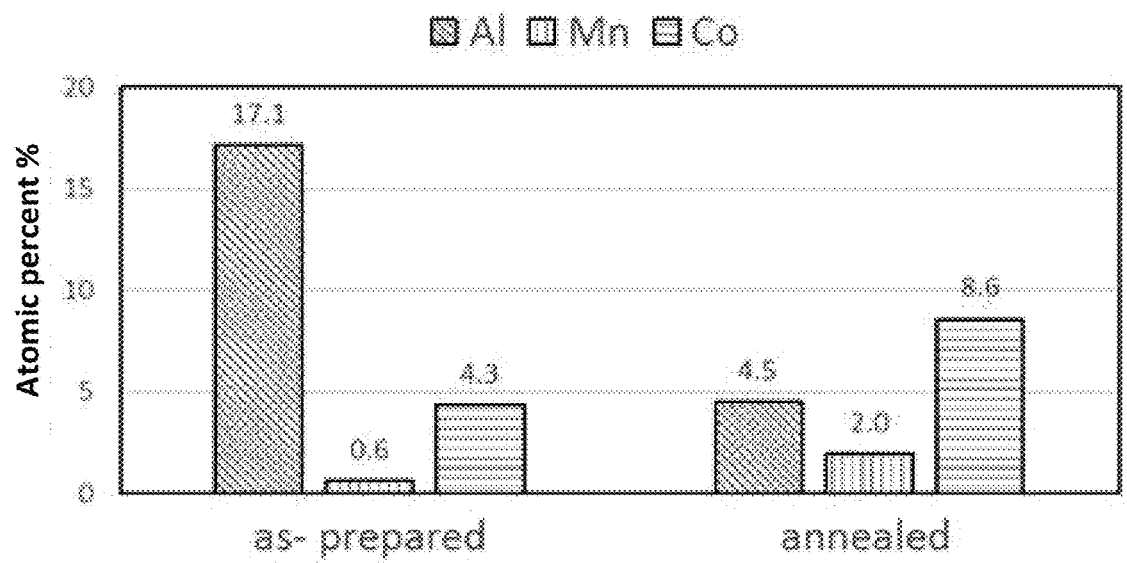
FIG. 16 shows the XPS surface analysis of $Li_{0.98}(Co_{0.97}Mn_{0.017}Al_{0.013})O_2$ coated with $Al_2O_3$ (left), and after annealing at 800° C./12 h (right) in accordance with an illustrative embodiment.

FIG. 16 shows the XPS surface analysis of $Li_{0.98}(Co_{0.97}Mn_{0.017}Al_{0.013})O_2$ coated with $Al_2O_3$ (left), and after annealing at 800° C./12 h (right). As shown in FIG. 16, the as-prepared sample has a large amount (17.1 atomic percent) of Al at the particle surface as expected with an $Al_2O_3$ coating. When the powder was calcined at 800° C. for 12 hours, it was expected that the $Al_2O_3$ coating would react with and diffuse into the particle. However, the molar ratio of Mn/Co increased at the surface due to the annealing process as well as a reduction in Al at the surface. This diffusion changed the chemistry of the surface from a 28:1:7 ratio of Al:Mn:Co to a 2:1:4 ratio. According to this molar ratio change, the cycle life of a Li-ion cell with the annealed cathode material may be shortened because of the depleted amount of protective $Al_2O_3$ coating on the surface.

The 400×400 $\mu m^2$ beam directed at a bed of powder simultaneously analyzes thousands of particles and ends up providing an average surface composition of those particles. The analysis for "as-coated" samples shows mainly the $Al_2O_3$ coating with a small part of exposed base particle surface composition. When the material is annealed at high temperature (e.g., 800° C./8 h), Al reacts with the core particle and diffuses toward the center and encounters and substitutes mainly with Co, since the material has a 97-98% Co concentration, vs ~2% Mn and ~3000 ppm Al. The composition of the powder bed changes as the $Al_2O_3$ coating disappears and the core surface becomes more exposed. Since Al exchanges mainly with Co and avoids Mn (according to atomistic modeling), the Co concentration is reduced as the core surface is exposed, while other elements (Mn and Al) increase in concentration. Also, if Co is decreasing because of Al, while Mn is constant, the Mn/Co increases without a Mn change.

Nuclear Magnetic Resonance (NMR) Measurements and Results

Further comparison was made between the as-prepared and the annealed samples using solid-state Magic Angle Spinning-Nuclear Magnetic Resonance (MAS-NMR) with focus on $^{27}Al$. This NMR method allows the evaluation of the local ordering of Al and its nearest neighbors and their spatial proximity between each other due to magnetic interactions between nuclei. The NMR analysis is used for determination of bulk composition measurements, for example, bulk average composition for each element. The analysis conditions include 30 kHz and 11.7 T. The method includes normalizing to main peak $^{27}Al$ resonance traces, and comparing the total Al content between samples.

Figure 17:
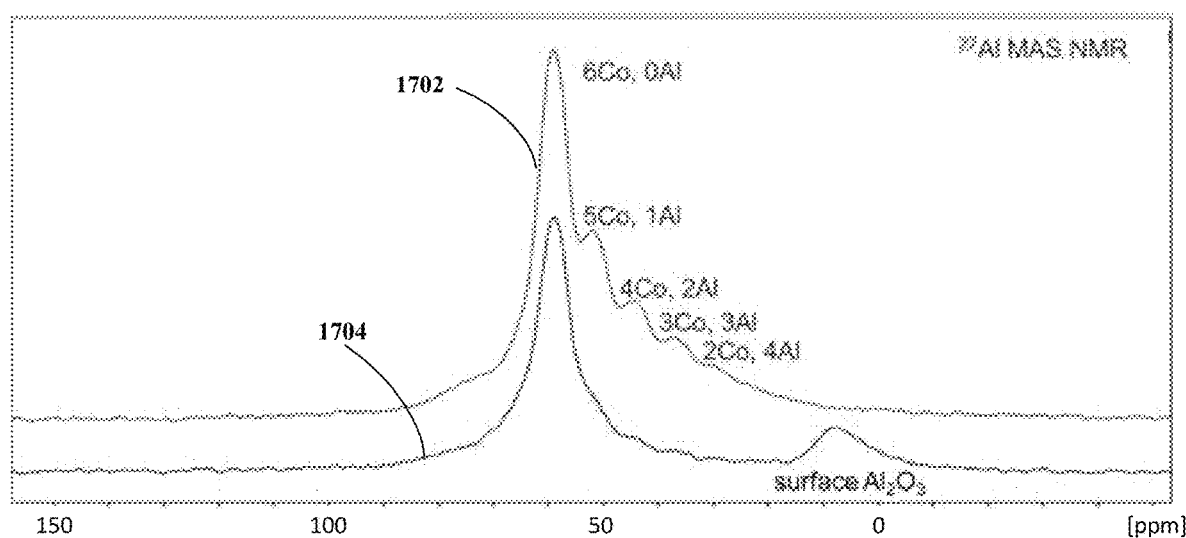
FIG. 17 is a MAS-NMR spectrum illustrating a comparison of the chemical shift anisotropy interactions of Al in as-prepared $Al_2O_3$-coated $Li_{0.98}(Co_{0.97}Mn_{0.017}Al_{0.013})O_2$ (lower curve) and the same material after annealing at 800° C./12 h (upper curve) in accordance with an illustrative embodiment.

FIG. 17 is a MAS-NMR spectrum illustrating a comparison of the chemical shift anisotropy interactions of Al in as-prepared $Al_2O_3$-coated $Li_{0.98}(Co_{0.97}Mn_{0.017}Al_{0.013})O_2$ (lower curve-1704) and the same material after annealing at 800° C./12 h (upper curve-1702), demonstrating the effect of Al-surface doping. $Li(Al_xCo_{1-x})O_2$ environments (6-coordinate) have varying Co neighbors. Al substitutes for Co in the transition metal layer. For example, 6Co, 0Al (also referred to Al6Co) refers to Al ion coordinated with six Co ions and no Al ions, while 5Co, 1Al (also referred to Al5Co) refers five Co ion neighbors and one Al. The as-prepared sample 1704 illustrates a 6-fold octahedral Al coordinated with six Co near-neighbors signified by largest peak at about 59 ppm. This doped aluminum $Al_{0.013}$ (about 3000 ppm by weight) is uniformly distributed in the transition metal layer of the R-3m structure of $Li_{0.98}(Co_{0.97}Mn_{0.017}Al_{0.013})O_2$. The peak at about 8 ppm identifies the surface coating of 6-fold $Al_2O_3$ that was applied as fine particles to the larger core particles and processed at a temperature of 500° C., which is too low to promote diffusion of Al into the bulk.

The shape of curve (1702) is an identifying feature of the annealed material at 800° C. The relative intensities of these peaks with respect to each other are indicative to the materials processing and surface doping structure of this material. When the as-prepared material (1704) is heated to 800° C., Al reacts and diffuses from the surface into the bulk of the particles. As Al migrates from the $Al_2O_3$ coating into the Co-rich compound, its near-neighbors change from 6 Al, to 1 Co and 5 Al (also referred to Al1Co), then 2 Co and 4 Al (also referred to Al2Co), 3 Co and 3 Al (also referred to Al3Co), 4 Co and 2 Al (also referred to Al4Co), 5 Co and 1 Al (also referred to Al5Co), into Co-rich regions where Al is surrounded by 6 Co neighbors (also referred to Al6Co). The shape of the upper curve (1702) in FIG. 17 is defined by the relative intensities of near-neighbor coordinates, labeled in the figure. The $Al_2O_3$ coating has noticeably disappeared from the 8 ppm position.

Table 4 shows relative intensities of the near-neighbor coordinates of the MAS-NMR spectra for four repeat batches of the material. Samples 1, 4-5 and 8 have nominally a total of about 3800 ppm Al including initial coating and doping content. Two different types of heat treatment were performed: (1) the heat treatment of 500° C./8 h-800° C./8 h refers to heating the batch to 500° C. for 8 hours and then continuing the process by heating the furnace up to 800° C. for 8 hours; and (2) the heat treatment of 500° C./8 h+800° C./8-12 h refers to heating the batch in two separate processes: first heating a batch to 500° C. for 8 hours, cooling, then reheating the powder to 800° C. for 8 hours, followed by cooling.

TABLE 4

Relative peak heights of Al configurations in MAS NMR spectrum

| Sample | Sample 8 | Sample 1 | Sample 4 | Sample 5 | Average | Std Deviation |
|---|---|---|---|---|---|---|
| 6Co, 0Al | 100 | 100 | 100 | 100 | 100 | ±0 |
| 5Co, 1Al | 49 | 53 | 52 | 49 | 51 | ±2 |
| 4Co, 2Al | 29 | 34 | 33 | 29 | 31 | ±3 |
| 3 Co, 3Al | 19 | 23 | 24 | 21 | 22 | ±2 |
| 2Co, 4Al | 14 | 16 | 18 | 16 | 16 | ±2 |
| Total Al, ppm | 3823 | 3786 | 3744 | 3893 | | |
| Heat treatment | 500° C./8 h−<br>800° C./8 h | 500° C./8 h+<br>800° C./12 h | 500° C./8 h−<br>800° C./8 h | 500° C./8 h+<br>800° C./8 h | | |

Samples 5 and 8 have similar $^{27}$Al resonance traces, suggesting greater dispersion of Al into Co layer, Al in Co-rich. Samples 1 and 4 have similar $^{27}$Al resonance traces, suggesting possible small amount of α-LiAlO$_2$.

Sample 5 has the largest total Al content (3941 ppm). Samples 1 and 4 have similar Al contents, i.e. 3804 ppm, 3762 ppm (about 40 ppm difference compared to 137 ppm difference between Sample 1 and Sample 5).

Heat-treatment converts Al$_2$O$_3$ to Li(CoAl)O$_2$. LiAlO$_2$ is also possibly observed, but with low amount. Coordination around Al (i.e. 2-5Co) indicates locally high Al-doping (near particle surface, based on SEM/EDS).

The left shift of Sample 1 compared to Sample 4 indicates that Sample 1 has been heated longer or at higher temperature causing more Al to diffuse into the bulk toward a Al6Co coordination. Shorter peaks show that Sample 4 has a less amount of Al doping.

Diffusion of surface aluminum into lattice due to additional heat treatment (800° C.) for Samples 1 and 4-5 leads to formation additional peaks (LiAl$_x$Co$_{1-x}$O$_2$ with varied Co coordination to Al) and disappearance of Al$_2$O$_3$ peak seen for Sample 3 (as-prepared).

Benchmark curve 1704, shows bulk Al doping (Al6Co, Al5Co) with no Al-based coating. The symmetry of the main peak in curve 1704 shows high ordering in bulk. Compared to the benchmark curve 1704, aluminum in Sample 1 is less ordered and has a range of coordination from Al6Co to Al2Co, which suggests that Al$_2$O$_3$ coating on Sample 1 has diffused into the bulk creating the range of coordination. Varied materials processing conditions show varied fingerprints/signals from different Al—Co coordination.

The combination of the acquired information from XPS and NMR data with the SEM images shows that most of the Al in the particle lies near the surface of the particle as a surface doping-coating, but not as a distinct phase as the original Al$_2$O$_3$ coating. The coating now exists as a gradient of Li$_{0.98}$(Co$_{0.97}$Mn$_{0.017}$Al$_{0.013}$)O$_2$ into the subsurface of the particle.

Chemical Stability

To determine the chemical stability of the doping-coating, a metal leaching analysis was used to compare uncoated, Al$_2$O$_3$-coated and annealed Li$_{0.98}$(Co$_{0.97}$Mn$_{0.017}$Al$_{0.013}$)O$_2$. Cathode powder was immersed in a buffer solution, which strongly interacts with the transition metals in the core but leaves the coating layer intact. The materials with higher coverage or better protection release less metal, while cathode materials with poor coverage can release more metal into the buffer solution. The amount of leached transition metals is determined using a complex metric titration technique.

Figure 18:
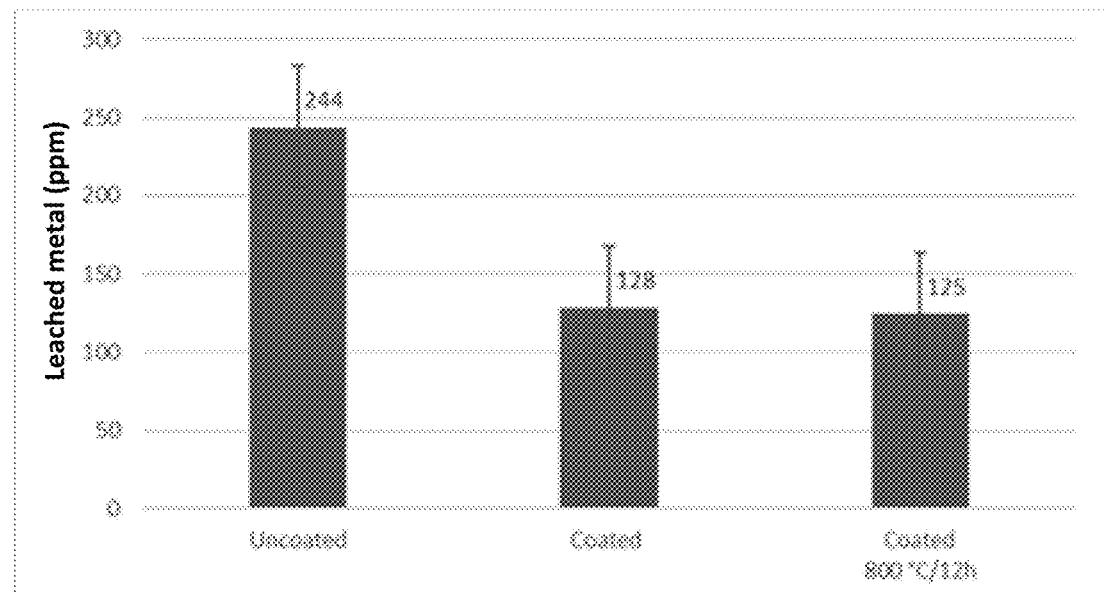
FIG. 18 shows metal leaching analysis of uncoated $Li_{0.98}(Co_{0.97}Mn_{0.017}Al_{0.013})O_2$ particles, particles coated with $Al_2O_3$, and particles after annealing at 800° C. for 12 hours in accordance with an illustrative embodiment.

FIG. 18 shows metal leaching analysis of uncoated Li$_{0.98}$(Co$_{0.97}$Mn$_{0.017}$Al$_{0.013}$)O$_2$ particles, particles coated with Al$_2$O$_3$, and particles after annealing at 800° C. for 12 hours. The uncoated material leached out 244 ppm of transition metals, whereas the coated and annealed samples show nearly the same amount of leaching 125-128 ppm, which indicates a similar ability to protect the cathode surface from leaching due to interaction from impurity acids (HF) in the liquid electrolyte.

Improved Properties

The high temperature annealing process (e.g. 800° C., 900° C., and 1000° C.) is shown later to improve Li-ion cell cycle life and cell resistance.

Cathode laminates were made from the as-prepared coated powder and annealed coated powder. The laminates were used in the assembly of a single layer pouch cell with a separator and a graphite negative electrode. Three cells were made and tested for each material evaluated.

After an initial formation cycle, the cells were cycled between 3.0 and 4.45V voltage at a rate of 0.7 C charge and discharge 1 C for standard cycles and every 23 cycles a C/5 discharge and a C/10 discharge cycle to measure resistance. The electrochemical performance of this electrode at 25° C. is determined and illustrated as cycle versus specific capacity in FIG. 19, cycle versus energy retention in FIG. 20, and cycle versus cell resistance in FIG. 21.

Figure 22:
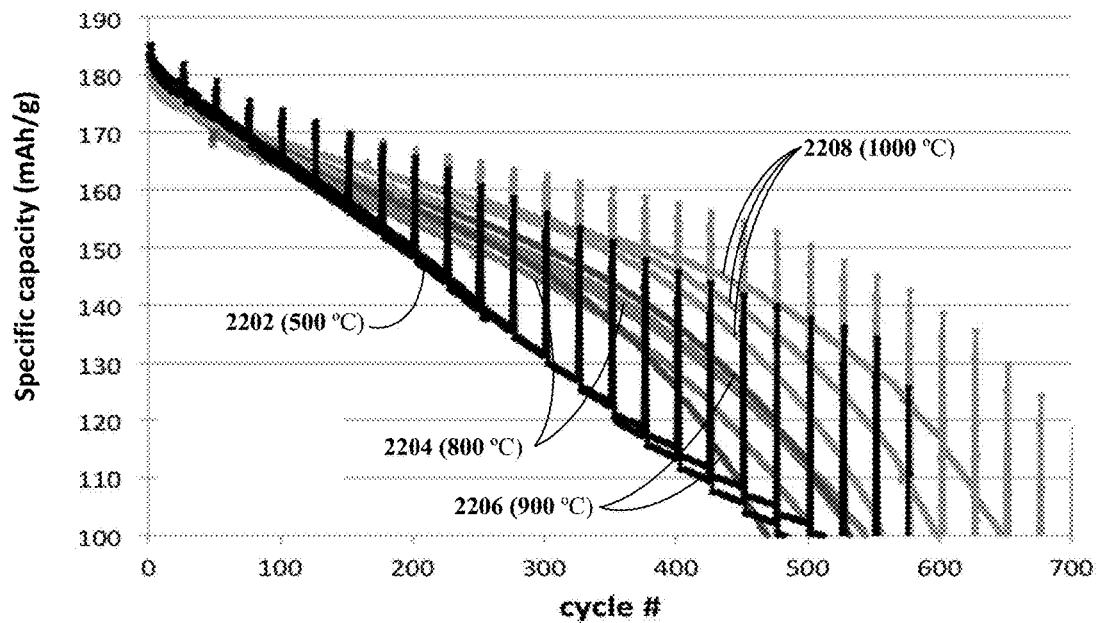
FIG. 22 illustrates specific capacity cycle life at 45° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared) in accordance with an illustrative embodiment.

Positive electrode laminates were made from a repeat batch of annealed powders and assembled into single layer pouch cells with a separator and a graphite negative electrode. Three identical cells were made to evaluate the material. The formation and subsequent cycles were run using the same protocol as at 25° C. The cycle life for specific capacity at 45° C. is illustrated in FIG. 22, cycle versus energy retention in FIG. 23, and cycle versus cell resistance in FIG. 24.

The cells with the annealed Li$_{0.98}$(Co$_{0.97}$Mn$_{0.017}$Al$_{0.013}$)O$_2$ cathode show improved cycling performance in terms of specific capacity, energy retention, and cell resistance at 25° C. The cycle life at 45° C. for the annealed sample also shows improved performance over the standard Al$_2$O$_3$ coated material.

Figure 19:
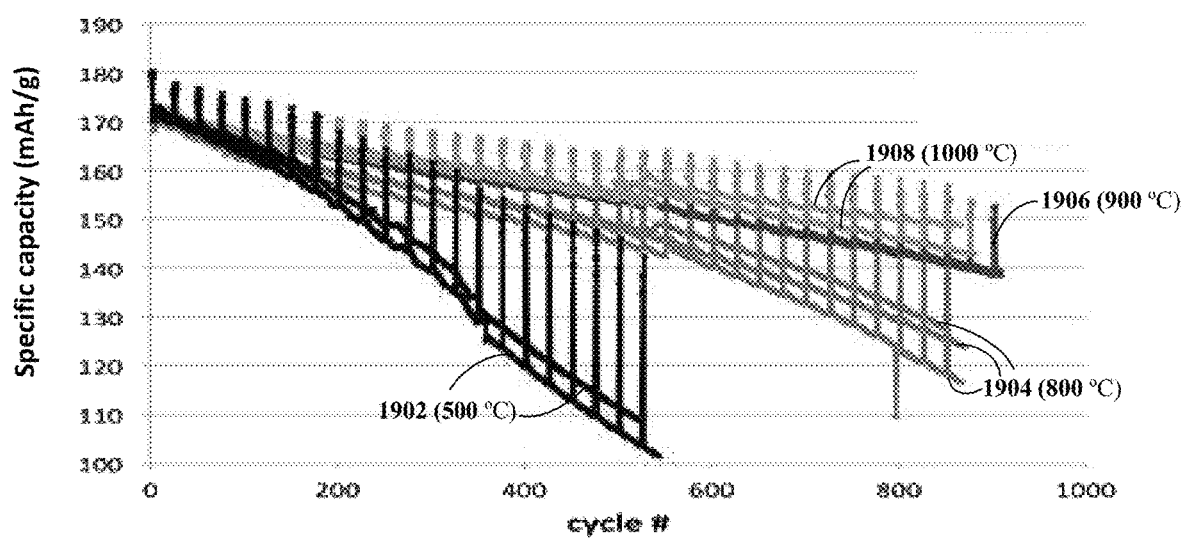
FIG. 19 shows specific capacity cycle life at 25° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared) in accordance with an illustrative embodiment.

FIG. 19 shows specific capacity cycle life at 25° C. of Li$_{0.98}$(Co$_{0.97}$Mn$_{0.017}$Al$_{0.013}$)$_2$ electrodes coated with Al$_2$O$_3$ and electrodes made after annealing the material at 800° C./8 h, 900° C./8 h, and 1000° C./8 h as well as at 500° C./8 h (as-prepared). Curves 1902, 1904, 1906, and 1908 represent as-prepared, 800° C./8 h, 900° C./8 h, and 1000° C./8 h, respectively. As shown, there are two samples annealed at 500° C. and three samples annealed at 800° C., only one sample annealed at 900° C. and 1000° C. The cycle life trending for the specific capacity is better for annealed samples at 900° C. and 1000° C. than annealed samples at 800° C., and much better than as-prepared sample.

Figure 20:
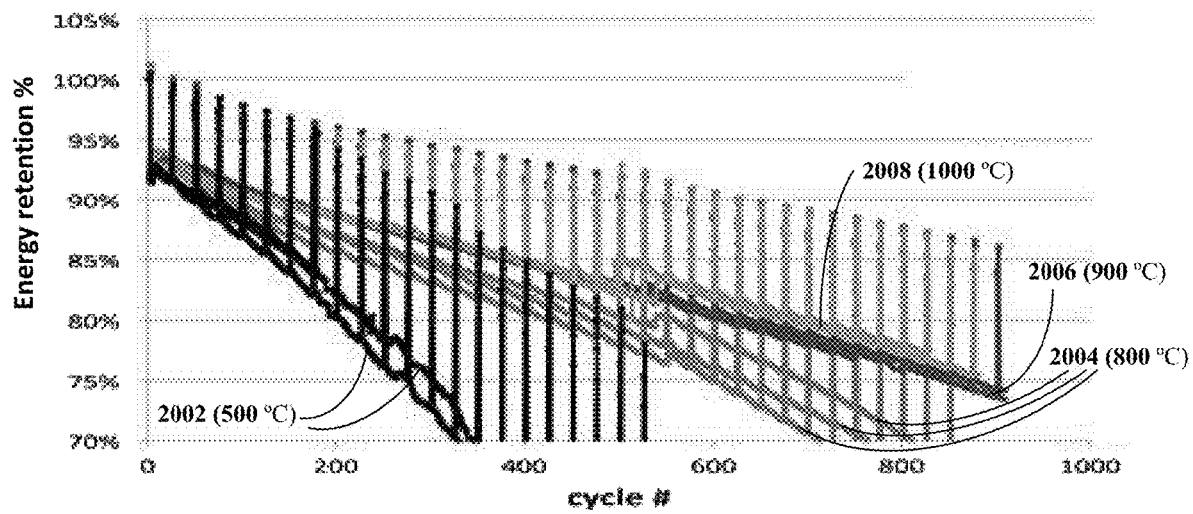
FIG. 20 illustrates energy retention cycle life at 25° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared) in accordance with an illustrative embodiment.

FIG. 20 illustrates energy retention cycle life at 25° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared). Curves 2002, 2004, 2006, and 2008 represent as-prepared, 800° C./8 h, 900° C./8 h, and 1000° C./8 h, respectively. Again, there are two samples annealed at 500° C. and three samples annealed at 800° C., only one sample annealed at 900° C. and 1000° C. The cycle life trending for the energy retention is also better for annealed samples at 900° C. and 1000° C. than annealed samples at 800° C., and much better than as-prepared sample.

Figure 21:
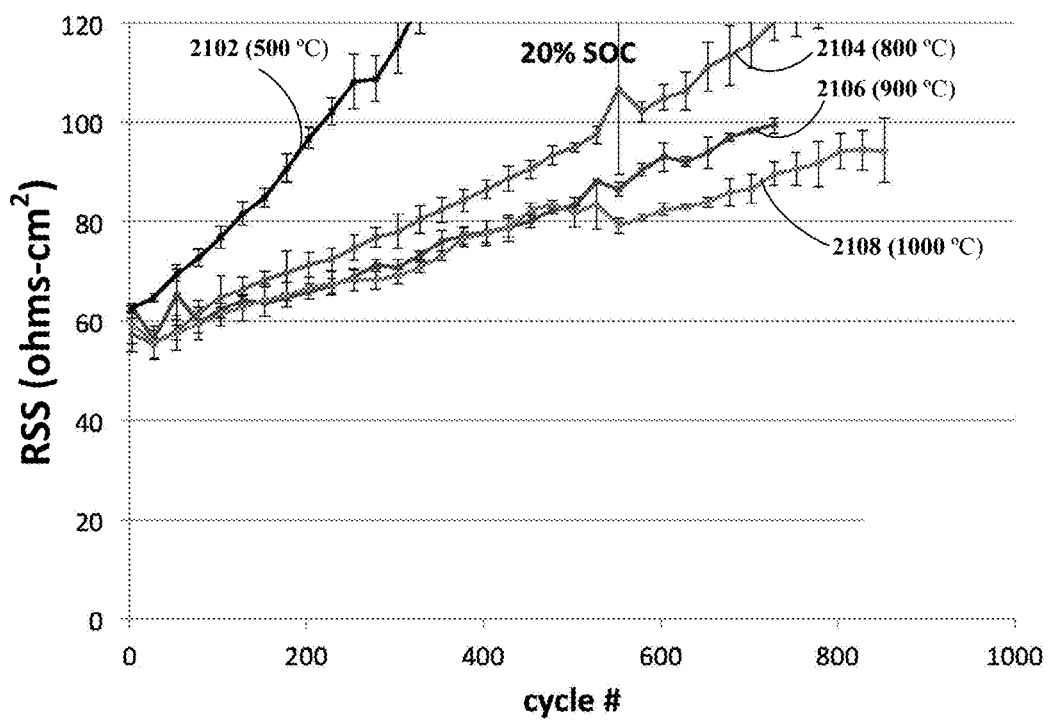
FIG. 21 illustrates cell resistance cycle life at 25° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared) in accordance with an illustrative embodiment.

FIG. 21 illustrates cell resistance cycle life at 25° C. of $Li_{0.98}(Co_{0.97}Mn_{0.017}Al_{0.013})_2$ electrodes coated with $Al_2O_3$ and electrodes made after annealing the material at 800° C./8 h, 900° C./8 h, and 1000° C./8 h as well as at 500° C./8 h (as-prepared). Curves 2102, 2104, 2106, and 2108 represent as-prepared, 800° C./8 h, 900° C./8 h, and 1000° C./8 h, respectively. The cell resistance with cycling is shown to be more stable with the annealed material compared to the as-prepared material. As illustrated in FIG. 21, at 25° C. cycling the as-prepared material starts with a cell resistance of 60 versus 70 ohms·cm$^2$ compared to the annealed material. However, as cycling proceeds, the as-prepared material crosses over and increases to 180 versus 130 ohms·cm$^2$ compared to the annealed material. The cycle life trending for the resistance is also better when annealing temperature increases from 800° C. to 900° C. and 1000° C. The annealed samples are much better than as-prepared sample.

At an elevated temperature of 45° C., the as-prepared sample shows increased capacity fade compared to the annealed sample, where the as-prepared sample is reduced to 138 mAh/g compared to 150 mAh/g for the annealed material at 800° C./8 h.

FIG. 22 illustrates specific capacity cycle life at 45° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared). Curves 2202, 2204, 2206, and 2208 represent as-prepared, 800° C./8 h, 900° C./8 h, and 1000° C./8 h, respectively. The specific capacity versus cycle has the best trend for annealing at 1000° C. compared to lower annealing temperatures.

Figure 23:
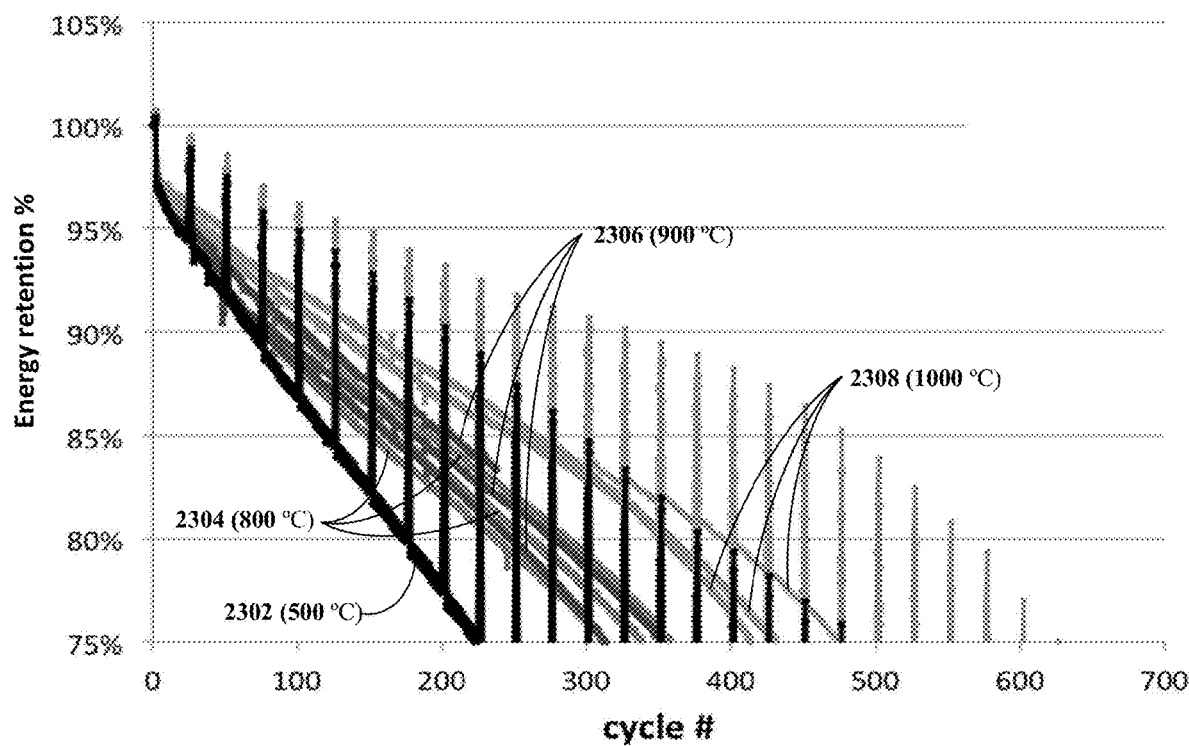
FIG. 23 illustrates energy retention cycle life at 45° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared) in accordance with an illustrative embodiment.

FIG. 23 illustrates energy retention cycle life at 45° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared). Curves 2302, 2304, 2306, and 2308 represent as-prepared, 800° C./8 h, 900° C./8 h, and 1000° C./8 h, respectively. The energy retention versus cycle has the best trend for annealing at 1000° C. compared to lower annealing temperatures.

Figure 24:
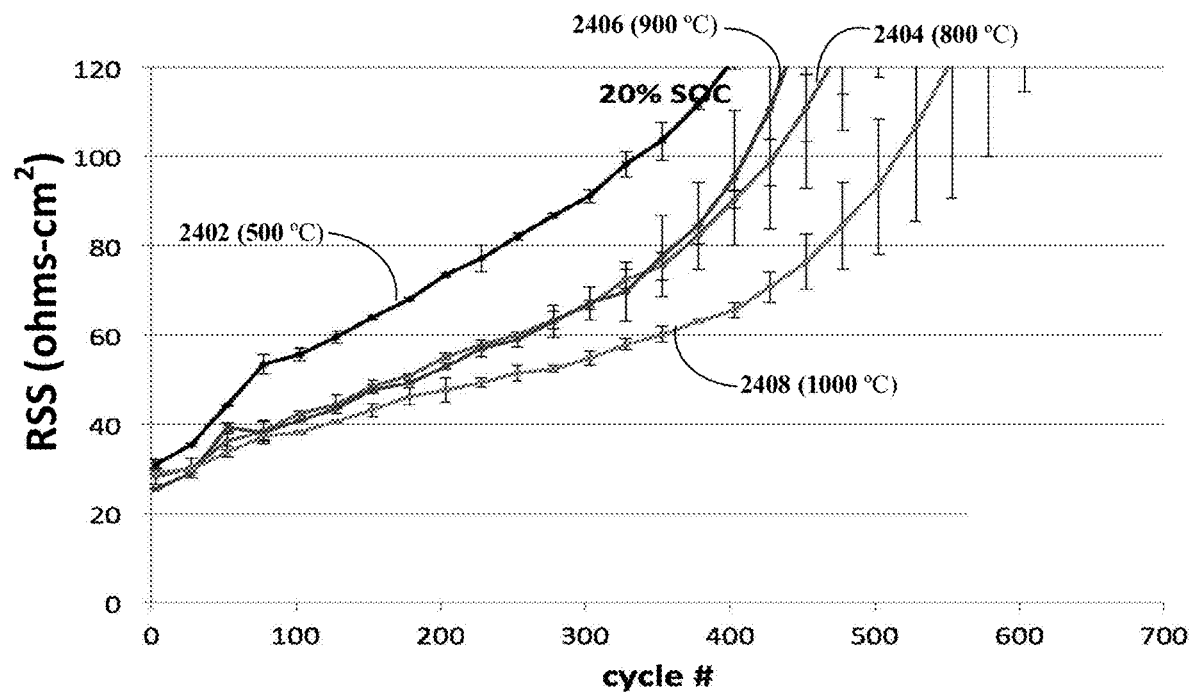
FIG. 24 illustrates cell resistance cycle life at 45° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared) in accordance with an illustrative embodiment.

FIG. 24 illustrates cell resistance cycle life at 45° C. of $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h as well as at 500° C./8 h (as-prepared). Curves 2402, 2404, 2406, and 2408 represent as-prepared, 800° C./8 h, 900° C./8 h, and 1000° C./8 h, respectively. The growth rate of the resistance versus cycle has the best for annealing at 1000° C.

Figure 25:
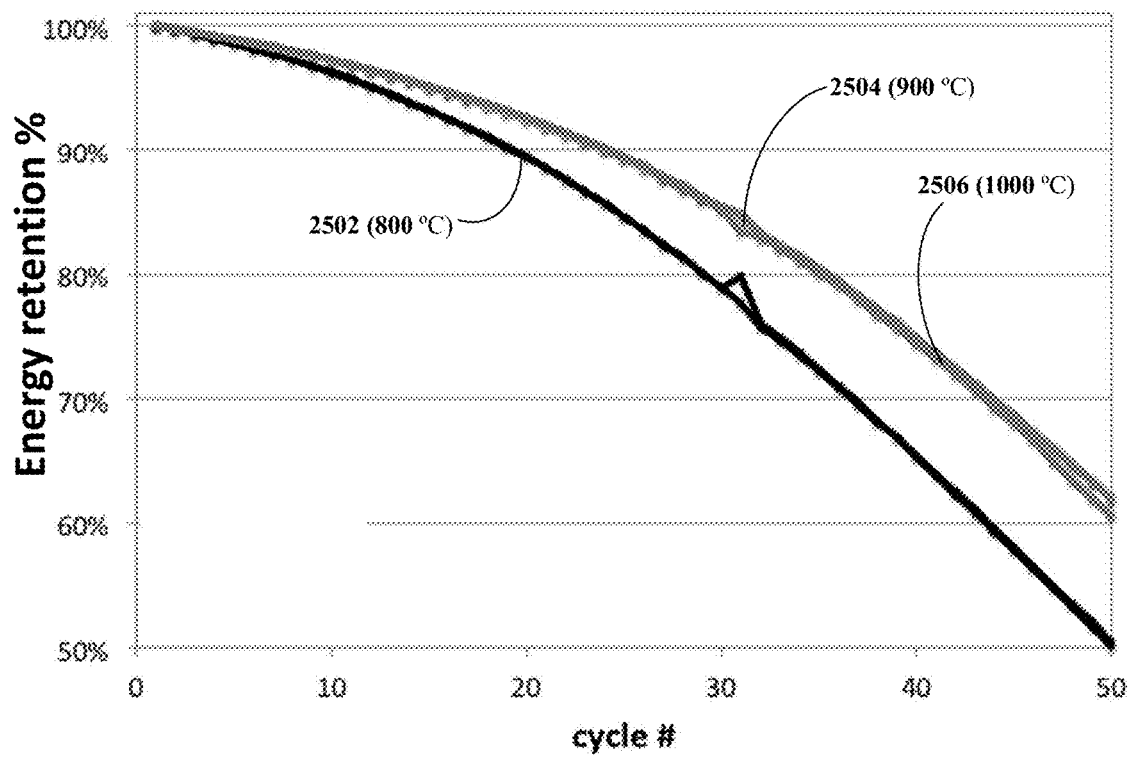
FIG. 25 illustrates energy retention cycle life for coin half-cell including $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h in accordance with an illustrative embodiment.

FIG. 25 illustrates energy retention cycle life for coin half-cell including $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h in accordance with an illustrative embodiment. Curves 2502, 2404, and 2406 represent 800° C./8 h, 900° C./8 h, and 1000° C./8 h, respectively. As shown, there are one sample annealed at 800° C., one sample annealed at 900° C., and one sample annealed at 1000° C. As shown in FIG. 25, the energy retention for annealed samples at 900° C. and 1000° C. is about the same, and better than annealed sample at 800° C.

Figure 26:
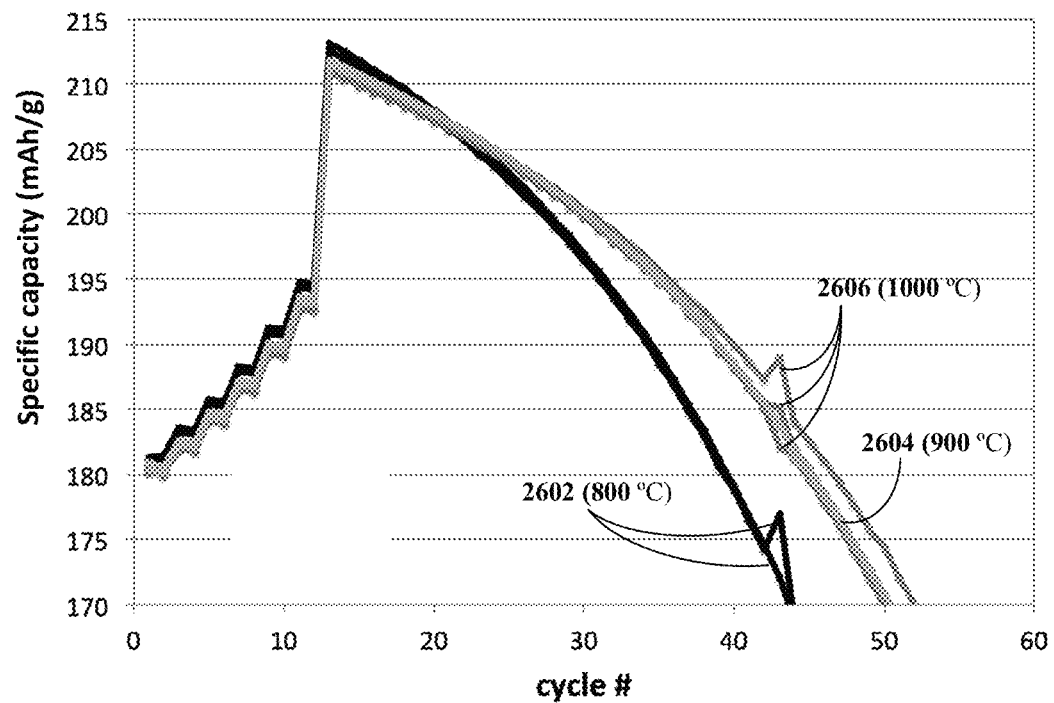
FIG. 26 illustrates specific capacity cycle life for coin half-cell including $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h in accordance with an illustrative embodiment.

FIG. 26 illustrates specific capacity cycle life for coin half-cell including $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h in accordance with an illustrative embodiment. Curves 2602, 2604, and 2606 represent 800° C./8 h, 900° C./8 h, and 1000° C./8 h, respectively. As shown, there are two samples annealed at 800° C. and three samples annealed at 1000° C., only one sample annealed at 900° C. As shown in FIG. 26, the specific capacities for annealed samples at 900° C. and 1000° C. are similar and are better than that of the annealed sample at 800° C.

Figure 27:
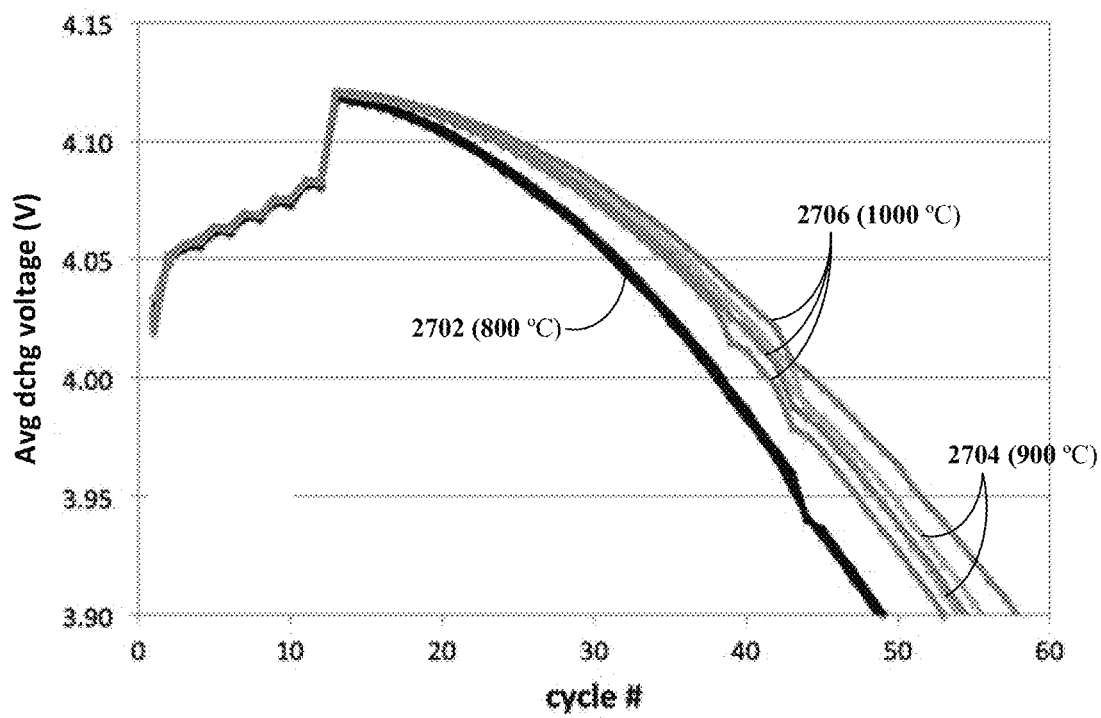
FIG. 27 illustrates average discharge voltage cycle life for coin half-cell including $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h in accordance with an illustrative embodiment.

FIG. 27 illustrates average discharge voltage cycle life for coin half-cell including $Li_{0.98}(Co_{0.97}Mn_{0.017}Al_{0.013})O_2$ electrodes coated with $Al_2O_3$ and electrodes made after annealing the material at 800° C./8 h, 900° C./8 h, and 1000° C./8 h in accordance with an illustrative embodiment. Curves 2702, 2704, and 2706 represent 800° C./8 h, 900° C./8 h, and 1000° C./8 h, respectively. As shown, there are two samples annealed at 900° C. and three samples annealed at 1000° C., only one sample annealed at 800° C. As shown in FIG. 27, the average voltages for annealed samples at 900° C. and 1000° C. are similar and are better than that of the annealed sample at 800° C.

Physical Properties

Increasing heat treatment temperature from 800° C. to 900° C. and to 1000° C. results in larger D50/D90 for the secondary particles, and lower surface area. Samples 9-11 with $Al_2O_3$ coating and Al-dopant are also added to Table 1.

TABLE 5

Properties with Heat Treatment

| | Heat Treatment | | | |
|---|---|---|---|---|
| | 500° C./8 h–800° C./8 h Samples 4 and 5 | 800° C./8 h Sample 9 | 900° C./8 h Sample 10 | 1000° C./8 h Sample 11 |
| Al, ppm | 3950, 4200, ±100 | 4240 | 4090 | 4180 |
| Mn/(Co + Mn)% | 1.70-1.75 | 1.70 | 1.74 | 1.71 |
| Li/(Co + Mn)% | 0.985 ± 0.005 | 1.001 | 0.997 | 0.997 |
| D10 before press, µm | >5 | 6.3 | 8.1 | 11.1 |
| D50 before press, µm | ≥18, ≤21 | 21.4 | 22.6 | 24.4 |
| D90 before press, µm | <35 | 34.6 | 35.1 | 36 |
| D99 before press, µm | <45 | 43.2 | 43.1 | 43.2 |
| D10 after 200 Mpa press, µm | >5 | 4.4 | 4.8 | 5.8 |
| D50 after 200 Mpa press, µm | >15 | 18.1 | 18.5 | 19.7 |

TABLE 5-continued

Properties with Heat Treatment

| | Heat Treatment | | | |
| --- | --- | --- | --- | --- |
| | 500° C./8 h-800° C./8 h Samples 4 and 5 | 800° C./8 h Sample 9 | 900° C./8 h Sample 10 | 1000° C./8 h Sample 11 |
| D50, change % | n/a | −15.4 | −16.1 | −19.3 |
| D90 after 200 Mpa press, μm | <35 | 32.2 | 32.3 | 33.3 |
| D90, changes % | n/a | −6.9 | −8.0 | −7.5 |
| BET surface area before press, m$^2$/g | <0.28 | 0.16 | 0.15 | 0.13 |
| BET surface area after press, m$^2$/g | <0.41 | 0.27 | 0.26 | 0.24 |
| Discharge voltage, V | ≥4.0 | 4.03 | 4.03 | 4.02 |
| Charge capacity, mAh/g | ≥192 | 191.3 | 190.3 | 190.3 |
| Discharge capacity, mAh/g | ≥185 | 181.3 | 180.3 | 180.4 |
| 1$^{st}$ cycle efficiency, % | >95 | 94.8 | 94.9 | 94.8 |

Example 1—$LiCo_{0.95}Mn_{0.03}Ni_{0.02}O_2$ with Al Surface Doping

In some variations, the core material may vary. This example demonstrates that annealing the coated particles with a different core material $LiCo_{0.95}Mn_{0.03}Ni_{0.02}O_2$ also revealed diffusion of Al into the core from the surface and diffusion of Co and Mn from the core to the surface.

In this example, a cathode material $LiCo_{0.95}Mn_{0.03}Ni_{0.02}O_2$ was prepared by the following method. A 3 mol % manganese and 2 mol % Ni substituted, $LiCoO_2$ cathode powder, having the composition: $LiCo_{0.95}Mn_{0.03}Ni_{0.02}O_2$, was synthesized using a coprecipitation process to produce a hydroxide precursor. The composition $LiCo_{0.95}Mn_{0.03}Ni_{0.02}O_2$ was determined by high precision inductively coupled plasma-optical emission spectrometry (ICP-OES). The hydroxide precursor was blended together and calcined with lithium carbonate ($Li_2CO_3$) at 1070° C. for about 15 hours to form a cathode active material in a form of a powder. The cathode active material was then coated with nano-sized $Al_2O_3$ in an amount, for example, 2300 ppm by weight, and heat treated at 900° C. for 8 hours. The heat treatment drives the alumina ($Al_2O_3$) coating into the surface of the cathode active material powder to form a distinctive doping-coating layer.

High resolution STEM/EDS was used to analyze the element compositions of cathode material $LiCo_{0.95}Mn_{0.03}Ni_{0.02}O_2$ with 2300 ppm Al surface doping annealed at 900° C. for 8 hours in air.

Figure 28A:
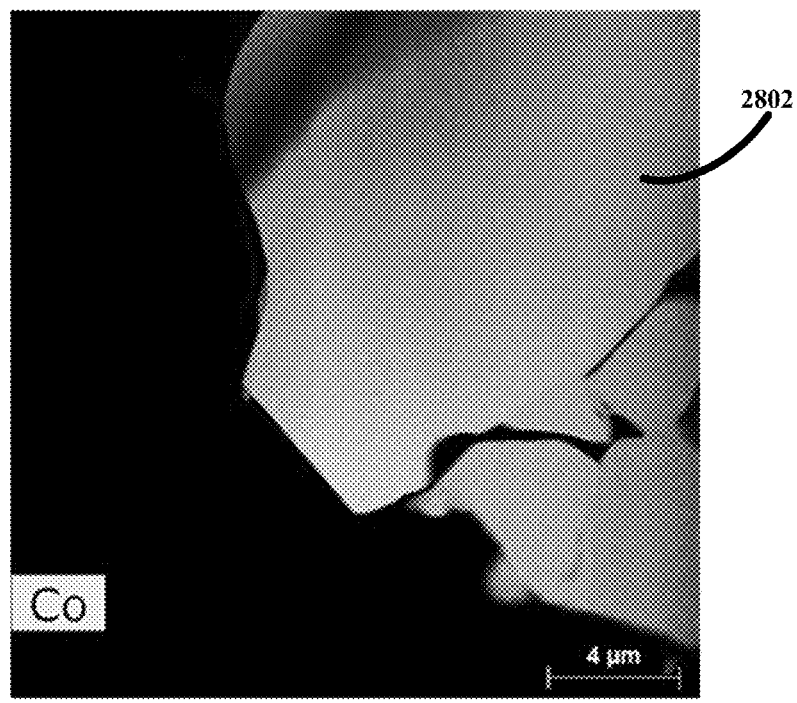
FIGS. 28A-E illustrate EDS mapping images at 5000× magnification of cathode material $LiCo_{0.95}Mn_{0.03}Ni_{0.02}O_2$ with 2300 ppm Al surface doping annealed at 900° C. for 8 hours in air: (A) Co mapping; (B) Al; (C) Mn; (D) Ni; and (E) Co and Al, in accordance with illustrative embodiments.
Figure 28B:
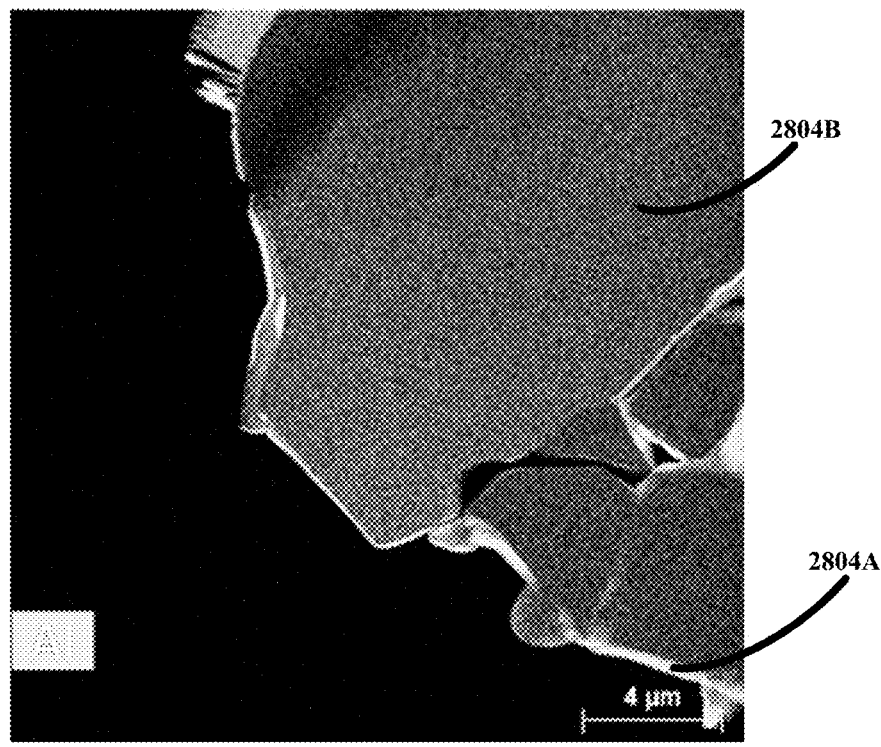
Figure 28C:
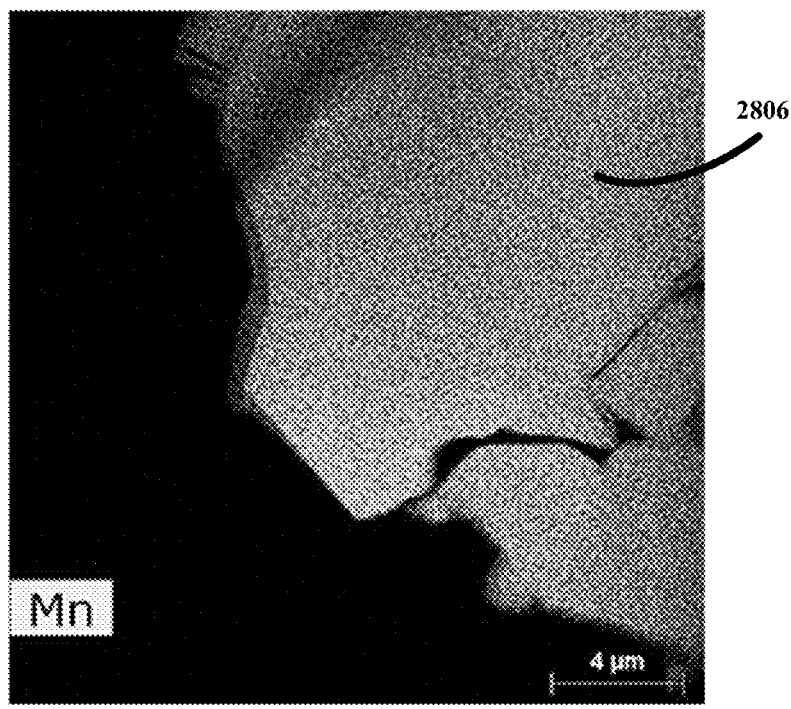
Figure 28D:
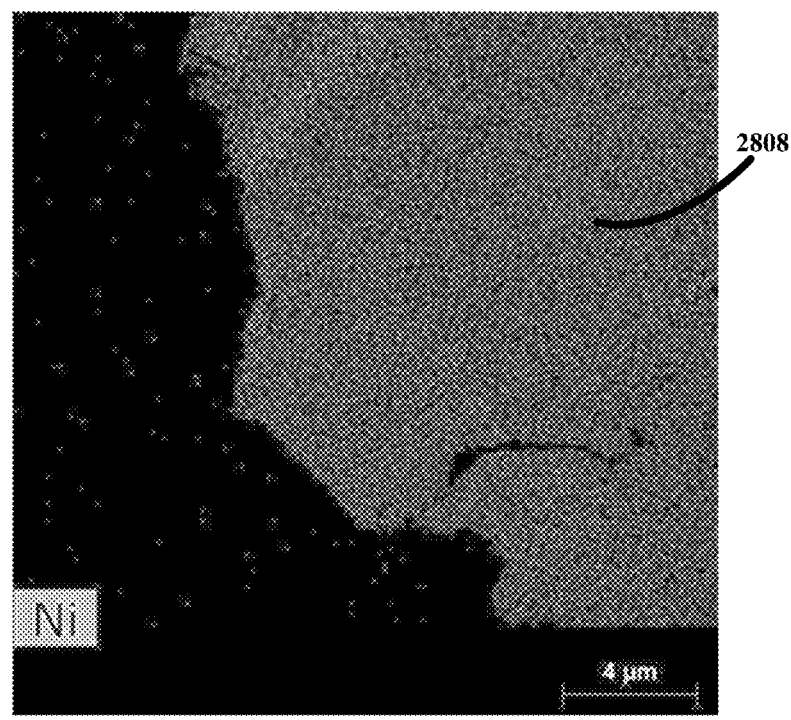

FIGS. 28A-E illustrate EDS mapping images at 5000× magnification of cathode material $LiCo_{0.95}Mn_{0.03}Ni_{0.02}O_2$ with 2300 ppm Al surface doping annealed at 900° C. for 8 hours in air: (A) Co mapping; (B) Al; (C) Mn; (D) Ni; and (E) Co and Al, in accordance with illustrative embodiments. As shown in FIG. 28A, the EDS mapping shows that Co composition (2802) in the bulk is substantially uniform. Similarly, as shown in FIGS. 28C and 28D, the EDS mapping indicate that Mn composition (2806) and Ni composition (2808) are substantially uniform in the bulk.

Figure 28E:
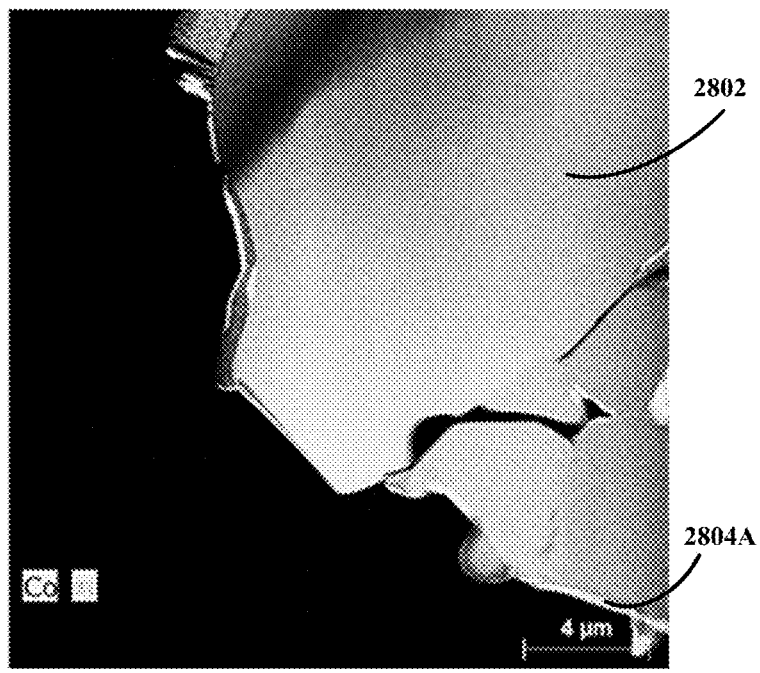

The EDS mapping shown in FIG. 28B reveals that the surface Al composition (2806A) was rich, but Al signal in the bulk (2806B) was significantly weaker than the surface (2806A). FIG. 28E illustrates that the Co composition (2802) was primarily in the bulk and the Al composition is primarily on surface (2804A) after the annealing.

Figure 29:
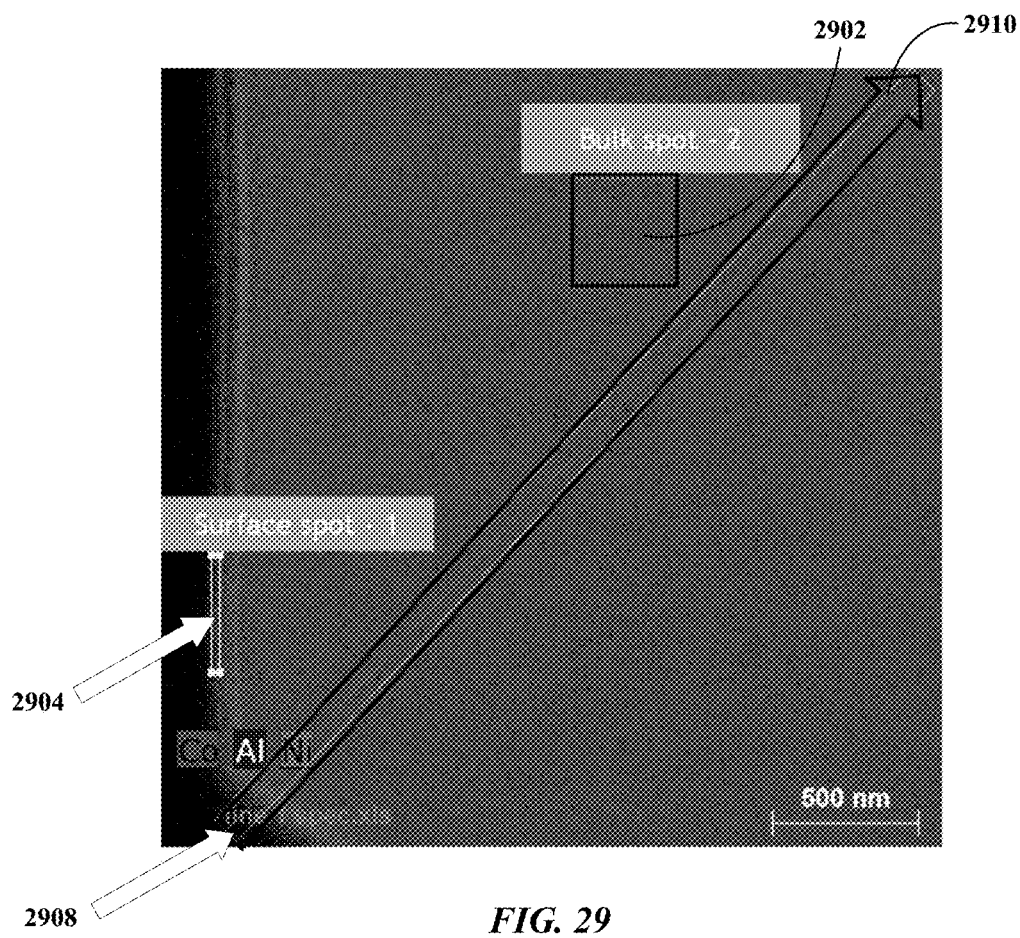
FIG. 29 illustrates high resolution STEM/EDS analysis including EDS spot locations and EDS line scan location at 40000× magnification for cathode material $LiCo_{0.95}Mn_{0.03}Ni_{0.02}O_2$ with 2300 ppm Al surface doping annealed at 900° C. for 8 hours in air, in accordance with illustrative embodiments.
Figure 30:
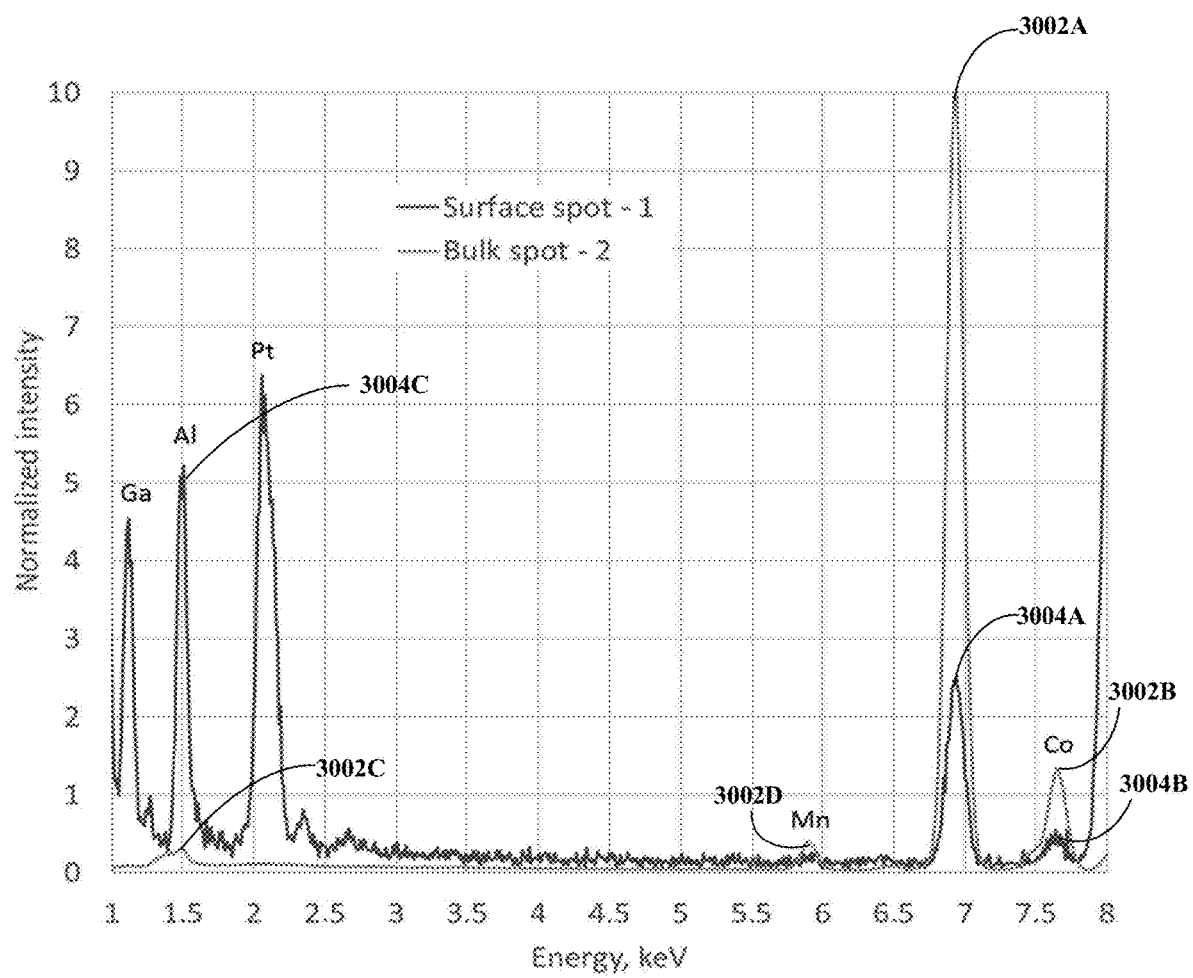
FIG. 30 illustrates normalized intensity versus energy for elements Co, Al, Mn, Ni with reference elements Pt and Ga at the surface spot and bulk spot locations shown in FIG. 29, in accordance with an illustrative embodiment.

FIG. 29 illustrates high resolution STEM/EDS analysis including EDS spot locations and EDS line scan location at 40000× magnification for cathode material $LiCo_{0.95}Mn_{0.03}Ni_{0.02}O_2$ with 2300 ppm Al surface doping annealed at 900° C. for 8 hours in air, in accordance with illustrative embodiments. As shown in FIG. 29, a bulk spot 2902 and a surface spot 2904 were illustrated for the EDS spot scans. Results are illustrated in FIG. 30. FIG. 29 also illustrates a line scan from the surface 2908 toward the bulk as illustrated by arrow 2910.

FIG. 30 illustrates normalized intensity versus energy for elements Co, Al, Mn, Ni along with elements Pt and Ga at the surface spot and bulk spot locations shown in FIG. 29, in accordance with an illustrative embodiment. Elements Ga and Pt were from ion mill process for sample preparation of the focused ion beam (FIB)-SEM. As shown in FIG. 30, all elements had distinguished peaks. For example, the surface spot 2904 provides multiple intensity peaks for elements including Al, Co, and Mn. Specifically, Co has a relative large peak 3004A having a normalized intensity peak of about 2.5 near 7.0 keV, and a small normalized intensity peak 3004B of about 0.3 between 7.5 keV and 8 keV, which suggest a small portion of Co mitigated from the bulk to the surface after annealing at 900° C. for 8 hours.

The EDS analysis at the surface spot 2904 revealed that Al has a large normalized intensity peak 3004C of about 5 near 1.5 keV, which suggested that Al remains on the surface after annealing at 900° C. for 8 hours. Further, there is no visible peak for Mn from the surface spot 2904, which suggested that there is no Mn present on the surface after annealing at 900° C. for 8 hours.

The bulk spot 2902 provided a very large Co intensity peak 3002A of 10 near 7.0 keV, and a small Co intensity peak 3002B of about 1.3 between 7.5 keV and 8 keV. The Co intensity peak 3002A from the bulk spot 2902 was much larger than the Co peak 3004A from the surface spot 2904. Also, the Co peak 3002B from the bulk spot 2902 was much larger than the Co peak 3004B from the surface spot 2904. The results suggest that a small portion of Co mitigated to the surface after annealing at 900° C. for 8 hours in air, but Co is primarily in the bulk after the annealing.

The Al peak 3002A from the bulk spot 2902 was very small, which was considerably smaller than the Al peak 3004C from the surface spot 2904. These results suggest that Al was primarily on surface after annealing at 900° C. for 8 hours in air, while a small portion of the surface doping Al mitigated into the bulk after the annealing.

Further, the Mn peak from the bulk spot 2902 was very small peak 3004D near 6 keV, while the line spot does not detect any Mn after annealing. Without wishing to be limited to any particular mechanism or mode of action, this may have been to the noises associated with the measurements of the spot EDS analysis.

Figure 31A:
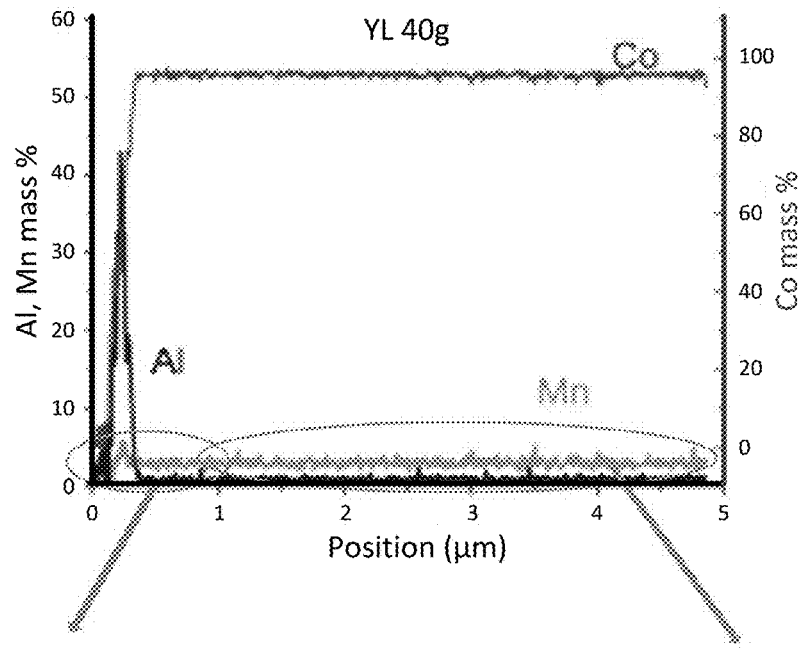
FIGS. 31A-C illustrate high resolution STEM/EDS line scan at the line scan location shown in FIG. 29: (A) Elemental compositions of Mn, Al and Co versus distance from surface to bulk; (B) exploded view of surface elemental compositions of (A); and (C) exploded view of bulk elemental compositions, in accordance with illustrative embodiments.
Figure 31B:
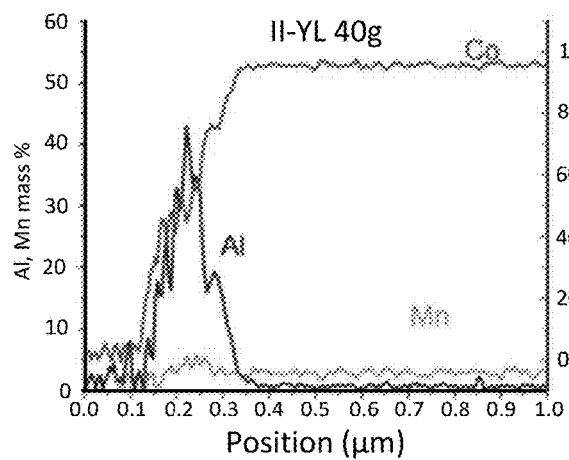
Figure 31C:
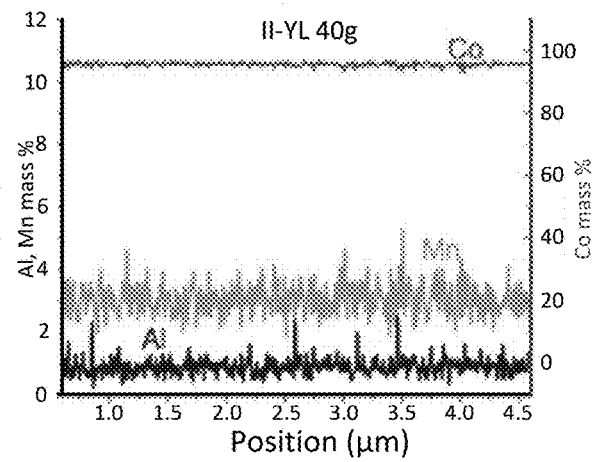

FIGS. 31A-C illustrate high resolution STEM/EDS line scan at the line scan location shown in FIG. 29: (A) Elemental compositions of Mn, Al and Co versus distance from surface to bulk; (B) exploded view of surface elemental compositions of (A); and (C) exploded view of bulk elemental compositions, in accordance with illustrative embodiments. As shown in FIGS. 31A-C, the line scan EDS analysis indicated that Al was primarily on surface (e.g. within a distance of 0.4 μm from the surface). The line scan EDS analysis reveals that Co was primarily in the bulk (e.g. at a distance of 0.5 μm to 5 μm from the surface), but was present on surface. Further, the line scan EDS analysis reveals a small Mn peak indicates that Mn was present near the surface after annealing.

Example 2—$La_2O_3$ and $Al_2O_3$ High Temperature Coating

In some variations, the oxide coating may include a $La_2O_3$ coating or a mixture of $La_2O_3$ and $Al_2O_3$ coating among others.

A 2 mol % manganese substituted, Al-doped (e.g. 3000 ppm) $LiCoO_2$ cathode powder, having the composition: $Li_{0.98}(Co_{0.97}Mn_{0.017}Al_{0.013})O_2$, was synthesized using a coprecipitation process to produce a hydroxide precursor. The composition $Li_{0.98}(Co_{0.97}Mn_{0.017}Al_{0.013})O_2$ was determined by high precision inductively coupled plasma-optical emission spectrometry (ICP-OES). The hydroxide precursor was blended together and calcined with lithium carbonate ($Li_2CO_3$) at 1085° C. for 8 hours to form a cathode active material in a form of a powder. The cathode active material was then coated with nano-sized $La_2O_3$ in an amount, for example, 1300 ppm, 2800 ppm, or 4000 ppm by weight, and heat treated at 900° C. for 8 hours. By annealing at elevated temperature, such as 900° C., some La diffused from the surface into the bulk, while Co diffused from the bulk to the surface at the same time. The diffusion mechanism for La for annealed $La_2O_3$ was similar to Al diffusion for annealed $Al_2O_3$ coating. This diffusion may occur when annealing at temperatures ranging from 700° C. to 1100° C.

Table 6 lists the ICP results for samples including various amounts of La. The ICP provided the measured La of 4010 ppm for the $La_2O_3$ coated cathode with a target 4000 ppm La. The ICP also provided the measured La of 2690 ppm for the $La_2O_3/Al_2O_3$ coated cathode with a target total 4000 ppm La and a target molar ratio of La/Al as 67:33. The ICP further provided the measured La of 1280 ppm for the $La_2O_3/Al_2O_3$ coated cathode with a target total 4000 ppm La and a target molar ratio of La/Al as 33:67.

TABLE 6

ICP Results for Samples Including Various Amounts of La

| | Li:Me | Mn:Me | La (ppm) |
| --- | --- | --- | --- |
| Uncoated cathode | 0.9978 | 0.0197 | 0 |
| $La_2O_3$ coated cathode with 4000 ppm La | 1.0005 | 0.0167 | 4010 |
| $La_2O_3/Al_2O_3$ coated cathode with bimodal La/Al 67:33 | 1.0014 | 0.0167 | 2690 |
| $La_2O_3/Al_2O_3$ coated cathode with bimodal La/Al 33:67 | 1.0019 | 0.0168 | 1280 |

Figure 32:
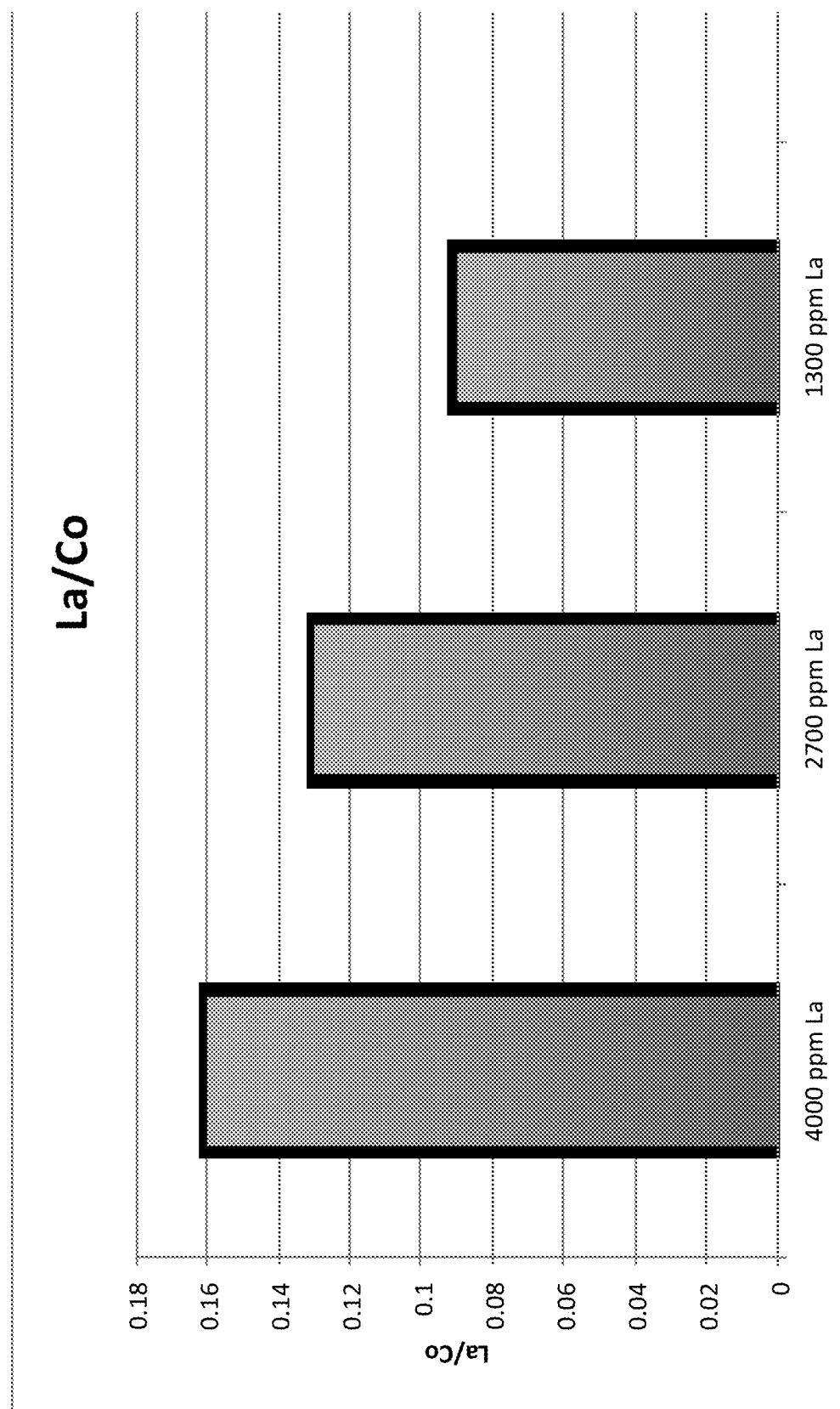
FIG. 32 shows the surface molar ratio of La/Co for various La amounts, in accordance with illustrative embodiments.

The molar ratios of La/Co on the surface of the particles may vary with the amount of La in the coating. FIG. 32 shows the surface molar ratio of La/Co for various La amounts, in accordance with illustrative embodiments. As shown in FIG. 32, the molar ratios of La/Co on the surface of the particles are 0.16, 0.13, and 0.09 for nano-sized $La_2O_3$ in an amount of 4000 ppm, 2800 ppm, and 1300 ppm, respectively.

It will be appreciated by those skilled in the art that the molar ratios of La/Co may vary with the amount of La in the coating and also annealing temperature.

Example 3: MgO, $TiO_2$ and $ZrO_2$ High Temperature Coatings

In some variations, the oxide coating may include MgO, $TiO_2$, or $ZrO_2$ or a mixture of MgO, $TiO_2$, or $ZrO_2$ with other oxides among others.

A 2 mol % manganese substituted, Al-doped (e.g. 3000 ppm) $LiCoO_2$ cathode powder, having a core composition: $Li_{0.98}(Co_{0.97}Mn_{0.017}Al_{0.013})O_2$, was synthesized using a coprecipitation process to produce a hydroxide precursor. The composition $Li_{0.98}(Co_{0.97}Mn_{0.017}Al_{0.013})O_2$ was determined by high precision inductively coupled plasma-optical emission spectrometry (ICP-OES). The hydroxide precursor was blended together and calcined with lithium carbonate ($Li_2CO_3$) at 1085° C. for 8 hours to form a cathode active material in a form of a powder. The core of the cathode active material $Li_{0.98}(Co_{0.97}Mn_{0.017}Al_{0.013})O_2$ was then coated with nano-sized oxides, e.g. MgO, $TiO_2$, or $ZrO_2$, and the coated cathode active material was heat treated at 900° C. for 8 hours. By annealing at elevated temperature, such as 900° C., some Mg, Ti, or Zr diffused from the surface into the bulk, while Co diffused from the bulk to the surface at the same time. The diffusion mechanism for Mg, Ti, or Zr for annealed $La_2O_3$ was similar to Al diffusion for annealed $Al_2O_3$ coating. This diffusion may occur when annealing at temperatures ranging from 700° C. to 1100° C.

Figure 33A:
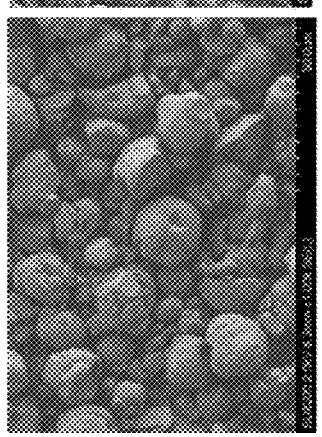
FIGS. 33A-C show SEM images for an uncoated core $Li_{0.98}(Co_{0.97}Mn_{0.017}Al_{0.013})O_2$ in accordance with illustrative embodiments.
Figure 33B:
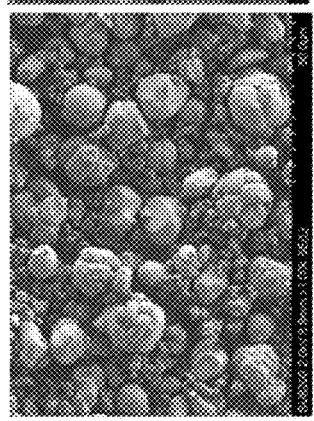
Figure 33C:

FIGS. 33A-C show SEM images for an uncoated core $Li_{0.98}(Co_{0.97}Mn_{0.017}Al_{0.013})O_2$, in accordance with illustrative embodiments. The SEM images reveal that the uncoated core includes a number of particles.

Figure 33D:
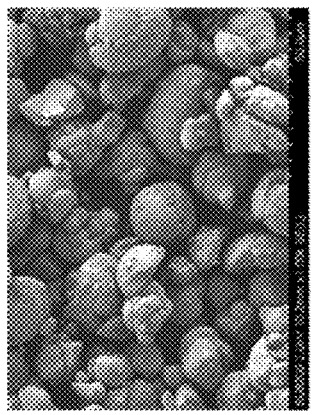
FIGS. 33D-F show SEM images for a core material $Li_{0.98}(Co_{0.97}Mn_{0.017}Al_{0.013})O_2$ with 500 ppm Mg in a Mg oxide coating annealed at 900° C. for 8 hours, in accordance with illustrative embodiments.
Figure 33E:
Figure 33F:
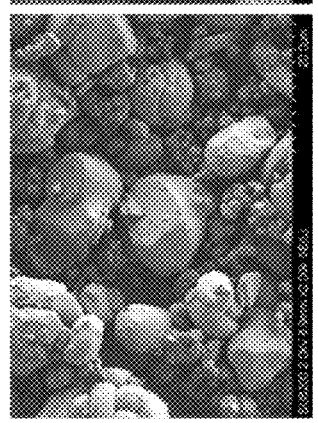

FIGS. 33D-F show SEM images for a core material $Li_{0.98}(Co_{0.97}Mn_{0.017}Al_{0.013})O_2$ with 500 ppm Mg in a Mg oxide coating annealed at 900° C. for 8 hours, in accordance with illustrative embodiments. The SEM images reveal spherical particles and the coated particles have smooth surfaces.

Figure 33G:
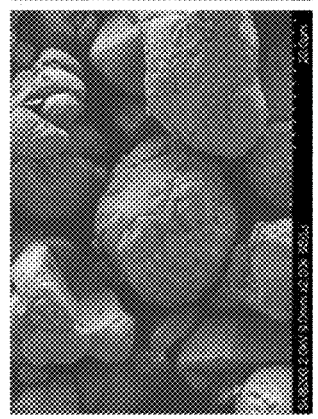
FIGS. 33G-I show SEM images for a core material $Li_{0.98}(Co_{0.97}Mn_{0.017}Al_{0.013})O_2$ with 500 ppm Ti in a Ti oxide coating annealed at 900° C. for 8 hours, in accordance with illustrative embodiments.
Figure 33H:
Figure 33I:
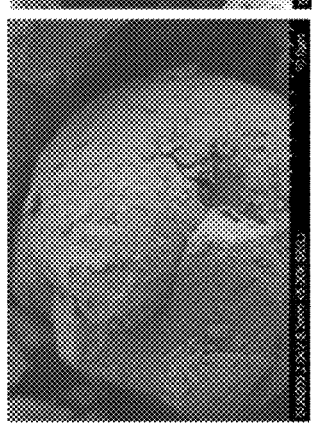

FIGS. 33G-I show SEM images for a core material $Li_{0.98}(Co_{0.97}Mn_{0.017}Al_{0.013})O_2$ with 500 ppm Ti in a Ti oxide coating annealed at 900° C. for 8 hours, in accordance with illustrative embodiments. The SEM images reveal spherical particles and the coated particles have smooth surfaces.

Figure 33J:
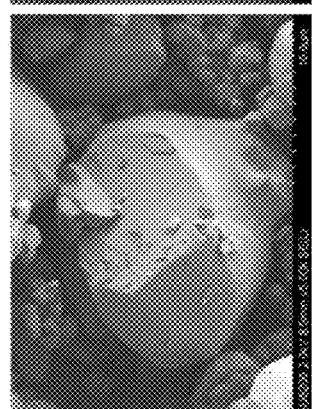
FIGS. 33J-L show SEM images for a core material $Li_{0.98}(Co_{0.97}Mn_{0.017}Al_{0.013})O_2$ with 500 ppm Zr in a Zr oxide coating annealed at 900° C. for 8 hours, in accordance with illustrative embodiments.
Figure 33K:
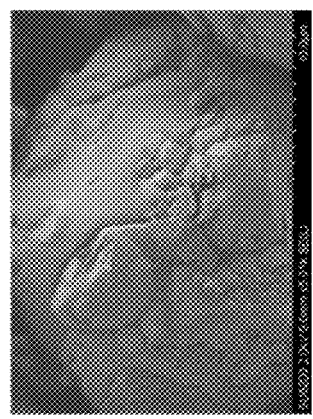
Figure 33L:
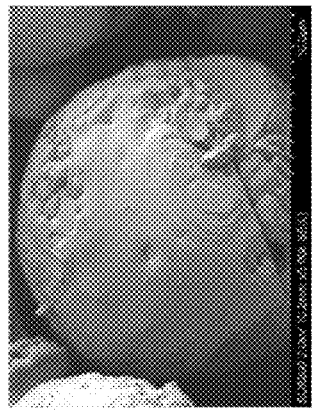

FIGS. 33J-L show SEM images for a core material $Li_{0.98}(Co_{0.97}Mn_{0.017}Al_{0.013})O_2$ with 500 ppm Zr in a Zr oxide coating annealed at 900° C. for 8 hours, in accordance with illustrative embodiments. The SEM images reveal spherical particles and the coated particles have smooth surfaces.

Figure 34:
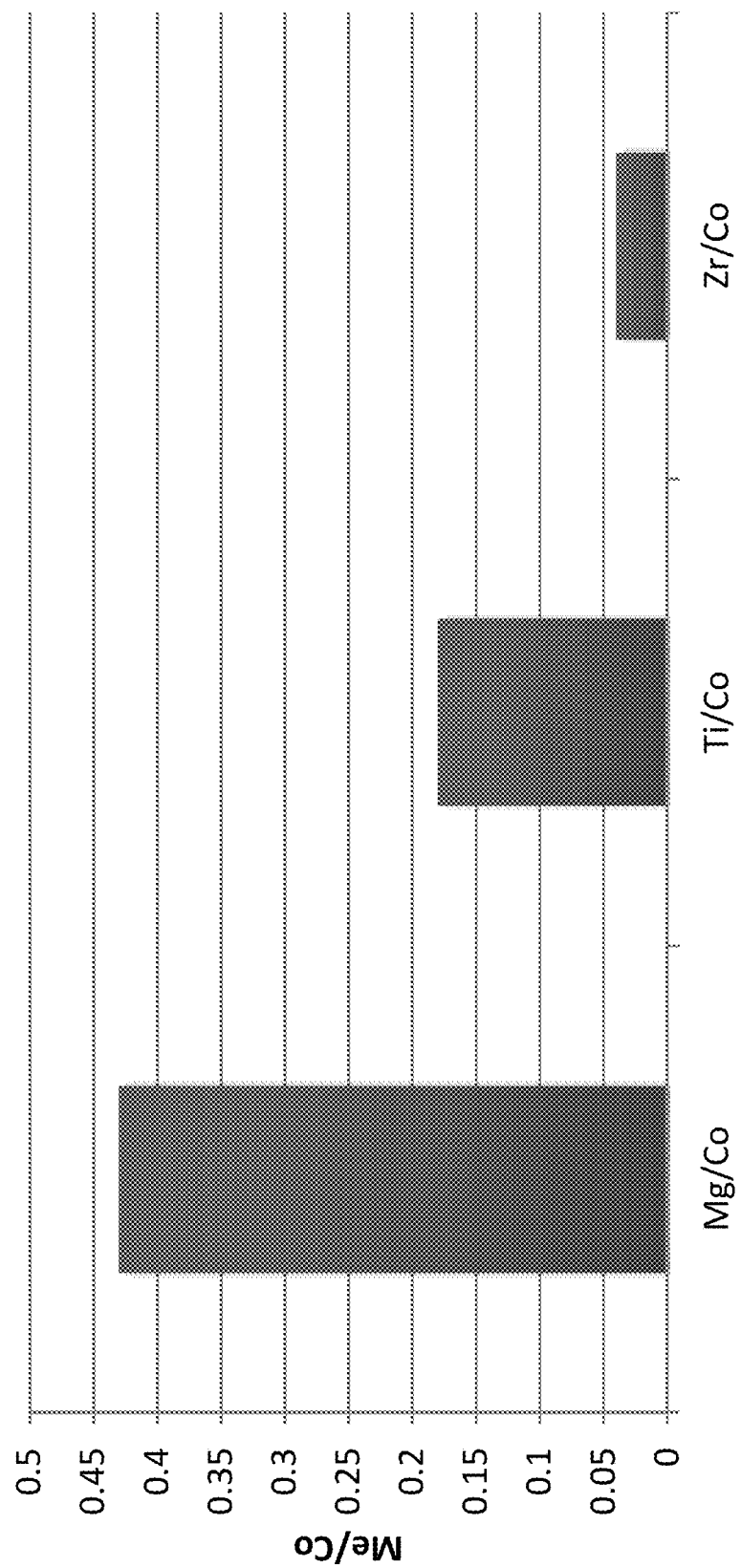
FIG. 34 shows the surface molar ratios of Mg/Co, Ti/Co, and Zr/Co for the core material $Li_{0.98}(Co_{0.97}Mn_{0.017}Al_{0.013})O_2$ with the Mg oxide, Ti oxide, and zirconium oxide coatings, respectively, in accordance with illustrative embodiments.

FIG. 34 shows the surface molar ratios of Mg/Co, Ti/Co, and Zr/Co for the core material $Li_{0.98}(Co_{0.97}Mn_{0.197}Al_{0.013})O_2$ with the Mg oxide, Ti oxide, and zirconium oxide coatings respectively, in accordance with illustrative embodiments. As shown in FIG. 34, the molar ratio of Mg/Co on the surface of the particle is about 0.043 for nano-sized MgO in an amount of 500 ppm Mg in the Mg oxide coating. The molar ratio of Ti/Co on the surface of the particle is about 0.175 for nano-sized $TiO_2$ in an amount of 500 ppm Ti in the Ti oxide coating. The molar ratio of Zr/Co on the surface of the particle is about 0.04 for nano-sized $ZrO_2$ in an amount of 500 ppm Zr in the Zr oxide coating.

It will be appreciated by those skilled in the art that the molar ratios of Mg/Co, Ti/Co, and Zr/Co on the surface of the particles may vary with the amount of Mg, Ti, or Zr oxide coatings and annealing temperatures.

Table 7 shows the results from ICP and XRD for MgO, $TiO_2$, or $ZrO_2$ coatings. As shown in Table 7, the ICP provided a measured value of 2960 ppm Al for the uncoated core, 2860 ppm for the 500 ppm Mg coated sample, 2960 ppm for the 500 ppm Ti coated sample, and 2950 ppm for the 500 Zr coated sample, although the target doping Al was 3000 ppm. Also, the ICP provided the measured amounts of Mg, Ti, and Zr as 482 ppm, 371 ppm, and 329 ppm, respectively, which were detected on the surface of the particles. The different amounts of Mg, Ti, and Zr suggested that the diffusion of Zr from the surface into the bulk was more than the diffusion of Ti from the surface into the bulk, which was more than the diffusion of Mg from the surface into the bulk. When the amount of the element on the surface was higher, the molar ratio of the element to Co on the surface was higher. These amounts of Mg, Ti, and Zr correlated with the molar ratios shown in FIG. 34.

The XRD provided the measured crystal structure dimensions a and c.

TABLE 7

Results from ICP and XRD for MgO, $TiO_2$, or $ZrO_2$ Coatings

| | HP-ICP | | | | | | XRD | |
|---|---|---|---|---|---|---|---|---|
| Description | Li:Me | Mn/Me | Al(ppm) | Mg(ppm) | Ti(ppm) | Zr(ppm) | a (Å) | c (Å) |
| Uncoated core | 0.9978 | 0.0197 | 2960 | — | — | | 2.815088(3) | 14.07165(2) |
| 500 ppm Mg coating | 0.9974 | 0.0197 | 2860 | 482 | — | | 2.815088(2) | 14.07544(2) |
| 500 ppm Ti coating | 0.9971 | 0.0197 | 2960 | — | 371 | | 2.814953(2) | 14.07561(2) |
| 500 ppm Zr coating | 0.9992 | 0.0197 | 2950 | — | | 329 | 2.814900(2) | 14.07508(2) |

Example 4: Electrochemical Performance of Coin Cell Including Core $Li_{0.98}(Co_{0.97}Mn_{0.017}Al_{0.013})O_2$ with $La_2O$ and $Al_2O_3$ High Temperature Coating In some variations, the oxide coating may include a mixture of $La_2O_3$ and $Al_2O_3$ or two different coatings including $La_2O_3$ and $Al_2O_3$. In this example, the amount of coating on the electrochemical performance of a coin cell was evaluated.

A 2 mol % manganese substituted, Al-doped (e.g. 3000 ppm) $LiCoO_2$ cathode powder, having the composition: $Li_{0.98}(Co_{0.97}Mn_{0.017}Al_{0.013})O_2$, was synthesized using a coprecipitation process to produce a hydroxide precursor. The composition $Li_{0.98}(Co_{0.97}Mn_{0.017}Al_{0.013})O_2$ was determined by high precision inductively coupled plasma-optical emission spectrometry (ICP-OES). The hydroxide precursor was blended together and calcined with lithium carbonate ($Li_2CO_3$) at 1085° C. for 8 hours to form a cathode active material in a form of a powder. The cathode active material was then coated with a mixture of nano-sized $La_2O_3$ and $Al_2O_3$ annealed at 500° C. 8 hours, followed by annealing at 800° C. for 8 hours.

Table 8 shows target coating levels of Samples A and B and conditions for heat treatment of the coatings. Sample A had a heavier coating than Sample B. In particular, Sample A had higher Al and La than Sample B.

Also, Sample A had a molar La/Al ratio different from Sample B. Sample A included 1582 ppm Al and 4885 ppm La, while Sample B included 488 ppm Al and 2512 ppm La.

TABLE 8

Target Coating and Conditions for Heat Treatment

| | Target Al coating level, ppm Al | Target La coating level, ppm La | Heat treatment condition |
|---|---|---|---|
| Sample A | 1582 | 4885 | 500° C./8 h + 800° C./8 h |
| Sample B | 488 | 2512 | |

Figure 35:
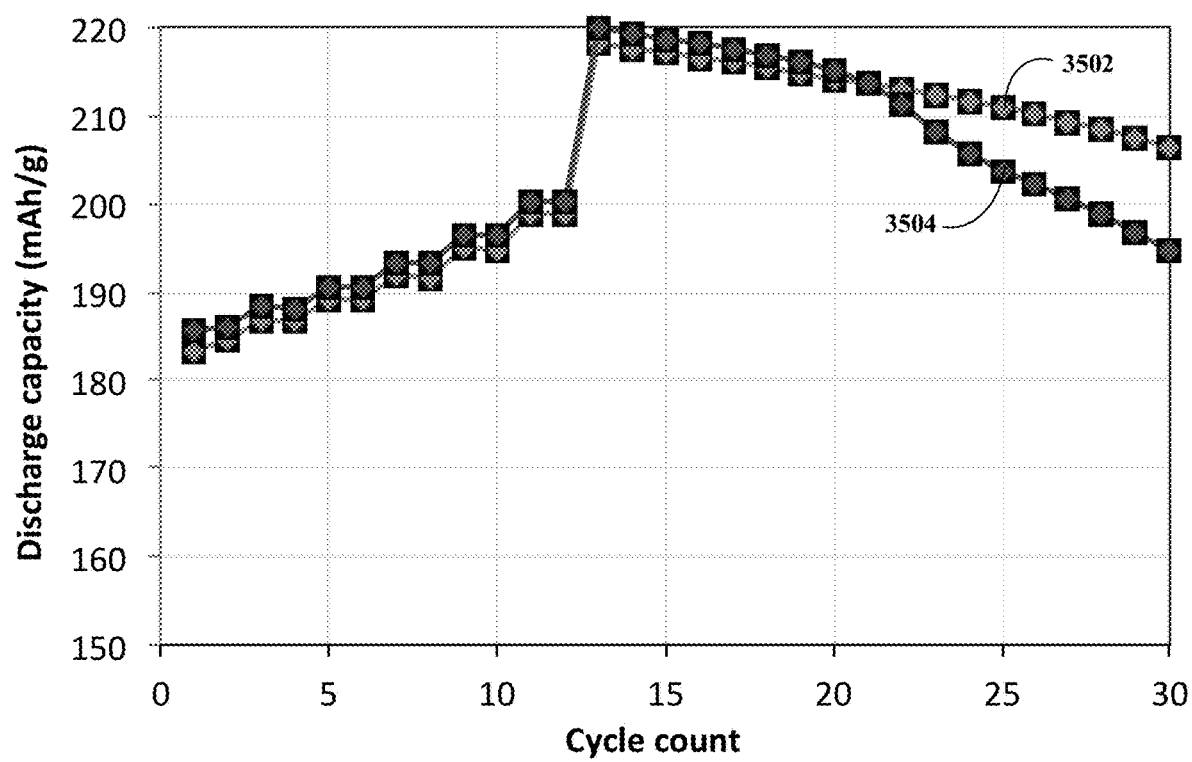
FIG. 35 shows the discharge capacity versus cycle count for a coin cell including cathode active material $Li_{0.98}$ $(Co_{0.97}Mn_{0.017}Al_{0.013})O_2$ with two bimodal coatings La/Al, in accordance with an illustrative embodiment.

FIG. 35 shows the discharge capacity versus cycle count for a coin cell including cathode active material $Li_{0.98}(Co_{0.97}Mn_{0.017}Al_{0.013})O_2$ with two bimodal coatings La/Al, in accordance with an illustrative embodiment. Curve 3502 represents Sample A, while curve 3504 represents Sample B. The result demonstrates that Sample A with higher amounts of Al and La than Sample B had a better electrochemical performance versus cycles than Sample B with lower amounts of Al and La. As such, the thicker coating seems to improve the electrochemical performance.

The coatings, powder, and cathode active materials can be used in batteries as described herein. The materials can be used in electronic devices. An electronic device herein can refer to any electronic device known in the art, including a portable electronic device. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The battery and battery packs can also be applied to a device such as a watch or a clock.

The components powered by a battery or battery pack can include, but are not limited to, microprocessors, computer readable storage media, in-put and/or out-put devices such as a keyboard, track pad, touch-screen, mouse, speaker, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. A plurality of particles comprising a compound represented by Formula (I):

$Li_\alpha Co_{1-x-y-z}Mn_xMe_zAl_yO_\delta$,    Formula (I)

wherein $0.95 \leq \alpha < 1.30$, $0 < x \leq 0.05$, 300 ppm$\leq y \leq$10,000 ppm, $0 \leq z \leq 0.1$, wherein Me is at least one element selected from B, Na, Mg, P, Ti, Ca, V, Cr, Fe, Ni, Cu, Zn, Sc, Y, Ga, Zr, Ru, Mo, La, Si, Nb, Ge, In, Sn, Sb, Te, and Ce, and $1.98 \leq \delta \leq 2.04$, and wherein at an average particle surface, a molar ratio of Al/Co is at least 0.2 and equal to or less than 0.75.

2. The plurality of particles of claim 1,
wherein Me is at least one element selected from Ni, B, Na, Mg, Ti, Ca, V, Cr, Fe, Cu, Zn, Sc, Y, Ga, Zr, La, Ru, and Mo.

3. The plurality of particles of claim 1, wherein an molar ratio of Mn/Co is at least 0.02, wherein the compound is $Li_{0.98}Co_{0.97}Mn_{0.017}Al_{0.013}O_2$.

4. The plurality of particles according to claim 1, wherein at an average of 10 nm beneath the average particle surface:
the average atomic percent of Al is lower than the average atomic percent of Al at the average particle surface; and/or
the average atomic percent of Co is higher than the average atomic percent of Co at the average particle surface.

5. The plurality of particles according to claim 1, wherein y is equal to a sum of $y_1$ and $y_2$, wherein $y_1$ includes Al from an $Al_2O_3$ coating, and wherein $y_2$ includes doped Al.

6. The plurality of particles according to claim 1, wherein $y_1$ ranges from 300 ppm to 10,000 ppm; and/or wherein $y_2$ ranges from 0 to 10,000 ppm.

7. The plurality of particles according to claim 1, wherein $0.02 \leq x \leq 0.04$.

8. A plurality of particles comprising a compound represented by Formula (II):

$(x)[Li_2MnO_3]\cdot(1-x)[Li_\beta Co_{(1-u-w-v)}Mn_uMe_vAl_wO_2]$    (II)

wherein $0.95 \leq \beta < 1.0$, $0 < x \leq 0.05$, $0 \leq u \leq 0.05$, $0 \leq v \leq 0.1$, 300 ppm$\leq w \leq$10,000 ppm,
wherein Me is at least one element selected from B, Na, Mg, P, Ti, Ca, V, Cr, Fe, Ni, Cu, Zn, Sc, Y, Ga, Zr, Ru, Mo, La, Si, Nb, Ge, In, Sn, Sb, Te, and Ce, and wherein at an average particle surface, a molar ratio of Al/Co is at least 0.2.

9. The plurality of particles of claim 8,
wherein Me is at least one element selected from Ni, B, Na, Mg, Ti, Ca, V, Cr, Fe, Cu, Zn, Sc, Y, Ga, Zr, La, Ru, and Mo.

10. The plurality of particles of claim 8, wherein at the average particle surface the ratio of Mn/Co is at least 0.02.

11. The plurality of particles according to claim 7, wherein at an average of 10 nm beneath the average particle surface:
the average atomic percent of Al is lower than the average atomic percent of Al at the average particle surface; and/or
the average atomic percent of Co is higher than the average atomic percent of Co at the average particle surface.

12. The plurality of particles according to claim 7, wherein y is equal to a sum of $y_1$ and $y_2$, and wherein $y_1$ includes Al from an $Al_2O_3$ coating, and wherein $y_2$ includes doped Al.

13. The plurality of particles according to claim 7, wherein $y_1$ ranges from 300 ppm to 10000 ppm; and/or wherein $y_2$ ranges from 0 to 10000 ppm.

14. The plurality of particles according to claim 7, wherein $0.02 \leq x \leq 0.04$.

15. The plurality of particles according to claim 1, wherein a mean diameter of the particles is at least 5 μm.

16. The plurality of particles according to claim 1, wherein a mean diameter of the particles is at least 20 μm.

17. The plurality of particles according to claim 1, wherein the particles comprise secondary particles, each secondary particle comprising a plurality of primary particles sintered together.

18. The plurality of particles according to claim 1, wherein the compound comprises varied Co coordination to Al.

19. The plurality of particles according to claim 1, wherein the compound comprises a plurality of peaks including at least one of Al5Co, Al4Co, Al3Co, Al2Co, and Al1Co detected in nuclear magnetic resonance (NMR).

20. A cathode active material comprising the plurality of particles of claim 1.

21. A cathode comprising the cathode active material of claim 18.

22. A battery comprising
a cathode of claim 21,
a separator, and
an anode.

23. A method of making the plurality particles according to claim 1 comprising:
coating a first plurality of particles comprising the compound of Formula (I) with a $Al_2O_3$ coating,

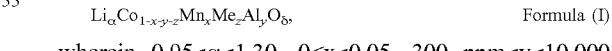

$Li_\alpha Co_{1-x-y-z}Mn_xMe_zAl_yO_\delta$,    Formula (I)

wherein $0.95 \leq \alpha \leq 1.30$, $0 < x \leq 0.05$, 300 ppm$\leq y \leq$10,000 ppm, $0 \leq z < 0.1$, and $1.98 \leq \delta \leq 2.04$, wherein Me is at least one element selected from B,
Na, Mg, P, Ti, Ca, V, Cr, Fe, Ni, Cu, Zn, Sc, Y, Ga, Zr, Ru, Mo, La, Si, Nb, Ge, In, Sn, Sb, Te, and Ce,
wherein y is equal to a sum of $y_1$ and $y_2$, wherein $y_1$ includes Al from the $Al_2O_3$ coating, and $y_2$ includes doped Al; and
annealing the first plurality of particles at a temperature of at least 700° C. to form a second plurality of particles according to claim 1.

24. A method of making the plurality particles according to claim 7, comprising:
coating a first plurality of particles comprising the compound of Formula (I) with a $Al_2O_3$ coating, $$(x)[Li_2MnO_3]\cdot(1-x)[Li_\beta Co_{(1-u-w-v)}Mn_u Me_v Al_w O_2] \quad \text{(II)}$$

wherein $0.95 \leq \beta < 1.30$, $0 < x \leq 0.05$, $0 \leq u \leq 0.05$, $0 \leq v \leq 01$, 300 ppm$\leq w \leq$10,000 ppm, and $1.98 \leq \delta \leq 2.04$, wherein Me is at least one element selected from
B, Na, Mg, P, Ti, Ca, V, Cr, Fe, Ni, Cu, Zn, Sc, Y, Ga, Zr, Ru, Mo, La, Si, Nb, Ge, In, Sn, Sb, Te, and Ce; and
annealing the first plurality of particles at a temperature of at least 700° C. to form a second plurality of particles according to claim 7.

25. A plurality of particles comprising a compound represented by Formula (I):

$$Li_\alpha Co_{1-x-y-z}Mn_x Me_z Al_y O_\delta, \quad \text{Formula (I)}$$

wherein $0.95 \leq \alpha < 1.30$, $0 < x \leq 0.05$, 0 ppm$\leq y \leq$10,000 ppm, 300 ppm$\leq z \leq$5000 ppm,
wherein Me is La, and $1.98 \leq \delta \leq 2.04$, and
wherein at an average particle surface, an molar ratio of La/Co is at least 0.06.

26. A plurality of particles comprising a compound represented by Formula (I):

$$Li_\alpha Co_{1-x-y-z}Mn_x Me_z Al_y O_\delta, \quad \text{Formula (I)}$$

wherein $0.95 \leq \alpha < 1.30$, $0 < x \leq 0.05$, 0 ppm$\leq y \leq$10,000 ppm, 300 ppm$\leq z \leq$5000 ppm,
wherein Me is Mg, and $1.98 \leq \delta \leq 2.04$, and wherein at an average particle surface, an molar ratio of Mg/Co is at least 0.20.

27. A plurality of particles comprising a compound represented by Formula (I):

$$Li_\alpha Co_{1-x-y-z}Mn_x Me_z Al_y O_\delta, \quad \text{Formula (I)}$$

wherein $0.95 \leq \alpha < 1.30$, $0 < x \leq 0.05$, 0 ppm$\leq y \leq$10,000 ppm, 300 ppm$\leq z \leq$5000 ppm,
wherein Me is Ti, and $1.98 \leq \delta \leq 2.04$, and
wherein at an average particle surface, an molar ratio of Ti/Co is at least 0.08.

28. A plurality of particles comprising a compound represented by Formula (I):

$$Li_\alpha Co_{1-x-y-z}Mn_x Me_z Al_y O_\delta, \quad \text{Formula (I)}$$

wherein $0.95 \leq a < 1.30$, $0 < x \leq 0.05$, 0 ppm$\leq y \leq$10,000 ppm, 300 ppm$\leq z \leq$5000 ppm,
wherein Me is Zr, and $1.98 \leq \delta \leq 2.04$, and
wherein at an average particle surface, an molar ratio of Zr/Co is at least 0.02.

* * * * *